(12) United States Patent
Lee et al.

(10) Patent No.: US 9,514,749 B2
(45) Date of Patent: Dec. 6, 2016

(54) METHOD AND ELECTRONIC DEVICE FOR EASY SEARCH DURING VOICE RECORD

(71) Applicant: LG ELECTRONICS INC., Seoul (KR)

(72) Inventors: Kyehwan Lee, Gwangmyeong (KR); Choongnyoung Seon, Goyang (KR); Juhee Kim, Gimpo (KR)

(73) Assignee: LG ELECTRONICS INC., Seoul (KR)

( * ) Notice: Subject to any disclaimer, the term of this patent is extended or adjusted under 35 U.S.C. 154(b) by 291 days.

(21) Appl. No.: 13/725,187

(22) Filed: Dec. 21, 2012

(65) Prior Publication Data

US 2013/0311186 A1 Nov. 21, 2013

(30) Foreign Application Priority Data

May 21, 2012 (KR) ......................... 10-2012-0053832

(51) Int. Cl.
  *G06F 17/30* (2006.01)
  *G10L 15/26* (2006.01)
  *G06F 3/16* (2006.01)
  *H04M 1/656* (2006.01)
  *H04M 1/725* (2006.01)

(52) U.S. Cl.
  CPC ............... *G10L 15/26* (2013.01); *G06F 3/167* (2013.01); *G06F 17/3074* (2013.01); *H04M 1/656* (2013.01); *H04M 1/72519* (2013.01); *H04M 2250/22* (2013.01)

(58) Field of Classification Search
  None
  See application file for complete search history.

(56) References Cited

U.S. PATENT DOCUMENTS

| | | | |
|---|---|---|---|
| 5,589,999 A * | 12/1996 | Hayat | G11B 5/00813 360/85 |
| 5,999,908 A * | 12/1999 | Abelow | G06Q 10/0639 434/118 |
| 6,031,573 A * | 2/2000 | MacCormack | G06F 17/30017 348/154 |
| 6,131,121 A * | 10/2000 | Mattaway et al. | 709/227 |

(Continued)

FOREIGN PATENT DOCUMENTS

| | | |
|---|---|---|
| JP | 2005-189454 A | 7/2005 |
| KR | 10-2000-0047360 A | 7/2005 |

(Continued)

*Primary Examiner* — Fariba Sirjani
(74) *Attorney, Agent, or Firm* — Birch, Stewart, Kolasch & Birch, LLP

(57) ABSTRACT

An electronic device for allowing the user not to terminate audio recording while at the same time checking the content corresponding to a recorded portion in real time during the audio recording, and a method of reproducing the audio signal. An electronic device according to an embodiment disclosed in the present disclosure may include a memory configured to store an audio signal being input; a display unit configured to display at least one of an item indicating a progressive state in which the audio signal is stored therein and an STT-based text for the audio signal; a user interface unit configured to receive the selection of a predetermined portion of the item indicating the progressive state or the selection of a partial character string of the text from the user; and a controller configured to reproduce an audio signal corresponding to the selected portion or the selected character string.

9 Claims, 57 Drawing Sheets

(56) References Cited

U.S. PATENT DOCUMENTS

| | | | |
|---|---|---|---|
| 6,173,115 B1* | 1/2001 | Willis | H04N 21/4333 386/343 |
| 6,205,427 B1* | 3/2001 | Itoh et al. | 704/260 |
| 6,212,497 B1* | 4/2001 | Araki et al. | 704/235 |
| 6,304,714 B1* | 10/2001 | Krause | G11B 27/031 386/235 |
| 6,448,486 B1* | 9/2002 | Shinsky | G10H 1/0025 84/613 |
| 6,744,967 B2* | 6/2004 | Kaminski | H04N 5/781 345/440.2 |
| 6,802,041 B1* | 10/2004 | Rehm | G06F 17/30017 707/E17.009 |
| 9,224,397 B2* | 12/2015 | Lee | G10L 15/26 |
| 2002/0120925 A1* | 8/2002 | Logan | A23L 1/3002 725/9 |
| 2003/0078930 A1* | 4/2003 | Surcouf | G11B 27/005 |
| 2003/0142956 A1* | 7/2003 | Tomita | G11B 27/034 386/241 |
| 2004/0153969 A1* | 8/2004 | Rhodes | 715/515 |
| 2004/0268387 A1* | 12/2004 | Wendling | H04N 5/4401 725/35 |
| 2005/0135782 A1* | 6/2005 | Ando | G11B 27/034 386/231 |
| 2006/0075347 A1* | 4/2006 | Rehm | 715/727 |
| 2006/0250650 A1* | 11/2006 | Narahara | H04H 60/37 358/1.18 |
| 2006/0253286 A1* | 11/2006 | Akabane et al. | 704/260 |
| 2007/0014404 A1* | 1/2007 | Cha | H04N 5/445 380/201 |
| 2007/0050299 A1* | 3/2007 | Sumida | G06F 9/5038 705/52 |
| 2007/0266414 A1* | 11/2007 | Kahn | H04N 7/162 725/113 |
| 2008/0031595 A1* | 2/2008 | Cho | G11B 27/34 386/278 |
| 2008/0037489 A1* | 2/2008 | Yitiz | H04M 1/72522 370/338 |
| 2008/0063361 A1* | 3/2008 | Saito | H04N 5/445 386/219 |
| 2009/0132242 A1* | 5/2009 | Wang | G10L 21/04 704/216 |
| 2009/0276419 A1* | 11/2009 | Jones | G06F 17/30637 |
| 2009/0291638 A1* | 11/2009 | Sugaya | G08C 17/00 455/41.2 |
| 2010/0061197 A1* | 3/2010 | Yoshikawa | H04M 1/7255 369/1 |
| 2010/0194986 A1* | 8/2010 | Jeong | G11B 27/105 348/570 |
| 2010/0239224 A1* | 9/2010 | Ide | G11B 27/005 386/343 |
| 2011/0131299 A1* | 6/2011 | Sardary | 709/219 |
| 2011/0161834 A1* | 6/2011 | Shadfar et al. | 715/753 |
| 2011/0224981 A1* | 9/2011 | Miglietta et al. | 704/235 |
| 2011/0286584 A1* | 11/2011 | Angel et al. | 379/88.02 |
| 2011/0288863 A1* | 11/2011 | Rasmussen | 704/235 |
| 2012/0023407 A1* | 1/2012 | Taylor | G06F 9/4443 715/731 |
| 2012/0081530 A1* | 4/2012 | Kerr | G11B 27/34 348/61 |
| 2012/0084455 A1* | 4/2012 | McCue et al. | 709/231 |
| 2012/0087638 A1* | 4/2012 | Han | H04N 5/44513 386/241 |
| 2012/0098946 A1* | 4/2012 | Seung | H04N 21/4307 348/61 |
| 2012/0245936 A1* | 9/2012 | Treglia | G06F 17/30746 704/235 |
| 2012/0296914 A1* | 11/2012 | Romanov et al. | 707/741 |
| 2012/0323796 A1* | 12/2012 | Udani | G06F 19/363 705/80 |
| 2013/0006627 A1* | 1/2013 | Guthery et al. | 704/235 |
| 2013/0046641 A1* | 2/2013 | DeVree | G06Q 30/0277 705/14.69 |
| 2013/0066630 A1* | 3/2013 | Roe | G10L 15/22 704/235 |
| 2013/0150115 A1* | 6/2013 | Maggenti | H04M 1/656 455/518 |
| 2013/0204414 A1* | 8/2013 | Yoshikawa | H04M 1/7255 700/94 |
| 2014/0013192 A1* | 1/2014 | McQuiggan | G09B 5/062 715/203 |

FOREIGN PATENT DOCUMENTS

| | | |
|---|---|---|
| KR | 10-2009-0120669 A | 11/2009 |
| KR | 10-2010-0018408 A | 2/2010 |

* cited by examiner

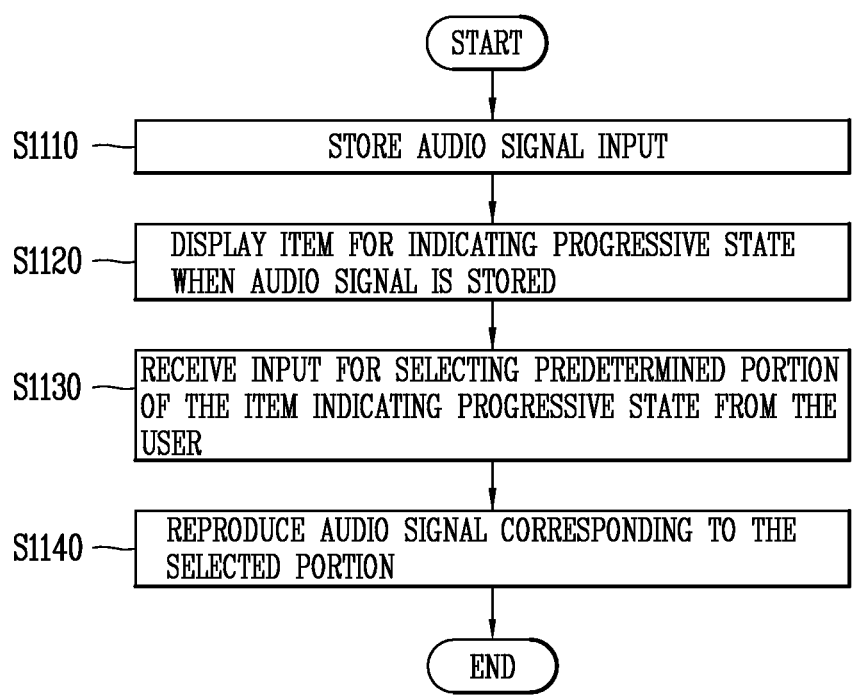

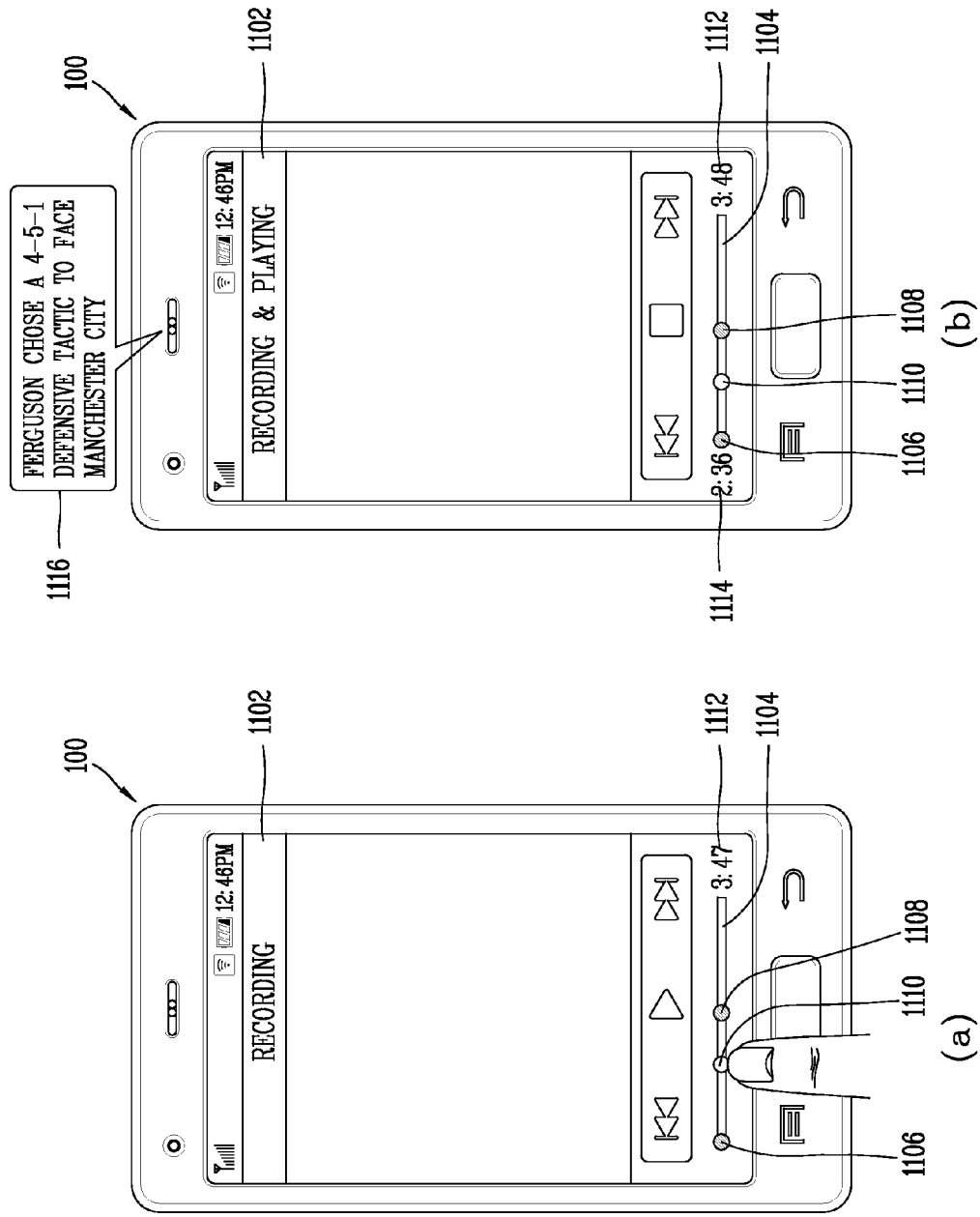

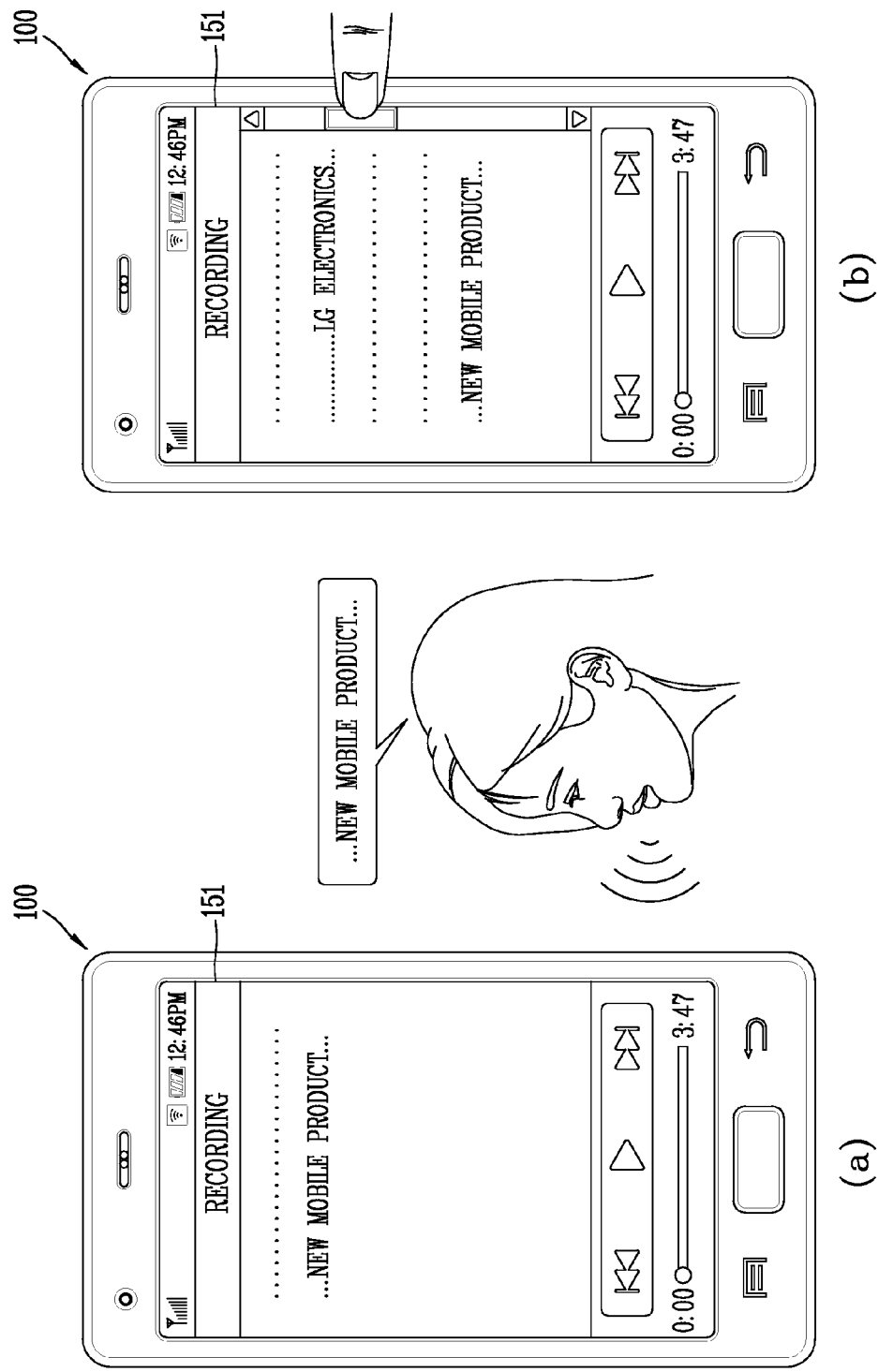

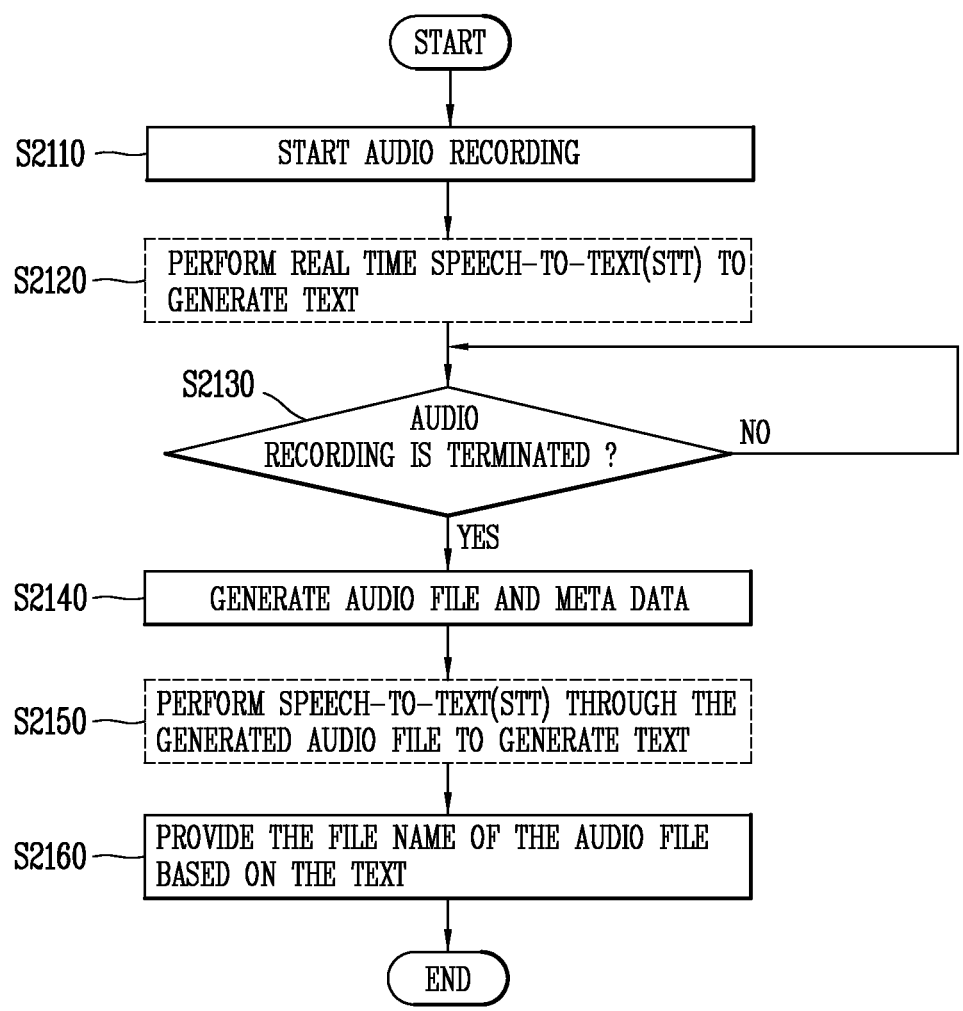

FIG. 6C

| TEMPORARY FILE NAME | STORED FILE NAME | STT-BASED TEXT | DATE | ATTENDEE | META DATA |
|---|---|---|---|---|---|
| AUD00001 | 20110403 NEW PRODUCT DEVELOPMENT MEETING FOR MOBILE PHONES | NEW PRODUCT DEVELOPMENT MEETING FOR MOBILE PHONES | 2011-04-03 | ALICE, BOB, CHARLIE | LOCATION:YEOUIDO SEOUL CONTACT ADDRESSES |
| AUD00002 | 20110505 LTE RELATED ARTICLES SCRAP | LTE RELATED ARTICLES SCRAP | 2011-05-05 | BOB, CHARLIE | LOCATION:GANGNAM SEOUL CONTACT ADDRESSES |
| AUD00003 | 20120404 ANTENNA DESIGN MEETING | ANTENNA DESIGN MEETING | 2012-04-04 | CHARLIE, ALICE | LOCATION:MYEONGDONG SEOUL CONTACT ADDRESSES |

FIG. 6D

| TEMPORARY FILE NAME | STORED FILE NAME | STT-BASED TEXT | DATE | ATTENDEE | META DATA |
|---|---|---|---|---|---|
| AUD00001 | NEW PRODUCT DEVELOPMENT MEETING FOR MOBILE PHONES LAST YEAR | NEW PRODUCT DEVELOPMENT MEETING FOR MOBILE PHONES | 2011-04-03 | ALICE, BOB, CHARLIE | LOCATION:YEOUIDO SEOUL CONTACT ADDRESSES |
| AUD00002 | LTE RELATED ARTICLES SCRAP LAST YEAR | LTE RELATED ARTICLES SCRAP | 2011-05-05 | BOB, CHARLIE | LOCATION:GANGNAM SEOUL CONTACT ADDRESSES |
| AUD00003 | ANTENNA DESIGN MEETING ON APRIL 4, THIS YEAR | ANTENNA DESIGN MEETING | 2012-04-04 | CHARLIE, ALICE | LOCATION:MYEONGDONG SEOUL CONTACT ADDRESSES |

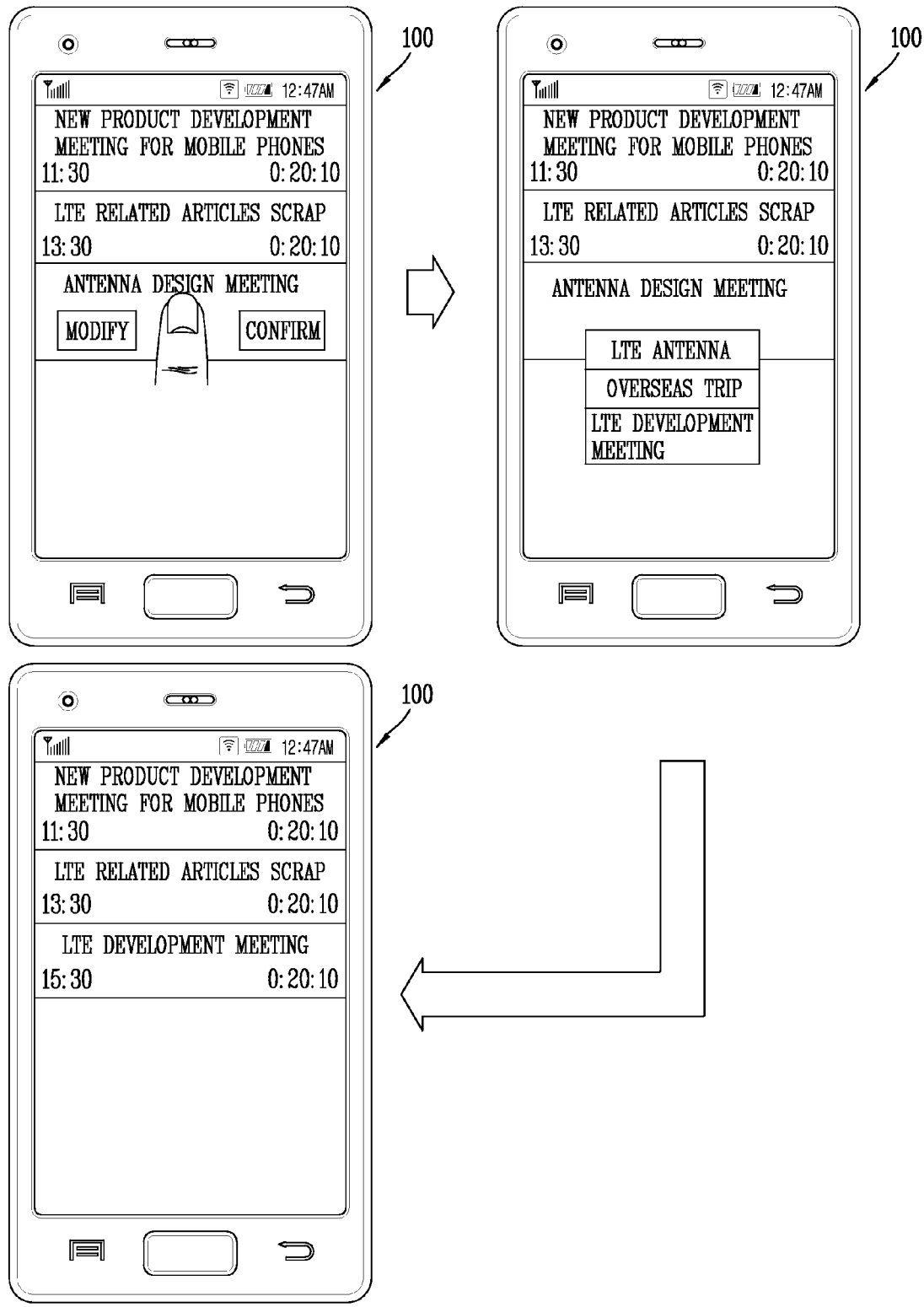

(a)

(b)

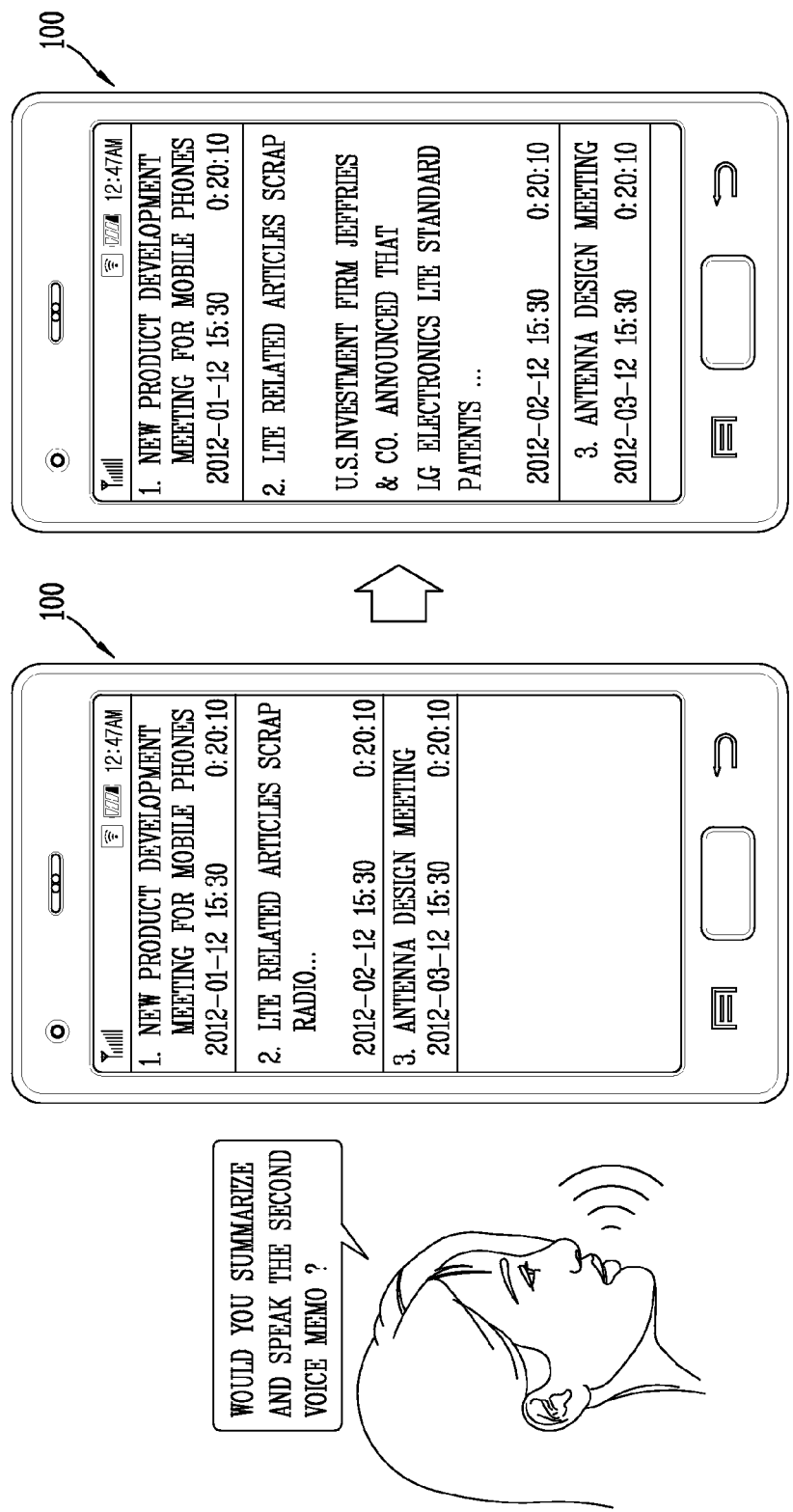

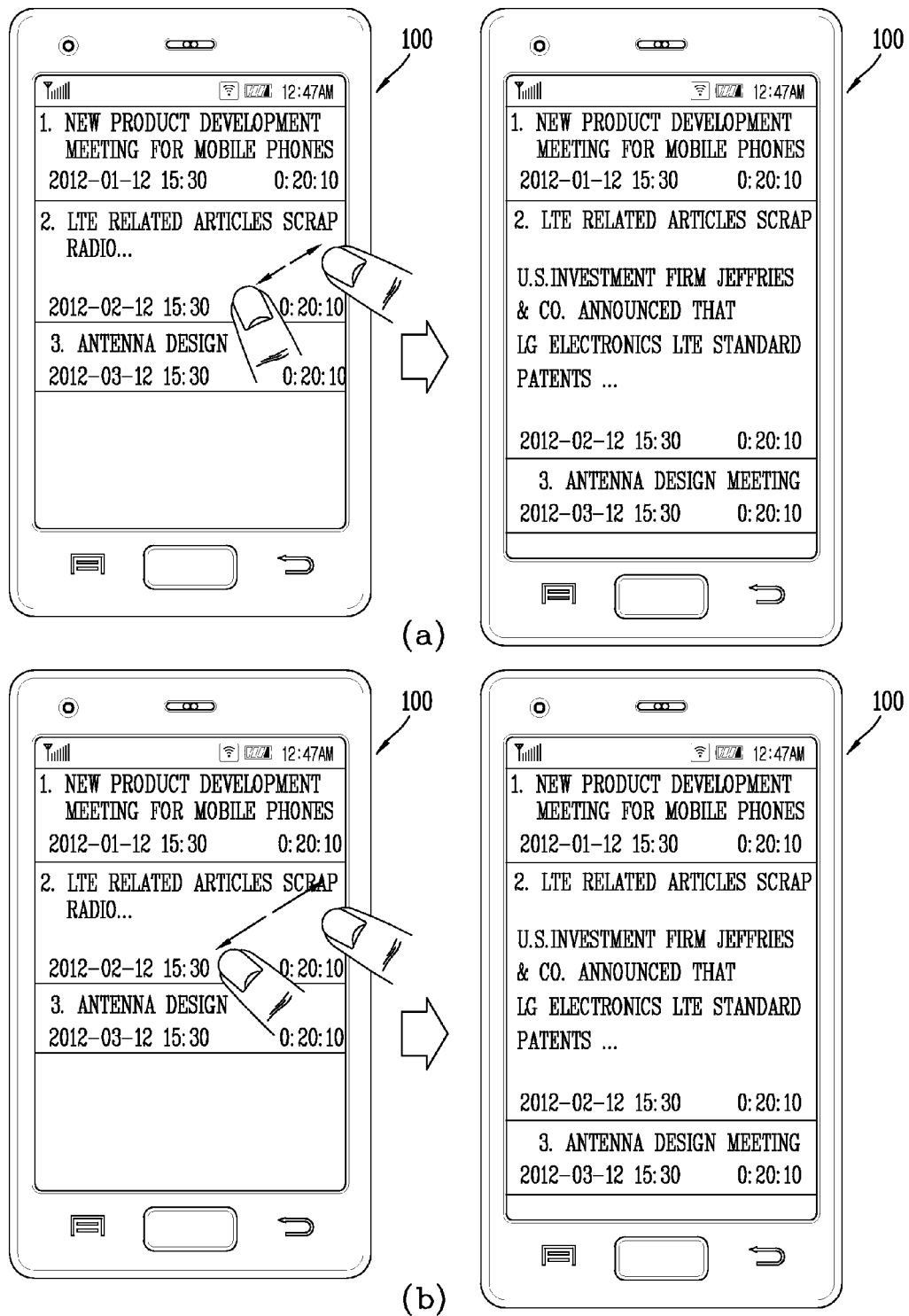

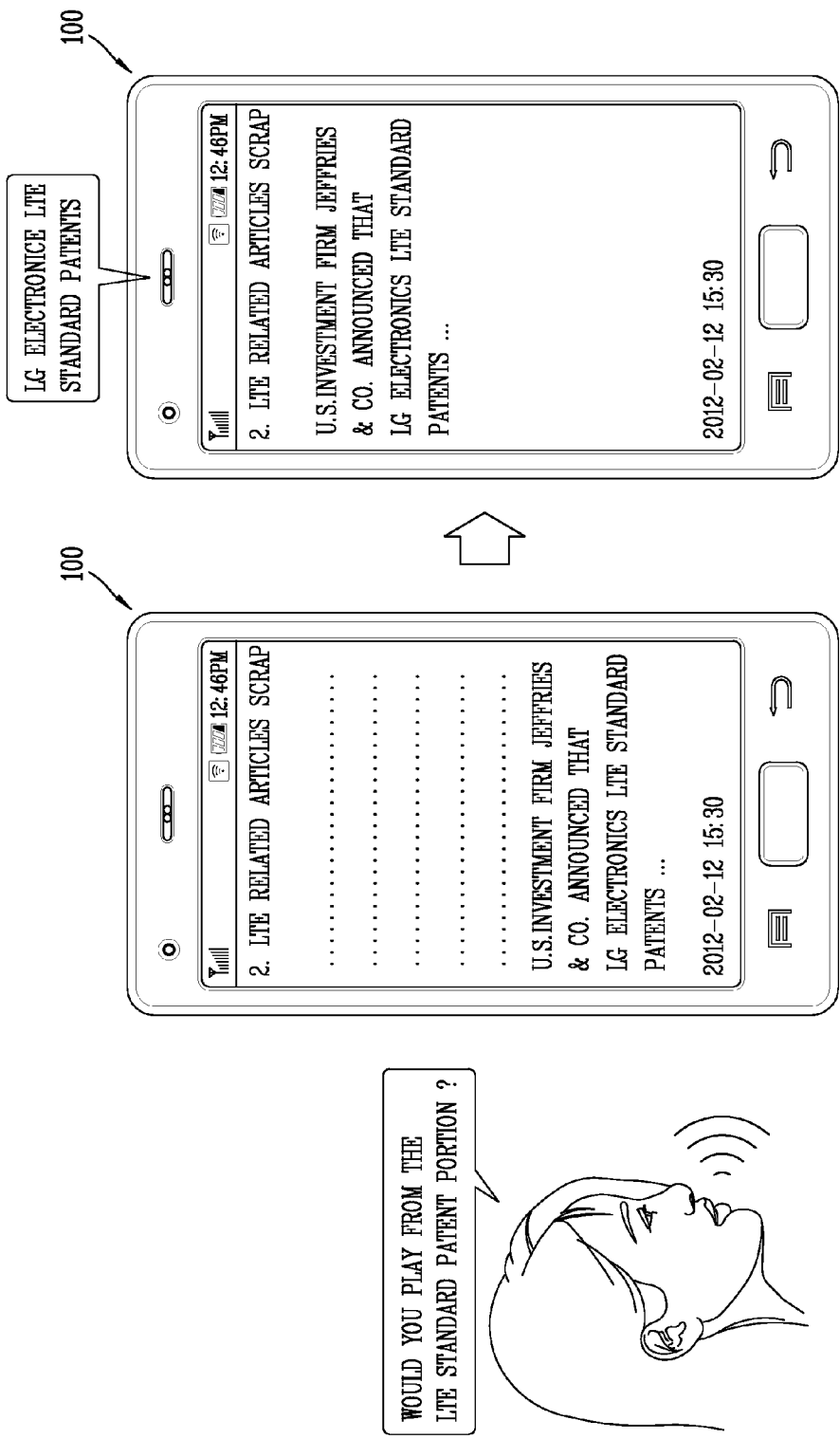

(a)　　　　　　　　(b)

(a)            (b)

(a)

(b)

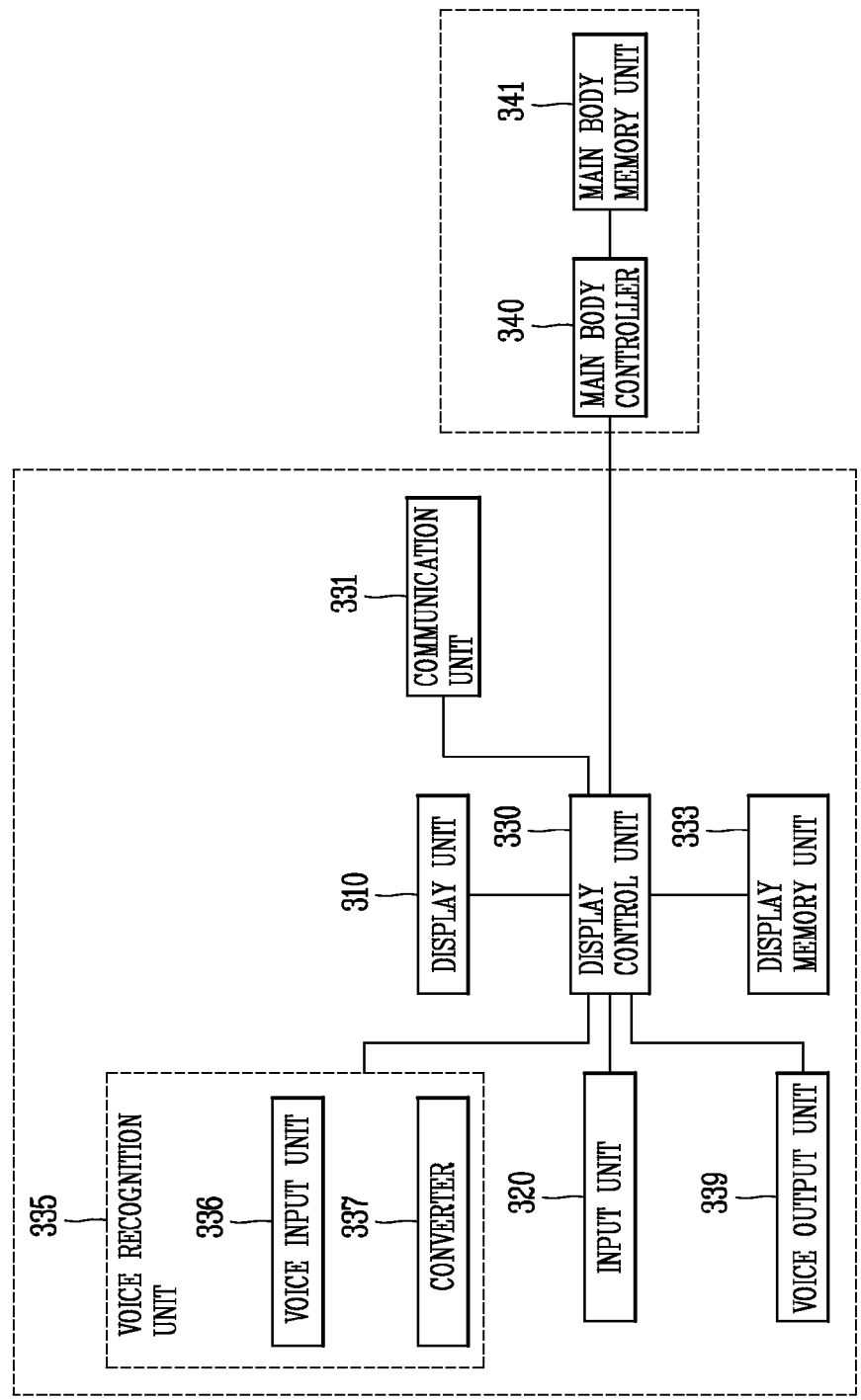

METHOD AND ELECTRONIC DEVICE FOR EASY SEARCH DURING VOICE RECORD

CROSS-REFERENCE TO RELATED APPLICATION

Pursuant to 35 U.S.C. §119(a), this application claims the benefit of earlier filing date and right of priority to Korean Application No. 10-2012-0053832, filed on May 21, 2012, the contents of which are incorporated by reference herein in their entirety.

BACKGROUND OF THE INVENTION

1. Field of the Invention

The present invention relates to a method for displaying text associated with an audio file and an electronic device for implementing the same.

2. Background of the Invention

With the rapid development of the information age, the importance of an information input/output function and a data storage function has been emphasized in an electronic device. The electronic device having those functions can be classified into a portable electronic device such as a mobile station and a stationary electronic device such as an image display device, a refrigerator, and the like.

As the functions become diversified, the mobile station is implemented in the form of a multimedia player having complicated functions such as capturing still or moving images, playing music or video files, gaming, receiving broadcast signals, and the like. Furthermore, those complicated functions may be also applicable to a stationary electronic device for the user's convenience.

In recent years, in order to implement such complicated functions, various new attempts have been applied in the aspect of the hardware or software. As an example, a user interface environment is provided to allow the user to easily and conveniently perform audio recording or retrieve and select audio files.

In general, audio recording may be implemented through a process of converting an analog voice signal being input in real time into a digital signal to store it in the buffer, and generating an audio file using the data temporarily stored in the buffer to store it in the memory.

The user may need to check the content of audio recording that was carried out at a previous time point such several seconds ago or several minutes ago during the audio recording (and prior to terminating the audio recording). To this end, the user may terminate audio recording being currently carried out, and then reproduce the stored audio file to check his or her desired content.

However, terminating audio recording every time and then reproducing the audio file, and then restarting recording again to check the content of audio recording carried out at a previous time point may be burdensome as well as somewhat ineffective for the user.

SUMMARY OF THE INVENTION

Accordingly, an objective of the present disclosure is to provide a method of allowing the user not to terminate audio recording while at the same time checking the content corresponding to a recorded portion in real time during the audio recording.

In order to solve the foregoing task, an electronic device according to an embodiment disclosed herein may include a memory configured to store an audio signal being input; a display unit configured to display at least one of an item indicating a progressive state in which the audio signal is stored therein and an STT-based text for the audio signal; a user interface unit configured to receive the selection of a predetermined portion of the item indicating the progressive state or the selection of a partial character string of the text from the user; and a controller configured to reproduce an audio signal corresponding to the selected portion or the selected character string.

According to an embodiment, the user interface unit may receive the selection of a predetermined portion of the item indicating the progressive state while receiving the audio signal. Furthermore, according to an embodiment, the electronic device may further include an audio output unit configured to output an audio signal corresponding to the selected portion. Furthermore, according to an embodiment, the electronic device may further include an interface unit configured to output an audio signal corresponding to the selected portion to an earphone.

Furthermore, according to an embodiment, the display unit may display text into which an audio signal corresponding to the selected portion has been converted. Furthermore, the converted text may be a text into which the audio signal has been converted using a speech-to-text (STT) technology. Furthermore, the controller may convert the audio signal being input into text, and the memory may store the converted text. Furthermore, the controller may convert an audio signal corresponding to the selected portion into text.

Furthermore, according to an embodiment, the item indicating the progressive state may be a progress bar. Furthermore, according to an embodiment, the memory may store the time information of the audio signal being stored. Furthermore, according to an embodiment, the display unit may display the time information of an audio signal corresponding to the selected portion. Furthermore, according to an embodiment, the memory may continue to store the audio signal being input while reproducing the audio signal corresponding to the selected portion.

On the other hand, in order to solve the foregoing task, there is provided a method of reproducing an audio signal in an electronic device according to an embodiment disclosed herein, and the method may include storing an audio signal being input; displaying at least one of an item indicating a progressive state in which the audio signal is stored therein and an STT-based text for the audio signal; receiving the selection of a predetermined portion of the item indicating the progressive state or the selection of a partial character string of the text from the user; and reproducing an audio signal corresponding to the selected portion or the selected character string.

According to an embodiment, said receiving step may be receiving the selection of a predetermined portion of the item indicating the progressive state while receiving the audio signal. Furthermore, according to an embodiment, said reproducing step may include outputting an audio signal corresponding to the selected portion in an auditory manner. Furthermore, according to an embodiment, said reproducing step may include outputting an audio signal corresponding to the selected portion to an earphone.

Furthermore, according to an embodiment, said reproducing step may include outputting text into which an audio signal corresponding to the selected portion has been converted. Furthermore, according to an embodiment, the converted text may be a text into which the audio signal has been converted using a speech-to-text (STT) technology. Furthermore, according to an embodiment, said storing step may include converting the audio signal being input into text; and storing the converted text. Furthermore, according to an embodiment, said reproducing step may include converting an audio signal corresponding to the selected portion into text.

Furthermore, according to an embodiment, the item indicating the progressive state may be a progress bar. Furthermore, according to an embodiment, the method may further include storing the time information of the audio signal being stored. Furthermore, according to an embodiment, the method may further include displaying the time information of an audio signal corresponding to the selected portion. Furthermore, according to an embodiment, the method may further include continuously storing the audio signal being input while reproducing the audio signal corresponding to the selected portion.

BRIEF DESCRIPTION OF THE DRAWINGS

The accompanying drawings, which are included to provide a further understanding of the invention and are incorporated in and constitute a part of this specification, illustrate embodiments of the invention and along with the description serve to explain the principles of the invention.

In the drawings:

FIGS. 3A through 3D are views illustrating a first operation control process of a mobile terminal according to a first embodiment disclosed herein;

FIGS. 6A through 6G are views illustrating an operation control process of a mobile terminal according to a second embodiment disclosed herein;

FIGS. 7A through 7E are views illustrating an operation control process of a mobile terminal according to a third embodiment disclosed herein;

FIGS. 8A through 8J are views illustrating an operation control process of a mobile terminal according to a third embodiment disclosed herein;

FIG. 16 is a block diagram illustrating a display controller and a main body controller contained in a refrigerator when an electronic device according to an embodiment of the present disclosure is the refrigerator.

DETAILED DESCRIPTION OF THE INVENTION

Figure 1:
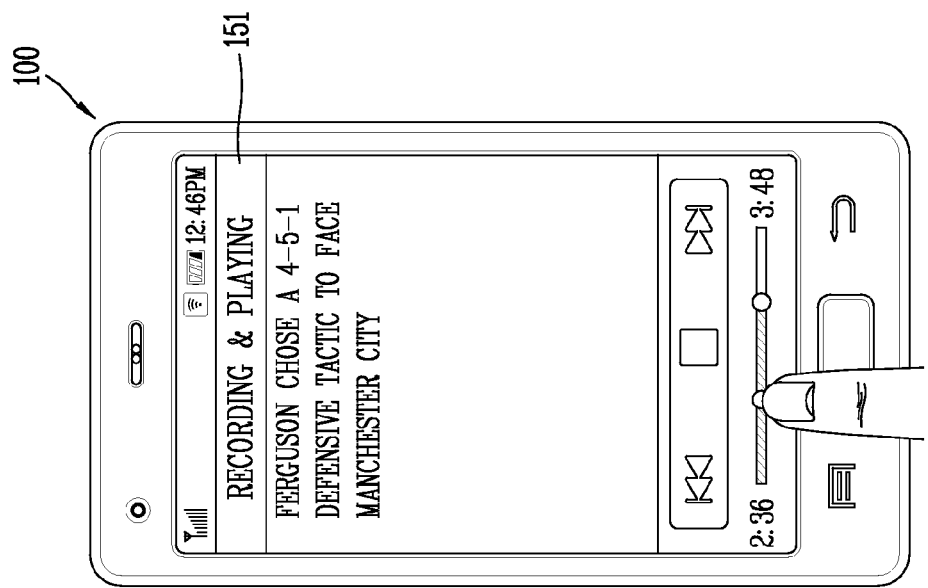
FIG. 1 is a conceptual view illustrating a representative operation that can be implemented according to the present disclosure in a mobile terminal.
Figure 1:
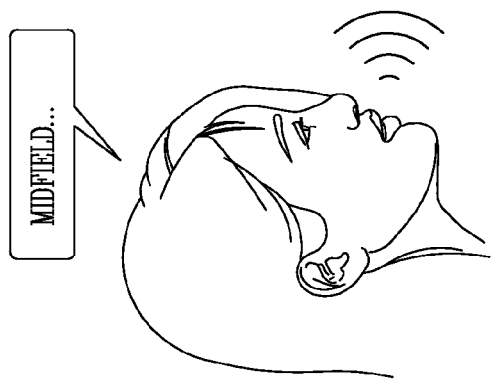

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the concept of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The suffixes "module" and "unit or portion" for components used herein may be merely provided only for facilitation of preparing this specification, and thus they are not granted to have a distinctive meaning or function.

Furthermore, the terms including an ordinal number such as first, second, etc. in the present disclosure can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, the embodiments disclosed herein will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the concept of the invention, and therefore, they should not be construed to limit the technological concept disclosed herein by the accompanying drawings.

A mobile electronic device disclosed herein may include a portable phone, a smart phone, a laptop computer, a digital broadcast mobile device, a personal digital assistant (PDA), a portable multimedia player (PMP), a navigation, a slate PC, a tablet PC, an untrabook, and the like. Hereinafter, various embodiments according to the present disclosure is based on a mobile terminal such as a portable phone, a smart phone, and the like, but a function applied to the mobile terminal may be also applicable to a stationary electronic device such as a digital TV, a desktop computer, a refrigerator, a projector, and the like, as well as to a portable electronic device that does not use a communication network such as a PMP or the like.

FIG. 1 is a conceptual view illustrating a representative operation that can be implemented according to the present disclosure in a mobile terminal.

The mobile terminal 100 drives a recording application according to a user's request. For the operation, a plurality of applications including the recording application may be stored in the storage unit of the mobile terminal 100. Referring to FIG. 1, a graphic user interface (GUI) of the recording application is displayed on the display unit 151 by driving the recording application. Furthermore, the mobile station records an external sound as an audio file using the recording application.

In this case, a speech-to-text (STT) execution application may be driven along with the driving of a recording application. For another example, an icon for receiving the selection of whether to execute STT during the driving of a recording application may be popped up. Furthermore, though not shown in the drawing, a text converted by STT may be displayed on the display unit 151 in linkage with the progress of recording.

According to the drawing, the recording application may perform recording and reproduction at the same time. For example, when a time point prior to the current time point is selected, the controller 180 (refer to FIG. 4) reproduce the recorded voice from the selected time point. Even in this case, the controller does not terminate currently progressed voice recording, and thus the user's voice continues to be recorded. As an example of the reproduction, the display unit 151 may display recorded voice converted text from the selected time point.

When a specific time point is reproduced during recording through the foregoing process, the user may check previously recorded voice during recording.

A retrieval method of the voice being recorded may be associated with a series of processes such as recording, storage and reproduction. Accordingly, the series of processes will be divided into embodiments and described below in detail, and the process of retrieving the voice being recorded will be described in detail in one of the foregoing embodiments.

Figure 2:
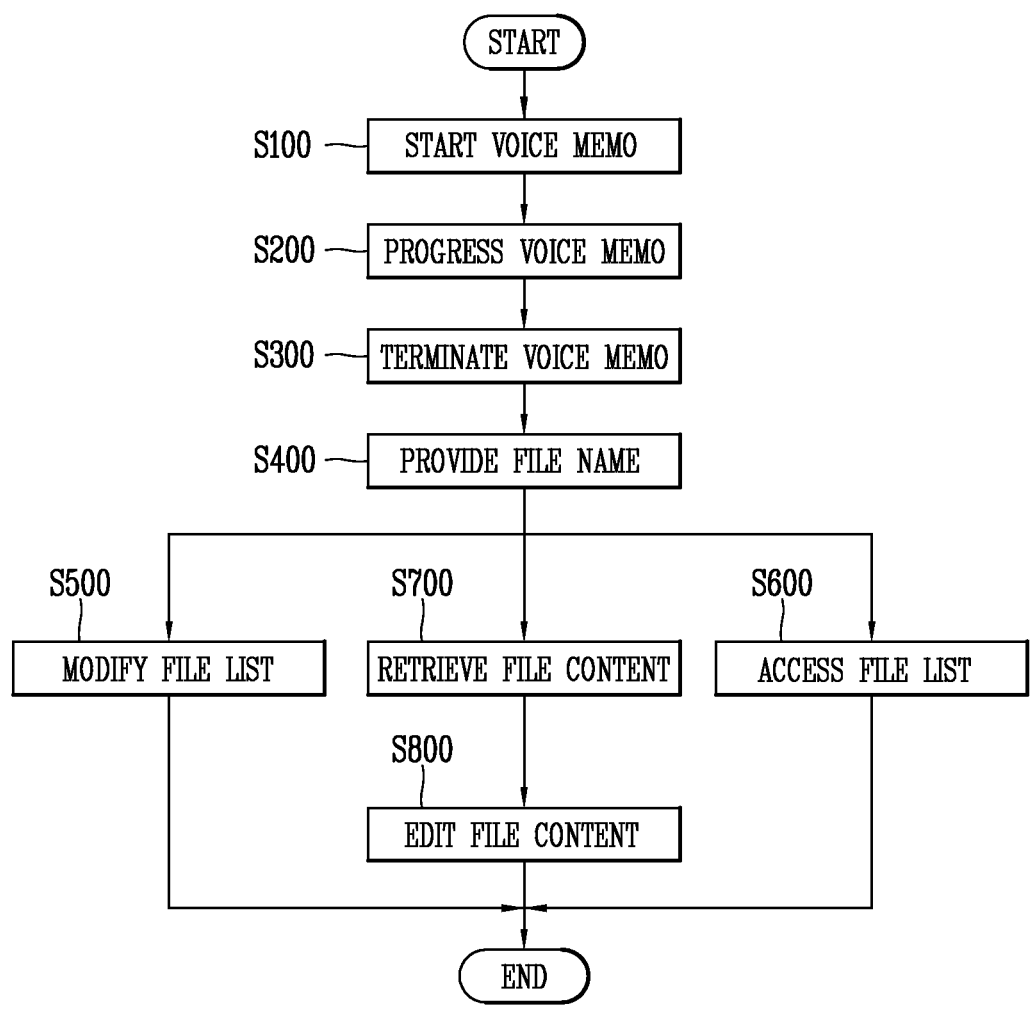
FIG. 2 is a flow chart illustrating an operation control process of a mobile terminal according to the embodiments disclosed therein.

FIG. 2 is a flow chart illustrating the entire operation control process of a mobile terminal according to the embodiments disclosed therein.

The mobile terminal 100 performs the steps of starting a voice memo (S100), progressing the voice memo (S200), and terminating the voice memo (S300). A first embodiment disclosed herein will be described with reference to FIGS. 3A through 5D regarding the step of progressing the voice memo (S200).

Furthermore, when the vice memo is terminated (S300), the mobile terminal 100 performs the steps of providing a file name (S400) and modifying the file name (S500). A second embodiment disclosed herein will be described with reference to FIGS. 6A through 6G regarding the step of providing a file name (S400), and with reference to FIGS. 7A through 7E regarding the step of modifying the file name (S500).

Furthermore, the mobile terminal 100 performs the step of accessing a file list (S600). Regarding this, a third embodiment disclosed herein will be described with reference to FIGS. 8A through 8J.

Furthermore, the mobile terminal 100 performs the steps of retrieving the file content (S700) and editing the file content (S800). A fourth embodiment disclosed herein will be described with reference to FIGS. 9A through 10B regarding the step of editing the file content (S800). In addition, a fifth embodiment disclosed herein with reference to FIGS. 11A through 11C, a sixth embodiment disclosed herein with reference to FIGS. 12A through 12G, and finally, a seventh embodiment disclosed herein will be described with reference to FIGS. 13A through 13C regarding the step of retrieving the file content (S700).

In general, an audio recording process is carried out through the process of converting an analog voice into a digital form to store it in the buffer when audio recording is started, and generating an audio file to store it in the memory using data stored in the buffer when audio recording is terminated. However, the user may want to control a voice being recorded during the recording (and prior to terminating the audio recording) according to circumstances. A first embodiment which will be described below relates to an operation for controlling a voice being recorded while continuously progressing the recording, and the first embodiment may include various operation examples.

First, a first operation control process will be described with reference to FIGS. 3A through 3D.

Figure 3C:
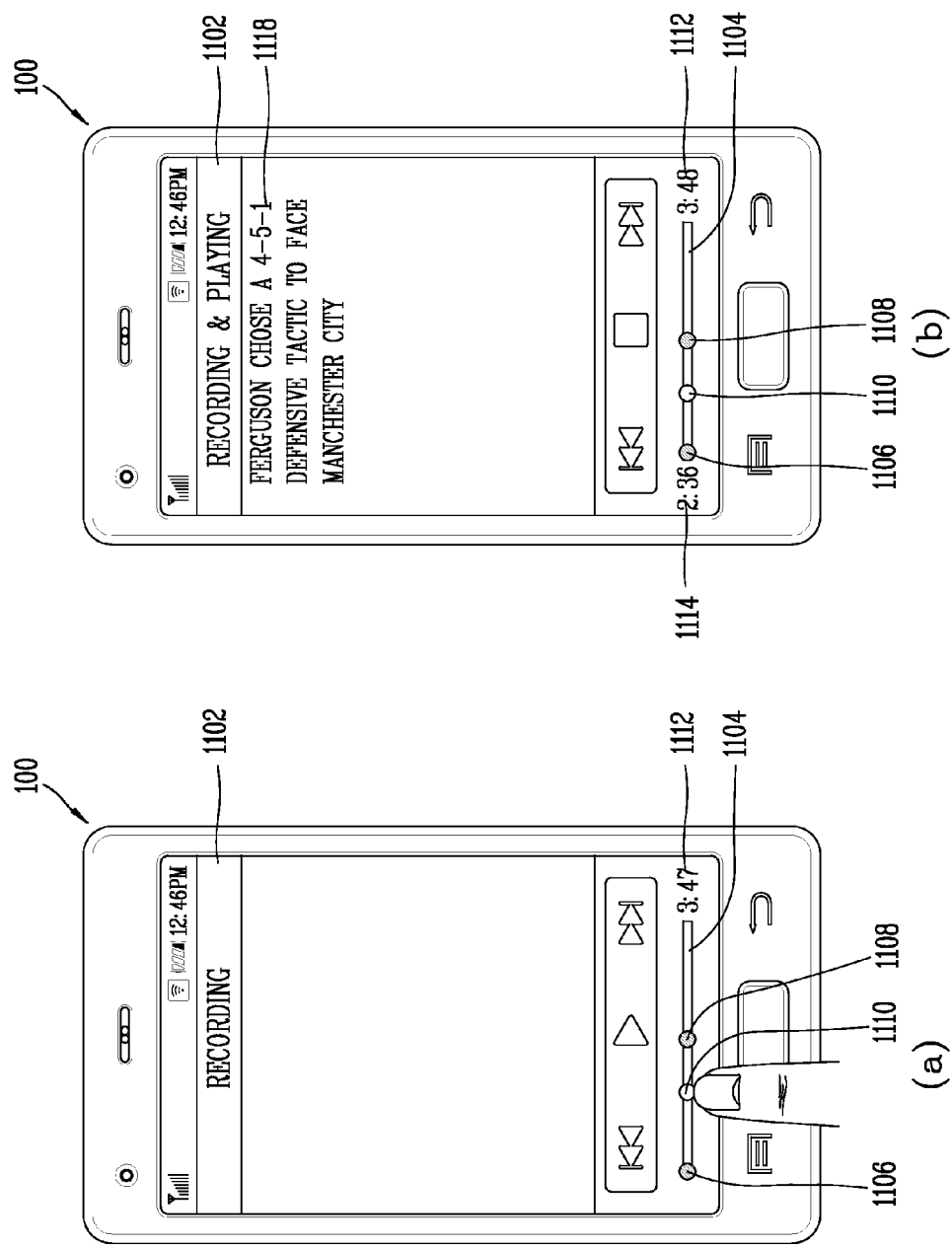

FIGS. 3A through 3C are views illustrating a first operation control process of a mobile terminal according to a first embodiment disclosed herein.

The user may be required to check the content of audio recording that has been made at a previous time point such as several seconds or several minutes ago during the audio recording. To this end, the user may terminate audio recording currently being progressed and reproduce the generated audio file to check his or her desired content. However, terminating audio recording and reproducing the generated audio file and then restarting recording is burdensome as well as ineffective.

Accordingly, a first operation control process according to a first embodiment disclosed herein is related to a method of allowing the user to check audio recording corresponding to a previous time point during the audio recording in real time without terminating the audio recording.

FIG. 3A is a flow chart illustrating a process in which the mobile terminal 100 according to a first operation control process disclosed herein reproduces the recorded content during the audio recording, and FIGS. 3B through 3D are conceptual views illustrating a process in which the mobile terminal 100 reproduces the recorded content during the audio recording.

Referring to FIG. 3A, the memory 160 (refer to FIG. 14 below) stores an audio signal input through the microphone 122 (refer to FIG. 14 below), for example (S1110). The controller 180 (refer to FIG. 14 below) converts the input audio signal into a digital form to store it in a predetermined region of the memory 160, for example, buffer. Furthermore, the controller 180 may store the time information of the stored audio signal. The time information may include information on a time that has been elapsed until the relevant audio signal is received or stored after starting recording.

When the mobile terminal 100 converts the input audio signal into a text, the controller 180 may convert the input audio signal into a text, for example, using a speech-to-text (STT) function or algorithm. The controller 180 may store the converted text in the memory 160. In this case, a speech-to-text (STT) execution application may be driven in linkage with a recording application.

During the storage of an audio signal, the display unit 151 (refer to FIG. 14 below) displays an item for indicating a progressive state of the audio signal being stored (S1120). The item for indicating a progressive state may be a progress bar. The progress bar may include an indicator indicating a current time point of the whole recorded portion. When the whole recorded portion is not revealed, the indicator indicating a current time point is displayed at the middle of the progress bar. The progress bar may visually display a current recorded time (for example, 3 minutes) within the whole recorded time (for example, 5 minutes).

As a more specific example, referring to FIG. 3B(a), the controller 180 displays an audio recording screen on the display unit 151 when an audio recording function execution request, for example, an audio recording function, is carried out according to the user's input. The audio recording screen may include an indicator 1102 indicating a function execution state and a progress bar 1104 indicating a recording progress state.

The indicator 1102 indicating a function execution state reflects a current function execution state such as "Recording" or "Playing", for example.

The progress bar 1104 may include an indicator 1106 indicating a start time point of recording and an indicator 1108 indicating a current recording time point to indicate a recording progress state, and the display unit 151 displays time information 1112 indicating a current recording time along with the progress bar 1104.

Referring to FIG. 3A along with FIG. 3B, for the next step, the user input unit 130 (refer to FIG. 14 below) receives an input for selecting a predetermined portion of the item indicating the progressive state from the user (S1130). For example, the user input unit 130 receives an input selecting a predetermined portion of the item indicating the progressive state while receiving an audio signal.

To this end, the mobile terminal 100 can monitor whether a previous time point reproduction command is received. The previous time point reproduction command may be a command for allowing the user to select a specific time point corresponding to a time point prior to a current time point on the progress bar. Otherwise, it may be a command for selecting a time point prior to a specific time from a current time point, such as 10 seconds ago, 1 minute ago, or the like.

As an example of the selection command, the user may touch any one of time points prior to a current recording time point on the progress bar 1104, or drag the indicator 1106 indicating a recording start time point or the indicator 1108 indicating a current recording time point to any one of time points prior to a current recording time point. In this case, the display unit 151 may display another indicator 1110 indicating the selected time point (reproduction time point).

Referring to FIG. 3A again, for the next step, the controller 180 reproduces an audio signal corresponding to the selected portion (or selected text string) (S1140). As the controller 180 reproduces the audio signal, an audio signal corresponding to the selected portion may be auditorily output through an earphone, a speaker or a receiver, or a text converted from the voice may be visually displayed through the display. Furthermore, the display unit 151 may display the time information of an audio signal corresponding to the selected portion.

For example, as illustrated in FIG. 3B(b), when a time point prior to a current recording time point is selected, the controller 180 reproduces the recorded audio from the selected time point. Furthermore, the display unit 151 changes the indicator 1102 indicating a function execution state to indicate that recording and playing are carried out at the same time, such as "Recording & Playing", for example. Furthermore, the indicator 1110 indicating the selected time point (reproduction time point) moves on the progress bar 1104 to reflect a reproduction time point on the display unit 151. Furthermore, the display unit 151 may display time information 1114 indicating the reproduction time point along with the progress bar 1104.

For another example, when the user selects a time point prior to a current time point as illustrated in FIG. 3C(a), the display unit 151 may display a text 1118 converted from a recorded voice from the relevant time point as illustrated in FIG. 3C(b).

On the other hand, the controller 180 does not suspend currently progressing audio recording while reproducing the recorded audio from a previous time point. In other words, the controller 180 may reproduce the recorded audio at a previous time point while recording audio at a current time point, and the memory 160 may continuously store an audio signal being input while reproducing an audio signal corresponding to the selected portion. Accordingly, the mobile terminal 100 monitors whether an audio recording end command is received, and terminates audio recording upon receiving the audio recording end command.

For another example, referring to FIG. 3D, the mobile terminal 100 may convert a voice being recorded into a text based on STT to display the converted text on the display unit 151. For example, as illustrated in FIG. 3D(a), one or more texts based on the execution of a speech-to-text (STT) (hereinafter 'STT-based text') for an audio signal that has been received from the start of recording up to a current time point may be displayed on the display unit 151.

However, the present disclosure is not limited to this. For example, the controller 180 may display an STT-based text for an audio signal that has been received from a predetermined previous time point up to a current time point or display a representative text string for each specific unit (for example, paragraph) of an STT-based text for an audio signal that has been received from the start of recording up to a current time point. Otherwise, the display unit 151 may display an item indicating a progressive state in which the audio signal is being stored along with an STT-based text for the stored audio signal.

In this case, as illustrated in FIG. 3D(b), the displayed text is formed to be scrolled, and thus the user can retrieve his or her desired portion while recording is being progressed. Furthermore, the user input unit 130 is formed to receive the selection of a partial text string or keyword from the STT-based text displayed on the display unit 151. The selected text string or keyword may be used for the setting of a file name, a bookmark or the like, and they will be described later.

According to a first operation control process of the foregoing first embodiment, the user conveniently can check the content of previous recording without terminating audio recording during the audio recording. Furthermore, the user can control recording and reproduction at the same time through an intuitive user interface using a progress bar or text.

FIGS. 4A through 4D are views illustrating a second operation control process of a mobile terminal according to a first embodiment disclosed herein.

In general, there is a portion desired to be particularly memorized or highlighted by the user during the audio recording process. However, the process of retrieving the content of an audio file is not intuitive (in the aspect of auditory characteristics compared to visual characteristics), and as a result, there may exist difficulty in retrieving the relevant portion again later. Furthermore, it may be burdensome to store the recording time of a portion desired to be memorized or highlighted in advance and retrieve it later.

Accordingly, the second operation control process is related to a method of writing a specific time point through an input with a familiar pattern that can be instantaneously applied to a portion desired to be memorized or highlighted by the user during the audio recording.

Figure 4A:
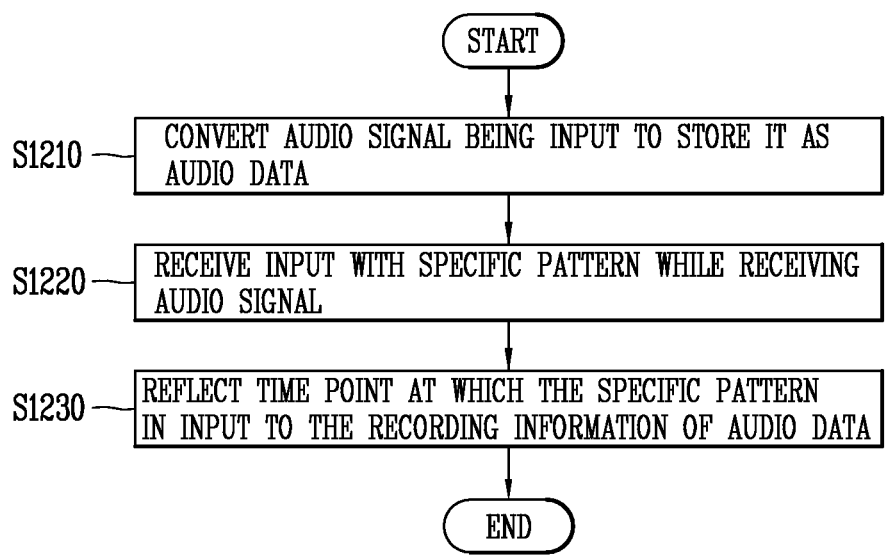
FIGS. 4A through 4D are views illustrating a second operation control process of a mobile terminal according to a first embodiment disclosed herein.
Figure 4B:
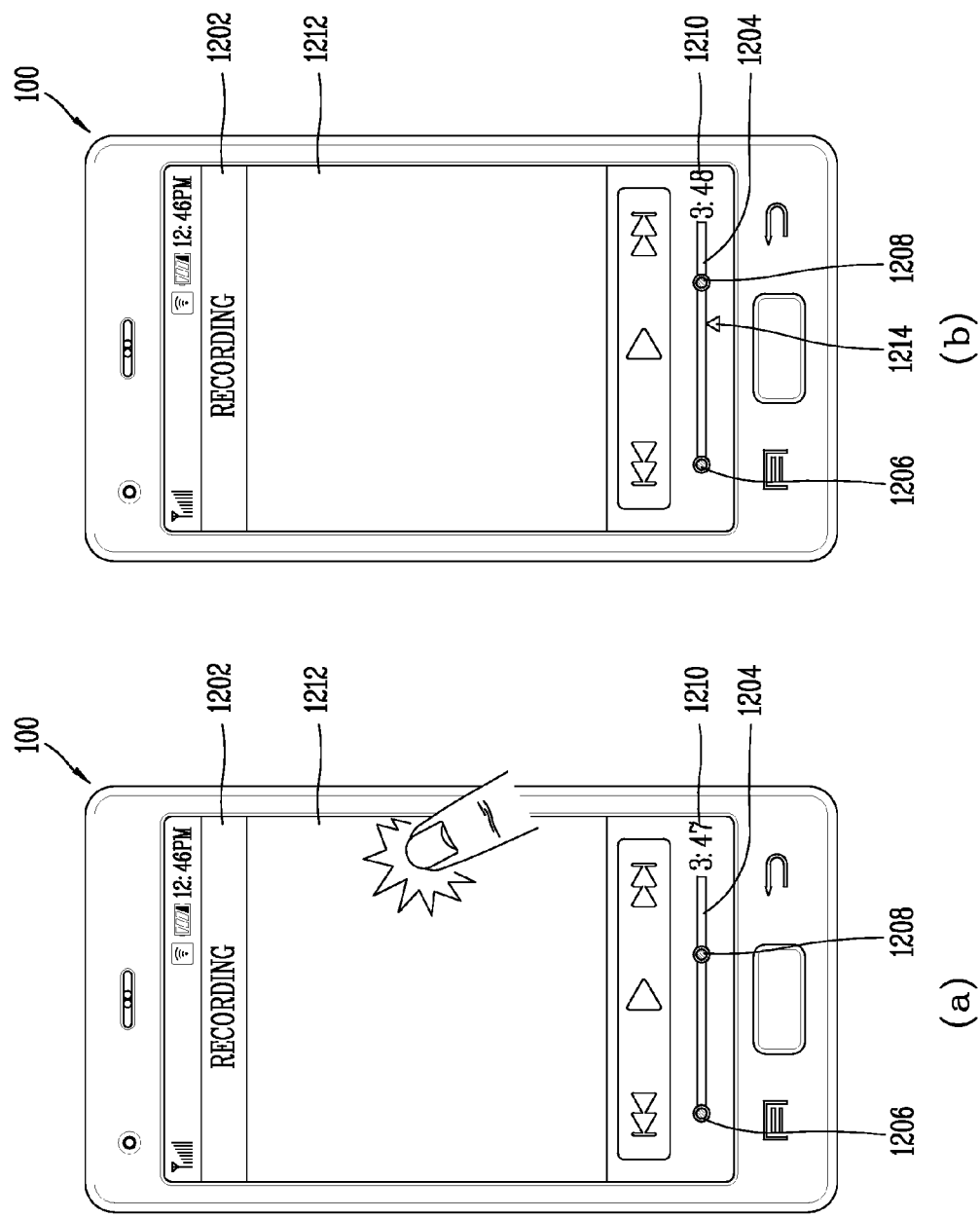
Figure 4C:
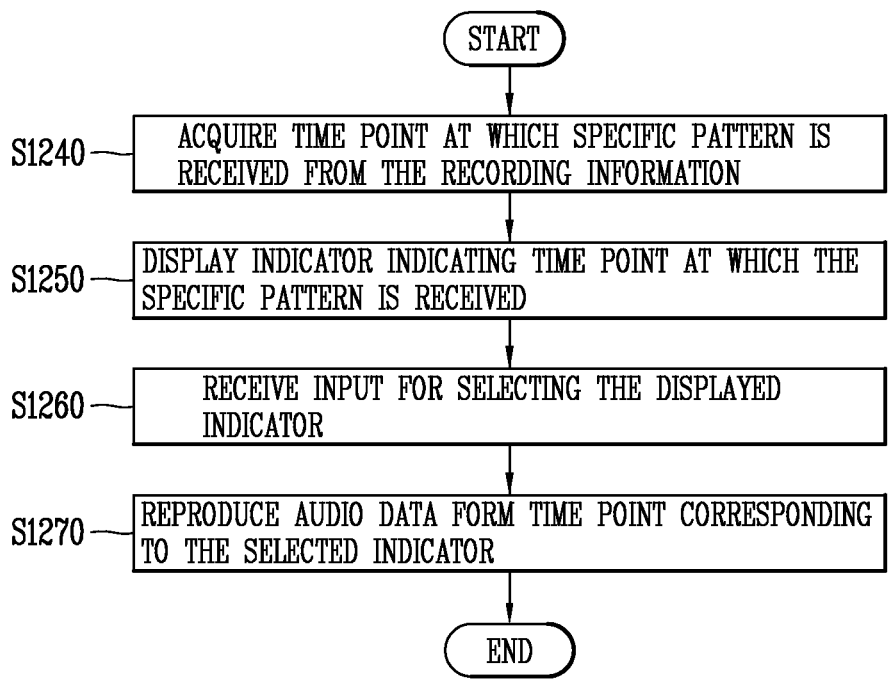
Figure 4D:
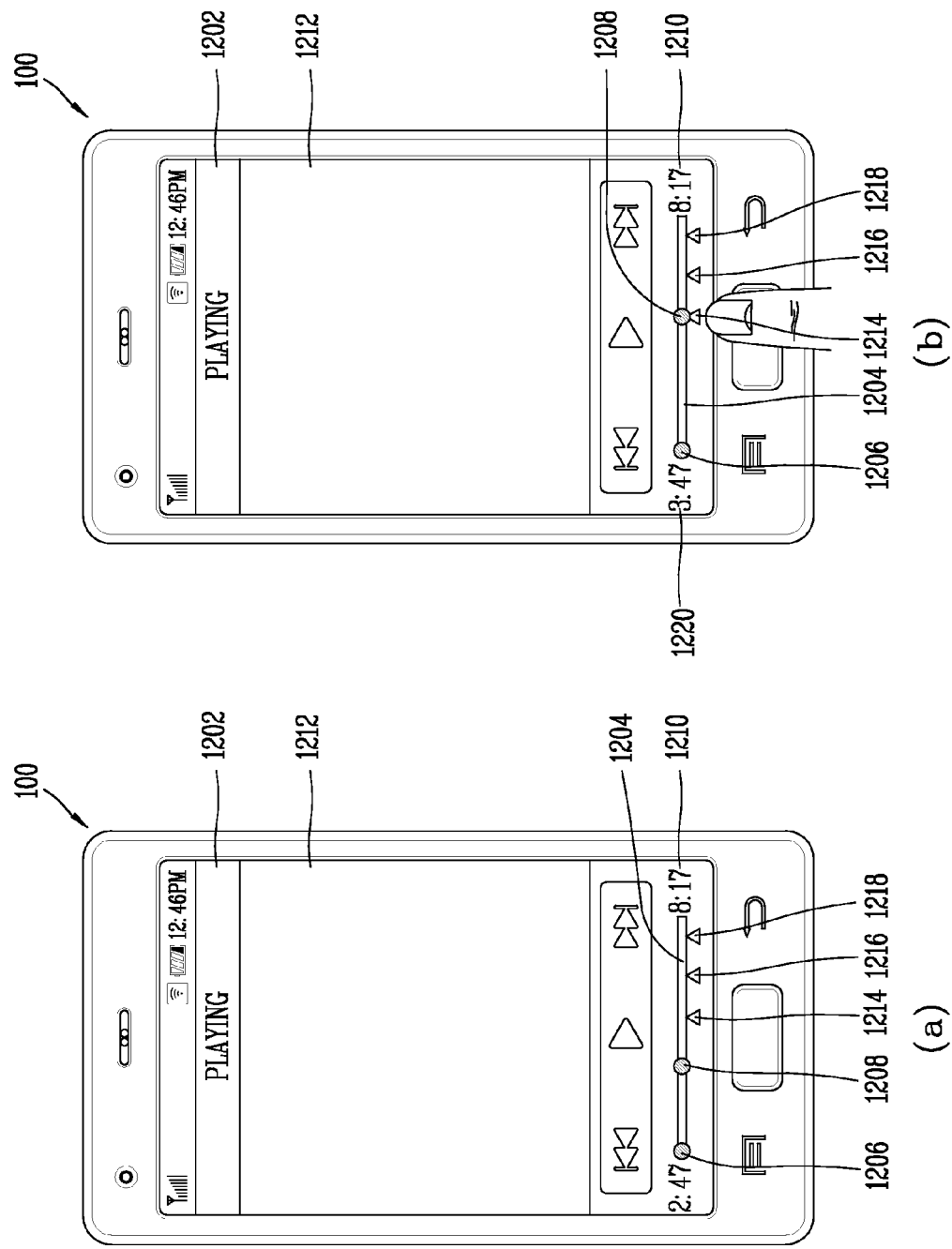

FIG. 4A is a flow chart illustrating a process of writing a specific time point during the audio recording, and FIG. 4B is a conceptual view illustrating the process of FIG. 4A. FIG. 4C is a flow chart illustrating a process of reproducing audio data from the written specific time point during the audio recording, and FIG. 4D is a conceptual view illustrating the process of FIG. 4C.

Referring to FIG. 4A, when the controller 180 starts audio recording, the controller 180 converts an audio signal being input to store it as audio data (S1210). At this time, the display unit 151 may display a progress bar indicating a recording state. The progress bar may include an indicator indicating a current time point of the whole recorded portion. When the whole recorded portion is not revealed, the indicator indicating a current time point is displayed at the middle of the progress bar.

Furthermore, the display unit 151 may display a speech-to-text (STT)-based text for an audio signal being input. For example, the display unit 151 may display an STT-based text for an audio signal that has been received from the start of recording up to a current time point, or display an STT-based text that has been received from a predetermined previous time point up to a current time point, or display a representative text string for each specific unit (for example, paragraph) of an STT-based text for an audio signal.

Referring to FIG. 4B, the mobile terminal 100 executes an audio recording function according to an user input and displays an audio recording screen. The audio recording screen may include an indicator 1202 indicating a function execution state and a progress bar 1204 indicating a recording state.

The indicator 1202 indicating a function execution state reflects a current function execution state such as "Recording", for example.

The progress bar 1204 may include an indicator 1206 indicating a start time point of recording, and an indicator 1208 indicating a current recording time point to indicate a recording progress state, and the electronic device, for instance, mobile terminal 100, displays time information 1210 indicating a current recording time along with the progress bar 1204.

Referring to FIG. 4A again, the input unit (for example, microphone 122, user input unit 130, sensing unit 140 (refer to FIG. 14 below), etc.) receives an input with a specific pattern while receiving an audio signal (S1220). The input unit may receive the predetermined pattern input through any one of a touch sensor for sensing a specific region or button, a keypad, a tactile sensor, an acceleration sensor, a gyro sensor, a microphone, and the like.

The predetermined pattern input may include a touch input to a specific region, an input to a specific key button (a push against a push button or a touch against a touch key), a change of tactile sense in a specific region, a change of acceleration of the mobile terminal, a change of angular speed of the mobile terminal, and a voice for which the intensity or volume of a specific voice command is greater than a threshold value, for example. Alternatively, the input unit may receive a selection input to part of an STT-based text displayed on the display unit 151.

As an example of the predetermined pattern input, referring to FIG. 4B(a), the mobile terminal 100 may sense a touch against a specific region of the screen 121 of the mobile terminal 100 during the audio recording.

Alternatively, the controller 180 may write a position of part of a text selected from the STT-based text displayed on the display unit 151 or a partial section based on the position of part of a text in the recording information of audio data (not shown). The mobile terminal 100 may convert a voice being recorded into a text based on an STT conversion to display the converted text on the display unit 151. In this case, a text string or keyword may be formed to be selected from the displayed text. For example, when a touch input against to any keyword is applied, a position of the touched keyword may be written in the recording information of audio data.

Referring to FIG. 4A again, the controller 180 reflects a time point at which the specific pattern is input to the recording information of audio data (S1230). The mobile terminal 100 may store a time point at which the relevant input is received along with audio recording.

Furthermore, the controller 180 may generate audio data and the recording information of the audio data as a file, or generate them as separate files, respectively, to store them in the memory 160. When audio data and the recording information of the audio data are generated as a file, the recording information may be the meta data of an audio file, and the audio data may be contained in the body of an audio file. When audio data and the recording information of the audio data are generated as separate files, a file in which the audio data is stored may be reproduced with reference to a file in which the recording information is stored.

Referring to FIG. 4B(b), the mobile terminal 100 may display an indicator 1214 indicating a time point at which a predetermined pattern is input to the progress bar 1204. Otherwise, the mobile terminal 100 may display an indicator indicating that a time point of receiving an input with a predetermined pattern has been written instead of displaying the indicator 1214 indicating a time point at which a predetermined pattern is input to the progress bar 1204. The mobile terminal 100 may output an indicator indicating that a time point of receiving an input with a predetermined pattern has been written in a visual, auditory, or tactile manner.

The mobile terminal 100 may receive a memo from the user in addition to a specific time point while receiving voice (or an audio signal). Furthermore, the controller can store a text file containing a STT based text along with the audio file, and in this case, the memo or specific time point may be written on the audio file and the text file, respectively. For another example, the memo and the specific time point may be divided and written on the text file and the audio file, respectively.

When writing for a specific time point is carried out during recording as described above, an audio file stored by terminating recording is made to notify information related to the specific time point to the user. Hereinafter, the operation will be described in more detail.

Referring to FIG. 4C, when there is an access request for audio data stored through the processes S1210 through S1230 as illustrated in FIG. 4A, the controller 180 acquires a time point at which a specific pattern is received from the recording information of the requested audio data (S1240).

Furthermore, the controller 180 controls the display unit 151 to display an indicator indicating the acquired time point at which a specific pattern is received (S1250). At this time, the display unit 151 displays an indicator indicating a reproduction state of the audio data on the progress bar.

Referring to FIG. 4D(a), when an audio data reproduction function is carried out according to a request for executing the audio data reproduction function, for example, a user input, the mobile terminal 100 executes the audio data reproduction function and displays an audio data reproduction screen.

The audio data reproduction screen may include an indicator 1202 indicating a function execution state and a progress bar 1204 indicating a reproduction state. The indicator 1202 indicating a function execution state reflects a current function execution state such as "Playing", for example.

The progress bar 1204 may include an indicator 1206 indicating a start time point of recording, and indicators 1214 to 1208 indicating at least one time point at which an input with a predetermined pattern is received, and an indicator 1208 indicating a current reproduction time point, the mobile terminal 100 displays time information 1210 indicating a whole reproduction time along with the progress bar 1204.

Referring to FIG. 4C again, the user input unit 130 receives an input for selecting an indicator displayed on the display unit 151 from the user (S1260).

Then the controller 180 reproduces audio data from a time point corresponding to the indicator selected by the user (S1270).

Referring to FIG. 4D(b), the mobile terminal 100 receives an input for selecting any one indicator 1214 of the indicators 1214 to 1218 indicating time points at which at least one predetermined pattern is received on the progress bar 1204. The mobile terminal 100 reproduces audio data from a time point corresponding to the selected indicator. In this case, the indicator 1208 indicating a current reproduction time point may be an indicator indicating the selected time point.

Furthermore, when there is a memo input according to an embodiment in which a memo can be input while recording an audio file as described above, the memo can be displayed while reproducing the audio file. For example, upon reaching a position at which the memo is written is during the reproduction, the memo can be displayed as a text on the display unit. Furthermore, in this case, in addition to an indicator (1214 through 1218) indicating a time point at which the input of a pattern is received, another indicator (not shown) indicating a time point at which the memo is received may be also displayed.

As described above, according to a first embodiment disclosed herein, it allows the user to easily write a specific time point during the audio recording. Accordingly, the facilitation of retrieval can be provided later.

FIGS. 5A through 5D are views illustrating a third operation control process of a mobile terminal according to a first embodiment disclosed herein.

In general, the mobile terminal 100 having a touch screen may provide a handwriting function using a stylus or finger. Here, handwriting is a behavior for allowing the user to write the content of a lecture, a discourse, a talk or the like, and the electronic device may store a touched position to provide a handwriting function. However, when the user records audio while at the same time writing the content of a lecture, a discourse, a talk or the like, the writing file and audio recording file are separately managed, and thus there is a burden that each file should be called when listening the content of the lecture, discourse, talk or the like, again later.

As a result, the third operation control process is related to a method in which writing and audio recording are stored in synchronization with each other and thus the content thereof can be conveniently checked again at the same time later.

Figure 5A:
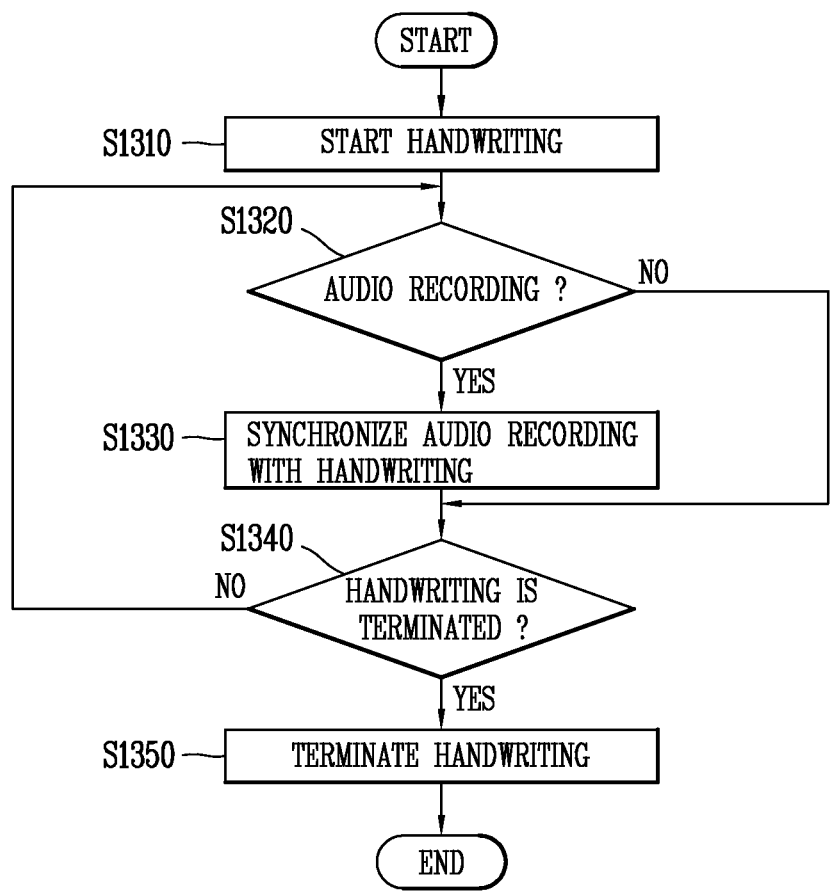
FIGS. 5A through 5D are views illustrating a third operation control process of a mobile terminal according to a first embodiment disclosed herein.
Figure 5B:
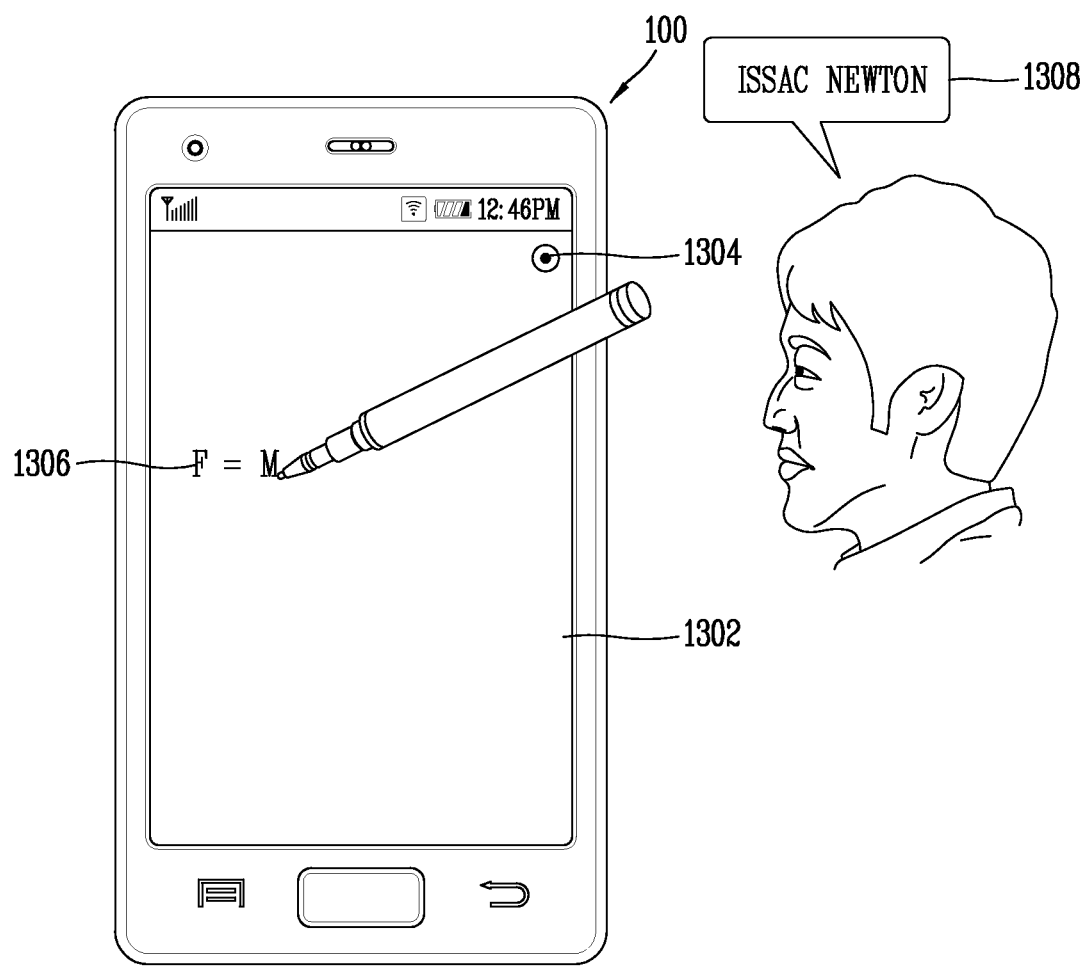

FIG. 5A is a flow chart illustrating a process of synchronizing audio recording with handwriting, and FIG. 5B is a conceptual view illustrating the process of FIG. 5A.

Referring to FIG. 5A, the mobile terminal 100 first starts handwriting (S1310), and checks whether an audio recording command is received (S1320).

Upon receiving the audio recording command, the electronic device, for instance, mobile terminal 100, performs audio recording in synchronization with handwriting (S1330) until a handwriting end command is received (S1340). Upon receiving the handwriting end command, the mobile terminal 100 terminates handwriting (S1350).

As a specific example, referring to FIG. 5B, the mobile terminal 100 may display a handwriting screen when a handwriting function execution request, for example, a handwriting function is carried out according to the user's input.

The handwriting screen may include a region 1302 in which handwriting is received and an audio recording menu 1304. The region 1302 in which handwriting is received displays a position touched using a stylus pen, a finger or the like. Accordingly, the content of handwriting (1306) can be displayed on the region 1302 in which handwriting is received.

When the user selects audio recording menu 1304 while handwriting is made, the mobile terminal 100 records a voice 1308 uttered by the user in synchronization with a handwriting progress time point.

The mobile terminal 100 can record a voice 1308 uttered by the user in synchronization with a handwriting progress time point in various ways. For example, the voice 1308 uttered by the user may be recorded to correspond to a time point at which handwriting is made in real time. Otherwise, the voice 1308 uttered by the user may be recorded to correspond to the unit of handwriting, for example, each page.

Figure 5C:
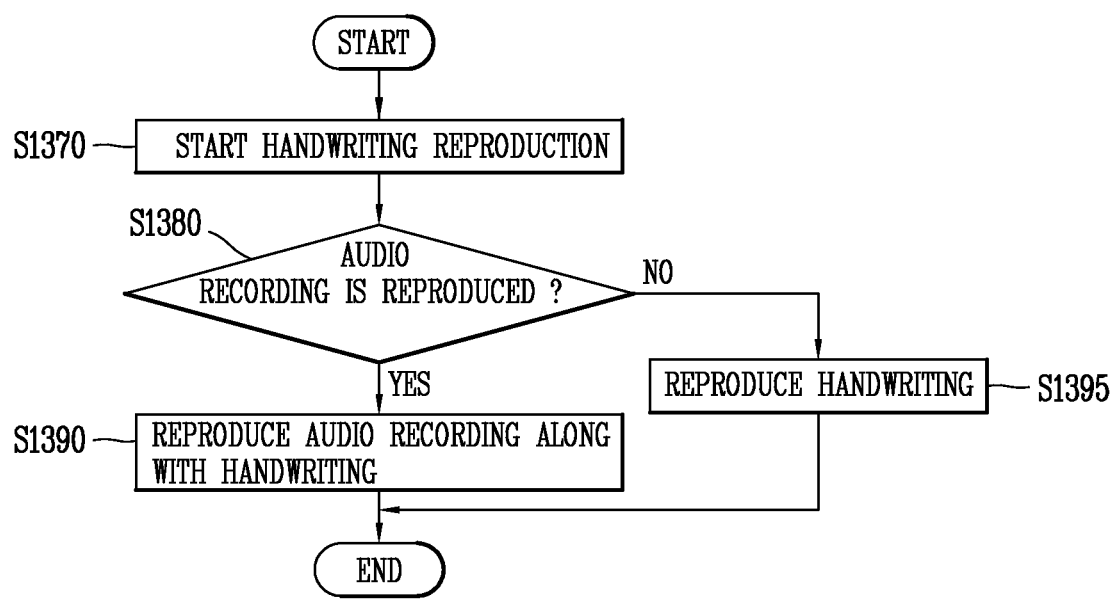
Figure 5D:
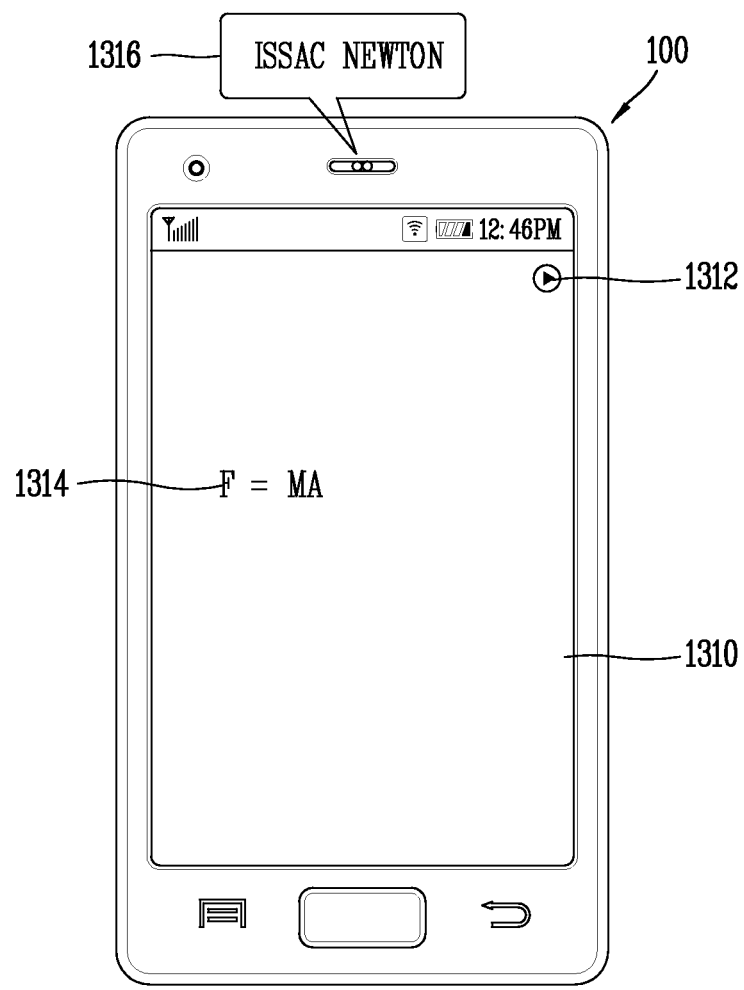

FIG. 5C is a flow chart illustrating a process of reproducing audio recording in synchronization with handwriting during the reproduction of handwriting, and FIG. 5D is a conceptual view illustrating the process of FIG. 5C.

Referring to FIG. 5C, the mobile terminal 100 starts the reproduction of handwriting (S1370). Furthermore; the mobile terminal 100 checks whether an audio recording reproduction command is received (S1380).

Upon receiving the audio recording reproduction command, the mobile terminal 100 reproduces audio recording in synchronization with handwriting being reproduced (S1390). However, when the audio recording reproduction command is not received, the mobile terminal 100 reproduces only handwriting without reproducing audio recording (S1395).

Referring to FIG. 5D, when a handwriting reproduction function execution request, for example, a handwriting reproduction function is carried out according to the user's input, the mobile terminal 100 may execute a handwriting reproduction function and display a handwriting reproduction screen. The handwriting reproduction screen may include a region 1310 in which handwriting is reproduced and a reproduction menu 1312.

When the reproduction menu 1312 is selected, the mobile terminal 100 displays the content of handwriting 1314 written by the user using a stylus pen, a finger, or the like in the region 1310 in which handwriting is reproduced in the handwriting unit, for example, page unit. In this case, the mobile terminal 100 reproduces audio recording 1316 stored in synchronization with the content of handwriting 1314, namely, a voice uttered by the user while writing the content of handwriting.

As describe above, according to a first embodiment disclosed herein, handwriting and audio recording are store in synchronization with each other, thereby allowing the user to conveniently check the content at once. As a result, it may be possible to enhance the effectiveness of education.

A mobile terminal according to the present disclosure is implemented to provide a file name using the converted text. Hereinafter, the process associated with providing a file name will be described in detail as a second embodiment.

FIG. 6A is a flow chart illustrating a method of automatically providing the file name of an audio file recorded according to a second embodiment of the present disclosure based on an STT-based text.

Referring to FIG. 6A, according to a second embodiment of the present disclosure, the mobile terminal performs a speech-to-text (STT) function or algorithm for a voice being recorded or recorded voice to acquire a text, a text string or a script. Furthermore, the mobile terminal may display the text, text string, or script on the display unit upon receiving an access request for a list of audio files from the user. It will be described below in detail.

First, audio recording is started (S2110). When the audio recording is started, audio data being received in real time is stored in a buffer. The buffer may be a medium with the highest processing speed, for instance, a volatile memory. Otherwise, the buffer may be an internal memory of the electronic device, for instance, mobile terminal.

At this time, audio data stored in the buffer may be stored as a temporary audio file with a constant period. The temporary audio file may be stored in a medium with the highest processing speed, for instance, a volatile memory. A temporary file name may be provided to the temporary audio file according to a randomly provided number or predetermined rule.

Next, real-time speech-to-text (STT) is carried out to acquire a text, a text string or a script (S2120). The STT recognizes a word (for instance, a subject, a predicate, a noun, a verb) from a voice as described above, and arranges the recognized words to generate a text, a text string or a script.

When the audio recording is terminated (S2130), an audio file is generated (S2140). The audio file is generated based on the temporary audio file. For example, the audio file may be stored in a medium with a large storage capacity, the medium with a large storage capacity may be low speed. Accordingly, the audio file may be generated in the medium with a large storage capacity based on being moved from the temporary audio file stored in the medium with a high processing speed.

In this case, meta data may be generated along with the audio file. The meta data may include a recording date, a total recording time, a location obtained from GPS, a name of speaker, a contact address, and the like. The location obtained from GPS is obtained as a coordinate value, and thus the mobile terminal may obtain a geographic name through a map data service based on the coordinate value, and then store the geographic name as meta data.

The name of speaker may be obtained a name called by the other between speakers. For example, assuming a circumstance in the meeting, when speaker A converses while calling the other Alice, and speaker B responds to the conversation, the mobile terminal 100 derives that the name of the speaker B is Alice through the conversation. Furthermore, speaker B converses while calling the other Bob in the state of remembering the voice of the speaker A and the voice of the speaker B (for example, in the state of remembering his or her voice tone, manner of speaking, and the like), and the speaker A responds to the conversation, the mobile terminal 100 derives that the name of the speaker A is Bob through the conversation.

When the names of speakers are acquired through the conversation as described above, the electronic device, for instance, mobile terminal 100, may store the names of the speakers as meta data, and acquire the contact addresses of the speakers from an address book to store the contact addresses along with the meta data.

On the other hand, when the audio file is generated, the mobile terminal 100 may perform STT based on the generated audio file to generate a text (S2150). When the text is generated in the foregoing step S2120, the step S2150 may be omitted. On the contrary, only the step S2150 may be carried out without the step S2120.

Otherwise, the step S2120 is carried out in real time, and the voice may not be recognized in real time according to circumstances, and thus the step S2150 may be carried out to process such an incomplete portion.

For example, when STT is carried out in the step S2120 in a circumstance that a plurality of speakers converse with one another, it may be difficult to recognize the voices of the plurality of speaker in real time. Accordingly, in such a circumstance, only the voices of some speakers may be recognized to acquire a text in the step S2120, and the voices of the other speakers may be recognized to acquire a text in the step S2150. Subsequently, the text obtained from the voices of some speakers and the text obtained from the voices of the other speakers are combined to generate a text. At this time, when combining the two texts, a text string based on the voice of each speaker may be arranged in the order of time.

For another example, when the mobile terminal 100 performs STT in real time to obtain a text in a circumstance that a plurality of speakers converse at the same time, the conversation of two persons may be recognized in a mixed manner. As a more specific example, when speaker A utters "What about having a meeting again next week?", and speaker B utters "Let's make a schedule next week" at the same time, the mobile terminal 100 may recognize the conversation as "What about let's make having a meeting again a schedule next week", thereby generating an error. As a result, the mobile terminal 100 may recognize speaker A and then perform STT only for the voice of the speaker A to obtain a text in the step S2120, and perform STT only for the voice of the speaker B to obtain a text in the step S2150, and then combines the texts of the speakers A and B.

Subsequently, the mobile terminal 100 may provide a file name of the audio file based on the text (S2160).

At this time, in the related art, the file name is typically generated based on a general rule. For example, files having file names such as AUDIO_001, AUDIO_002, AUDIO_003, and the like are generated by appending numerals in the order. Otherwise, in the related art, the file name of each recorded file is generated with a combination of the recording date with a serial number. In other words, the foregoing three files may be generated as 20120112_001, 20120212_001, 20120312_001, and the like, according to the related art.

However, when the mobile terminal displays such a file name according to an access request for a list of audio files, the user does not know at all what type of recording has been made with only the relevant file name.

According to the present disclosure, when recording is terminated, a file name for the audio file is provided based on a text converted and generated based on a voice within the audio file. For example, the controller detects a core keyword from the text, and sets the detected core keyword as at least part of a file name for the audio file.

The file name of the audio file may be automatically provided based on the converted text or provided according to the user's selection. Hereinafter, a case of automatically providing a file name will be described with reference to FIGS. 6B through 6D, and a case of partially adding the user's selection will be described with reference to FIGS. 6E and 6F, and a case of providing a file name according to the user's selection will be described with reference to FIG. 6G.

Figure 6B:

FIG. 6B illustrates an example in which a file name is automatically provided to an audio file.

Referring to FIG. 6B, three audio files are shown, and they are processed to detect core keywords according to different methods, respectively.

A first audio file indicates a case in which the core keyword is a word uttered by a specific speaker at a specific time point (for example, during the introduction of a conversation). For example, in a general meeting, the host typically speaks a matter when opening the meeting. Accordingly, when speaker A utters "Let's start a new product development meeting for mobile phones" during the introduction of a conversation, the mobile terminal 100 may detect "meeting" as a core keyword, and provides a text string containing the same "new product development meeting for mobile phones" as a file name. In this case, the specific time point may be a range for a predetermined period of time (for example, one minute after starting recording), and the predetermined period of time may be set by the user.

Otherwise, the core keyword may be a word emphasized by a specific speaker during the recording. The emphasis may be defined through the emotion analysis of a voice or a repetition rate of the word.

A second audio file indicates a case in which a file name is provided through the emotion analysis of a voice. For example, the terminal detects a keyword at a portion where a specific speaker speaks in an excited state or speaks in a high tone voice using an emotion analysis algorithm. Specifically, when the user records a LTE related article among news contents broadcast from a radio or television, the mobile terminal 100 analyzes emotions from the voice of a speaker, namely, a news anchor, to know whether it is a news. Furthermore, when the news anchor speaks while emphasizing a word LTE, the mobile terminal 100 may detect the word LTE as a core keyword, and extract "LTE related articles scrap" as a text string to be set to the file name.

For another example, a word with a high repetition rate may be detected as a core keyword, and in this case, a word with a high repetition rate at a specific section (for example, the introduction of a conversation, the end of a conversation) may be a core keyword. For example, when a phrase "antenna design" is reiterated several times while speakers A and B converse with each other, the antenna design may be provided as a file name. Moreover, when a word "meet-ing" is detected during the introduction of a conversation, "antenna design meeting" may be provided as a file name (refer to the third file). In this manner, the foregoing examples may be combined with one another.

Furthermore, the keyword may by extracted by recognizing a recorded place or circumstance. For example, a keyword may be detected from the introduction of a conversation when the mobile terminal is located at an office or customer's site and thus frequent meetings may be expected, and a word extracted through the emotion analysis may be detected as a keyword when the mobile terminal is located at home and thus frequent television viewing are expected.

Hereinafter, an example of automatically providing the file name will be described in detail with reference to FIGS. 6C through 6F.

FIG. 6C illustrate an example of automatically providing the file name of an audio file according to the method illustrated in FIG. 6A with a table.

As illustrated in FIG. 6C, when audio files are generated through the foregoing step S2140, temporary file names AUDIO_001, AUDIO_002, AUDIO_003, and the like are provided based on serial numbers, respectively. Otherwise, when audio files are generated through the foregoing step S2240, temporary file names, for instance, 20110403_001, 20110505_001, 201200404_001, and the like, may be provided based on a combination of the recording date with a serial number. In other words, the foregoing three files may be generated as according to the related art.

The examples of providing file names for three audio files in such a circumstance will be described below in detail.

According to the table, a temporary file name AUDIO_001 is provided for the illustrated first audio file, and a text string made of core keywords, namely, "new product development meeting for mobile phones", is extracted from the STT-based text, and the date information is 2011-04-03, and the attendees are Alice, Bob and Charlie, and the location as meta data is Yeouido in Seoul, and the contact addresses of each attendee are stored. Then, the mobile terminal 100 provides "new product development meeting for mobile phones" as a file name. Moreover, the mobile terminal 100 may automatically provide the file name as a combination of text strings made of the date and core keywords for the first audio file. For example, as illustrated herein, "20110403 new product development meeting for mobile phones" may be provided as a file name.

For another example, a temporary file name AUDIO_002 is provided for the illustrated second audio file, and a text string made of core keywords, namely, "LTE related articles", is extracted from the STT-based text, and the date information is 2011-05-05, and the attendees are Bob and Charlie, and the location as meta data is Gangnam in Seoul, and the contact addresses of each attendee are stored. Then, the mobile terminal 100 provides "LTE related articles scrap" as a file name. Moreover, as illustrated herein, the mobile terminal 100 may combine text strings made of the date and core keywords for the second audio file to provide "20110505 LTE related articles scrap", for example, as a file name.

For still another example, a temporary file name AUDIO_003 is provided for the illustrated third audio file, and a text string made of core keywords, namely, "antenna design meeting", is extracted from the STT-based text, and the date information is 2012-04-04, and the attendees are Charlie, Alice and Bob, and the location as meta data is Myeongdong in Seoul, and the contact addresses of each attendee are stored. Then, the mobile terminal 100 may provide "20120404 antenna design meeting" as a file name using a combination of text strings made of the date and core keywords as illustrated herein.

An example capable of distinguishing each audio file only with a combination of the date and core keywords has been illustrated in FIG. 6C, but if there is a file with the same date and the same core keywords, then the mobile terminal 100 may further use at least one of the attendees, recording start time, and location information to provide a file name.

FIG. 6D illustrates another example for automatically providing the file name of an audio file according to the method illustrated in FIG. 6A.

Referring to FIG. 6D, the electronic device, for instance, mobile terminal 100 may use this year, last year, year before last, and year/month/day when providing a file name without using the form of YYYYMMDD.

Furthermore, the electronic device, for instance, mobile terminal 100, may use a geographic name when providing a file name.

For example, for the illustrated first audio file, the mobile terminal 100 may provide a file name "new product development meeting for mobile phones in Yeouido last year", for example, for the first audio file, using a combination of text strings made of the date, geographic location, and core keywords.

Here, it is noteworthy that the concept of last year/this year may be changed as time passes by, and thus the mobile terminal 100 automatically the file name according to the time elapse.

For example, if the present is year 2011, the second file is generated in 2011-05-05, then the electronic device, for instance, mobile terminal 100, may provide a file name "LTE related articles dated 05-05 in Gangnam this year" for the second file.

However, if the present is year 2012 as time passes by, the electronic device, for instance, mobile terminal 100 may automatically update the file name of the second file as "LTE related articles in Gangnam last year". Otherwise, the automatic update may be carried out whenever performing the audio recording related function. Furthermore, the automatic update may be scheduled to be carried out during an idle time. Otherwise, the automatic update may be scheduled to be carried out once whenever month or year is changed.

On the other hand, the month/day is not shown in the file name according to an example of the second file. It is because the mobile terminal 100 determines that each audio file can be sufficiently distinguished only by file names made of the geographic name and core keywords. However, when it is determined that such distinction is impossible, the mobile terminal 100 may add even information on the month/day to the file name as illustrated in the third file.

Figure 6E:
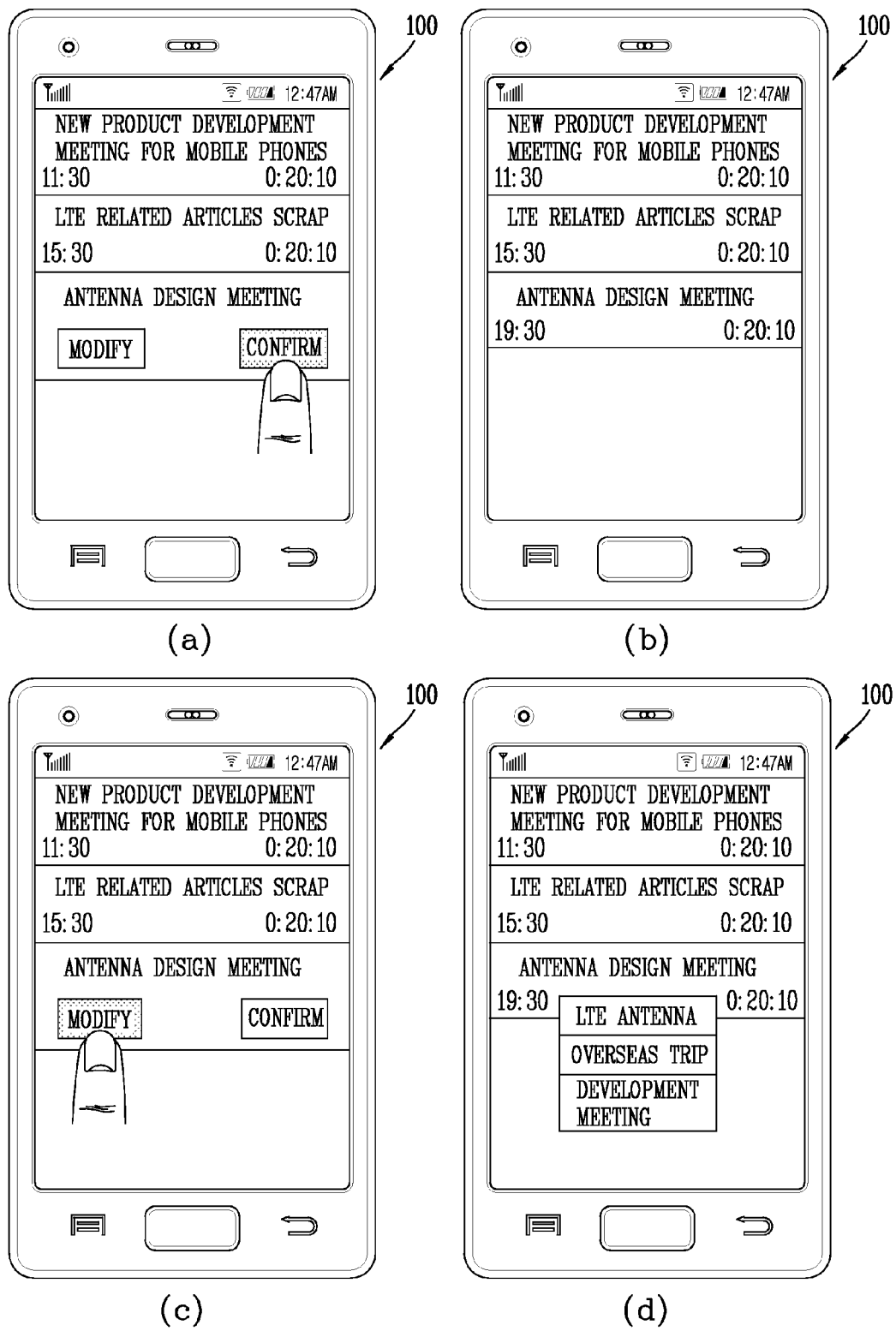

FIG. 6E illustrates a process of allowing the user to confirm after automatically providing the file name of an audio file according to the method illustrated in FIG. 6A.

Referring to FIG. 6E, immediately after generating a third audio file, the mobile terminal 100 automatically provides a file name "20120404 antenna design meeting" for the third audio file as described above.

In this manner, the automatically provided file name is based on a text string made of core keywords extracted from the STT-based text by the mobile terminal 100. Such core keywords may not be suitable according to circumstances.

Accordingly, the mobile terminal 100 may automatically provide a file name, and then perform an operation for allowing the user to confirm whether the provided file name is suitable. For example, as illustrated in FIG. 6E(a) or 6E(c), the mobile terminal 100 may provide the file name, and then display a "Modify" button and a "Confirm" button.

In this case, when the user touches the confirm button as illustrated in FIG. 6E(a), a file name "20120404 antenna design meeting" may be conclusively provided for the audio file as illustrated in FIG. 6E(b). ON the contrary, when the user touches the modify button as illustrated in FIG. 6E(c), the file name of the audio file is switched to a modifiable state. For such an example, as illustrated in FIG. 6E(d), another file name may be proposed. For the proposal of another file name, priorities may be provided for the created file names. For example, a repetition rate in the core keyword detection method is provided as the priority, and an emotion analysis or specific time point analysis may be used as the next priority. In this case, as the user selects the modify button, the proposed another file name may be a text string containing core keywords extracted by the next priority analysis.

Alternatively, subsequent to providing the file name, the mobile terminal 100 may display the file name with a slant effect or with a dim color. The mobile terminal 100 may release the slant effect or dim color when the user touches the file name. However, when the file name is touched for more than a predetermined period time (for example, short or long touch), the mobile terminal 100 may display a screen capable of modifying the file name.

Alternatively, the subsequent to providing the file name, the mobile terminal 100 may display a "Confirm" button while at the same time displaying the file name with a slant effect or with a dim color. When the user touches the text string without touch the confirm button, the mobile terminal 100 may display a screen capable of modifying the file name.

Figure 6F:
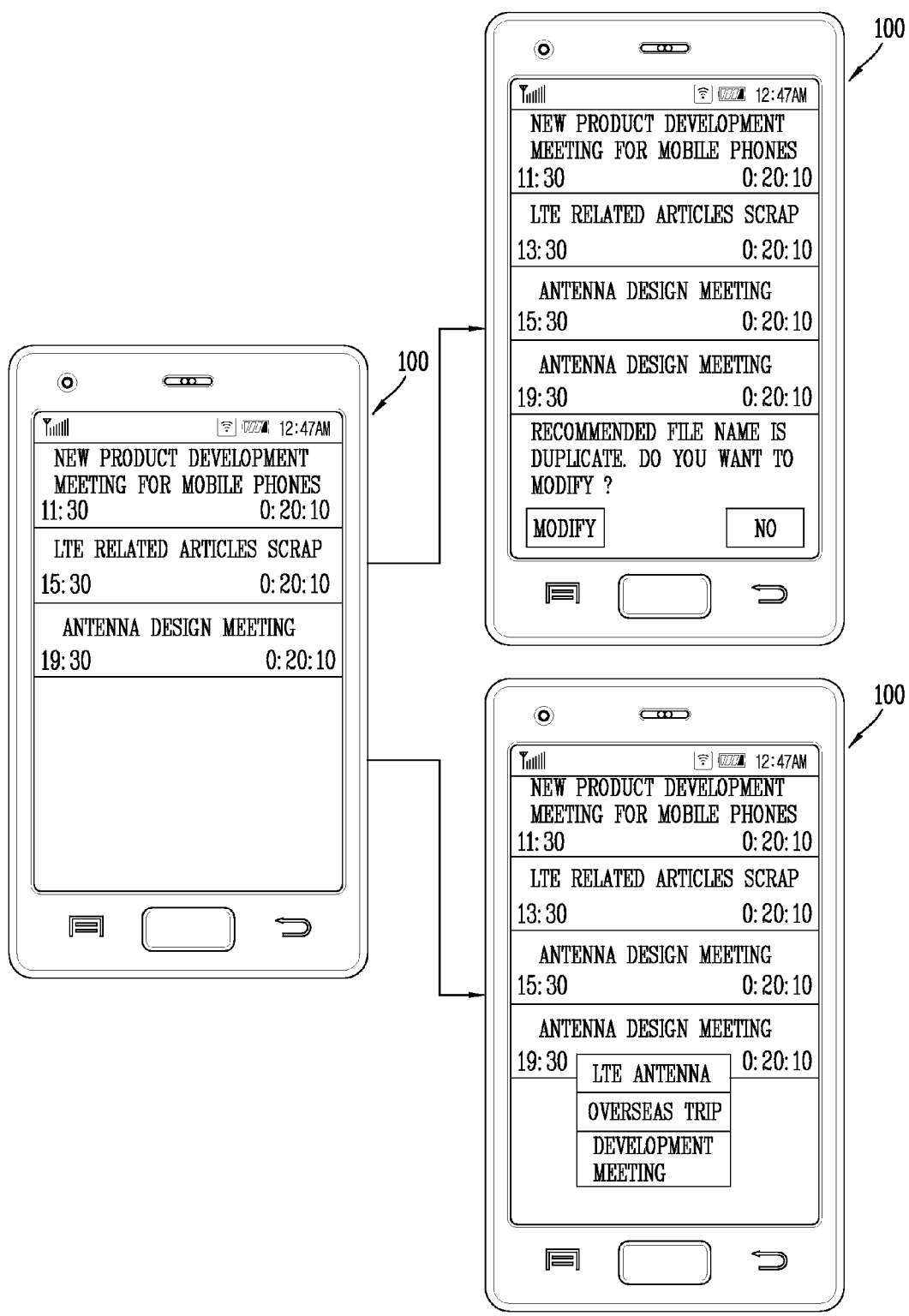

FIG. 6F illustrates an example in which the file name of an audio file is automatically provided as illustrated in FIG. 6A but there exist a duplicate file name.

When the file name of an audio file is automatically provided but there exist a duplicate file name, the mobile terminal 100 may further display other recommended file names. Otherwise, when there is a duplicate file name, the mobile terminal 100 may display other core keywords. When the user selects any one of the other core keywords, the mobile terminal 100 may update the file name using the selected keyword.

More specifically, when there previously existed a file name "antenna design meeting", the recorded and added file name may be provided with "antenna design meeting". Referring to FIG. 6F, when there is a duplicate file name, the mobile terminal 100 may display an instruction phrase "Recommended file name is duplicate. Do you want to modify?". Then the mobile terminal 100 may display a "Confirm" button or a "No" button.

Otherwise, when there is a duplicate file name, the mobile terminal 100 may display a list of file names that can be provided. The list of file names may be core keywords with the next priority, and the user may touch his or her desired file name among the file names on the list to provide a file name to the audio file.

Figure 6G:
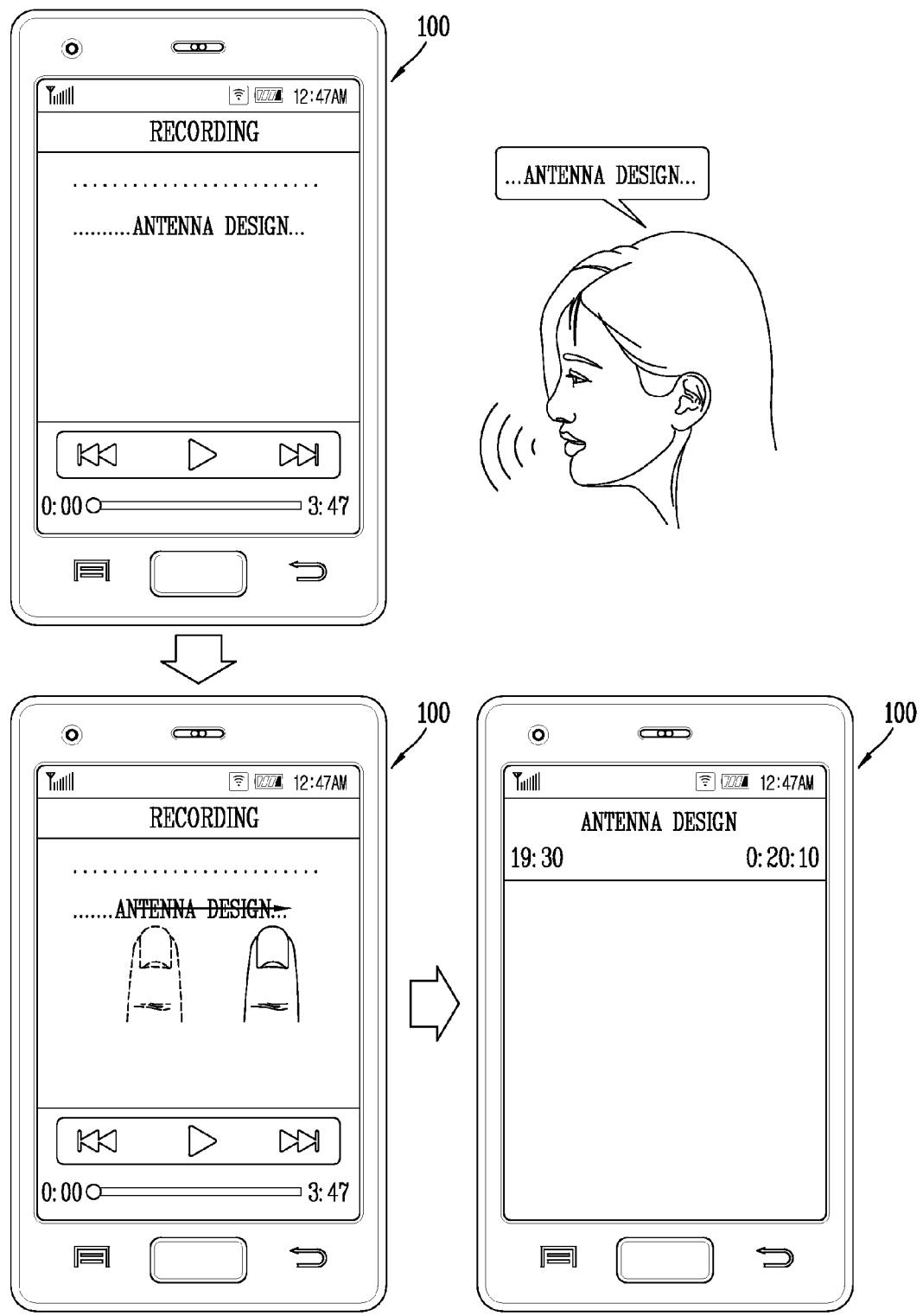

FIG. 6G illustrates a case where the user creates an audio file name.

Referring to FIG. 6G, a text converted by STT is displayed on the display unit 151 while recording is carried out. When recording is carried out, a converted text may be displayed in real time, or only a core keyword or text string extracted from the text may be displayed.

The user may select a keyword to be provided as a file name among texts displayed on the display unit 151 while recording is carried out. For example, when the user drags to select a text string "antenna design", the text string "antenna design" will be created as a file name later.

Such a selection input may be applied to a plurality of keywords or text strings. For example, when the user drags "antenna design" and touches "meeting", they are combined to create "antenna design meeting" as a file name.

Furthermore, a keyword or text string selected by the user's touch or drag while displaying the text may be stored therein as a list for providing a file name later. The list may be displayed as selectable items when recording is terminated and stored.

The embodiment of FIG. 6G may be implemented by various types of driving methods. For example, the controller may implement the driving method by the execution of three steps. More specifically, the controller drives a recording application for recording a user's voice input through the microphone into an audio file during the first step, and drives a speech-to-text (STT) execution application in linkage with driving the recording application to display a text converted and generated from the user's voice on the display unit during the second step. The controller sets a keyword specified by a touch input from the content of the text displayed on the display unit to at least part of a file name for the audio file during the final third step.

The controller may detect a core keyword from the text, and set the detected core keyword to at least part of the file name when there is no touch input during the recording of the audio file. In this case, the file name may be made of a text string containing the keyword or the core keyword, and the controller may display the text string while scrolling it when there is an output request for a list of the audio files.

Furthermore, the configuration of the application may be carried out in various ways. For example, the STT execution application may be separately provided from the recording application, and the recording application may be carried out to allow the selection of the driving of the STT execution application during the recording. For another example, the STT execution application may be provided as part of the recording application such that the execution of the STT is implemented as a function of the recording application during the driving of the recording application.

Furthermore, when storing the audio file, a text file containing the text generated by STT may be also stored along with the audio file. Through this, a text corresponding to the voice being reproduced can be immediately displayed using the text file without a separate STT process during the reproduction of the audio file later. For example, a popup window indicating the existence of the terminal folder may be displayed during the reproduction of an audio file, and the text may be displayed in linkage with the reproduction of the audio file by the user's selection.

Figure 7A:
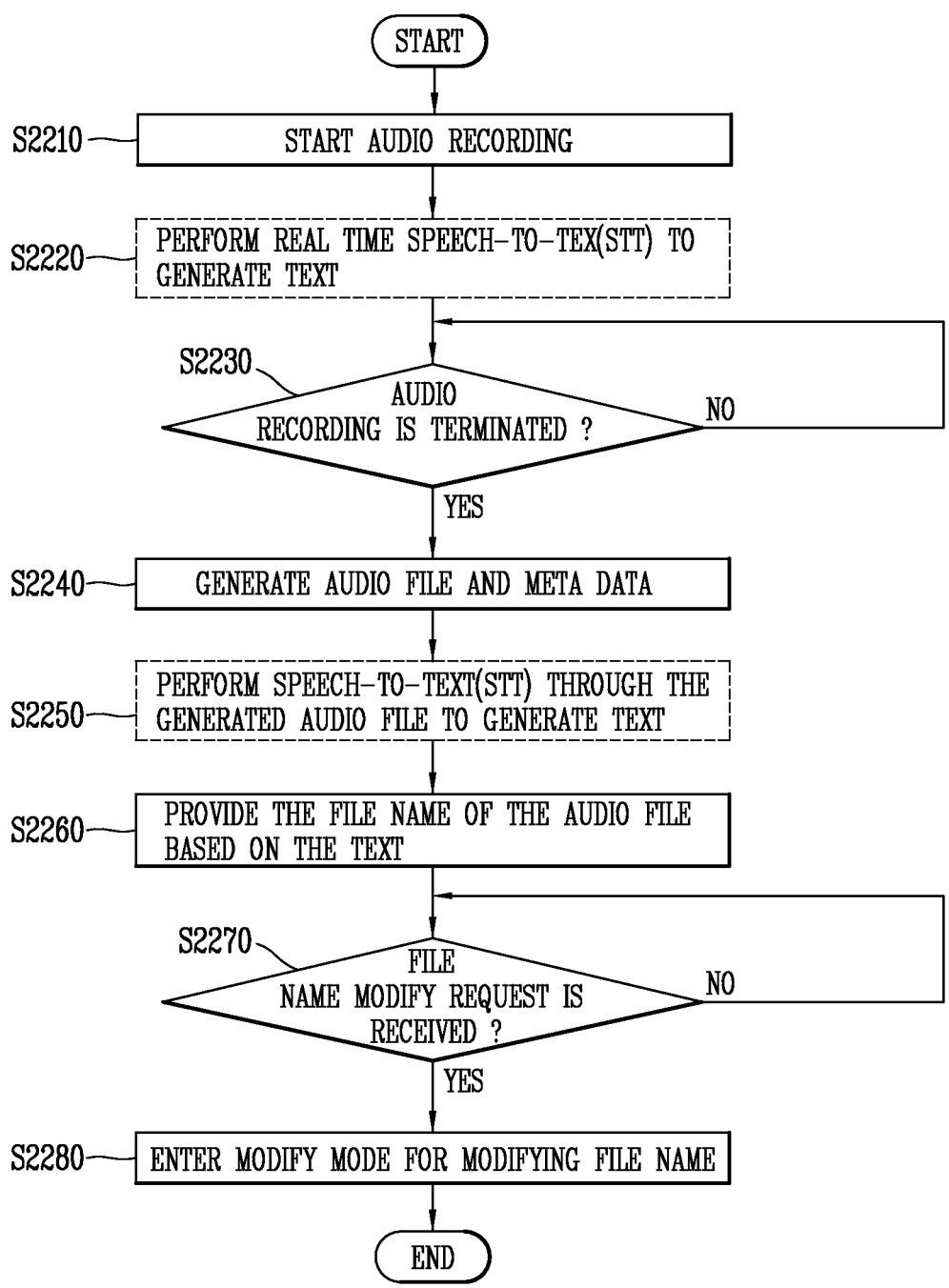

FIG. 7A is a flow chart illustrating a method of modifying a file name that has been automatically provided according to the modified example of the second embodiment of the present disclosure, and FIGS. 7B through 7E illustrate an example of modifying a file name.

The processes S2210-S2260 illustrated in FIG. 7A are similar to the processes S2110-S2160 illustrated in FIG. 6A, and thus the foregoing description of FIG. 6A will be used as it is with no duplicate description.

When a file name modification request is received subsequent to automatically providing a file name for the generated audio file (S2270), the mobile terminal 100 enters a modification mode to modify the file name.

Figure 7B:
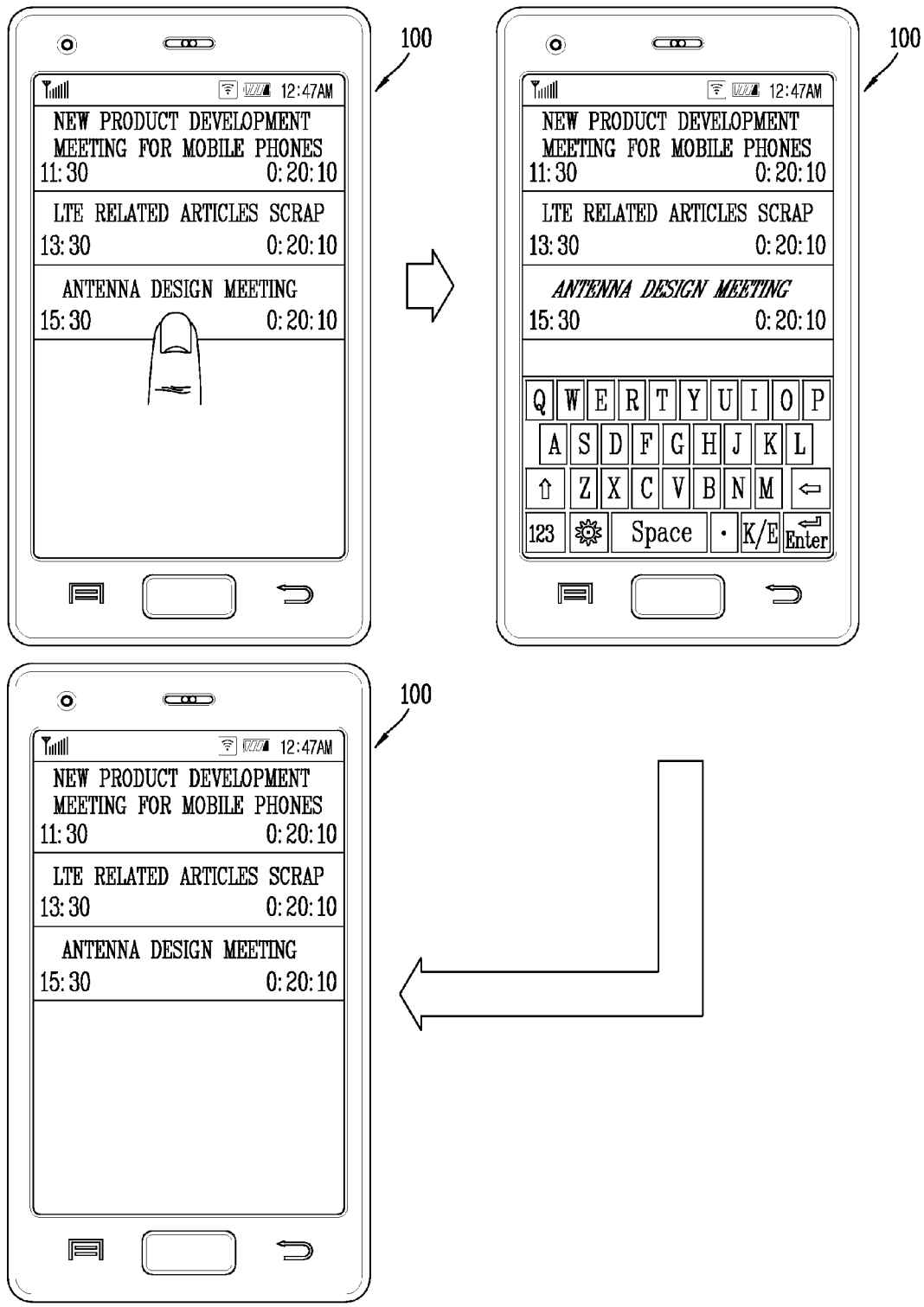

As illustrated in FIG. 7B, when the user takes a gesture for the specific file name (for example, when the user performs a short or long touch to a specific file name, or drags it in a specific direction), the mobile terminal 100 may create and display an effect on the specific file name. For example, the mobile terminal 100 may display the specific file name with a slant effect, a dim effect, or a shaking effect.

The mobile terminal 100 may display a screen for modifying the file name while displaying the specific file name with an effect in this manner. A virtual keyboard may be displayed for the screen for modification. When the user input a specific word using the virtual keyboard as illustrated in FIG. 7B, the mobile terminal 100 may display the input keywords as a file name instead of the word.

On the other hand, referring to FIG. 7C, when the user takes a gesture for the specific file name (for instance, the user performs a long touch to a specific file name or drags it in a specific direction), the mobile terminal 100 may display a "Modify" button and a "Confirm" button to ask the user whether he or she wants to modify it. When the modify button is selected by the user, the mobile terminal 100 may display a screen for modifying the file name.

As illustrated in the drawing, another recommended keyword with the next priority may be displayed on the screen for modification, and when the user selects any one of the displayed other recommended keywords, the mobile terminal 100 may updates the file name using the selected keyword.

Figure 7D:
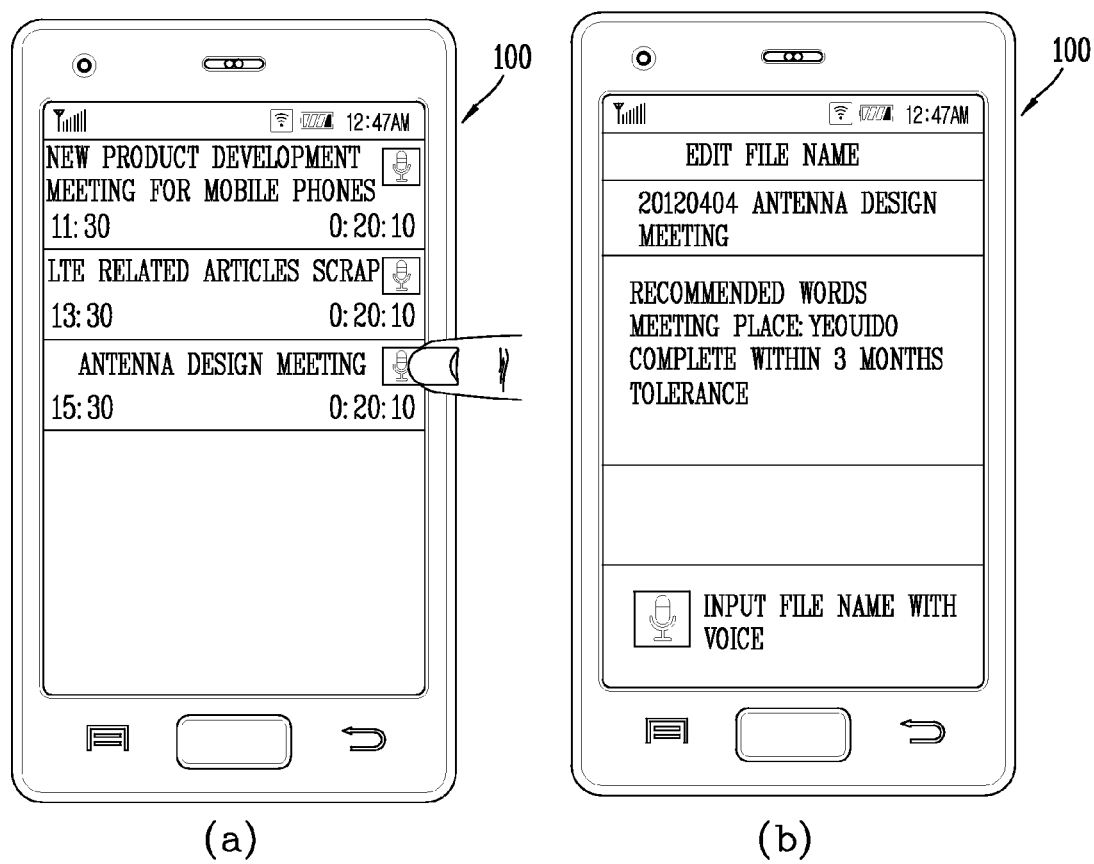

The modification of the file name may be carried out by voice recognition as illustrated in FIG. 7D. In this case, a screen for receiving the voice recognition may be created with a phrase for guiding a voice input along with a microphone image as illustrated in FIG. 7D(b). Moreover, though not shown in the drawing, a recognized voice may be displayed on the screen for receiving the voice recognition.

Referring to FIG. 7D(a), when a list of audio files is accessed for editing through voice recognition, an icon corresponding to audio edition may be displayed at a position of the display unit 151. The icon may be a microphone image disposed at a side of the file name.

When the user touches the icon, the screen is displayed, and when a voice is received from the user, the file name may be modified according to the received voice command.

For example, when the received voice command is "Would you change the file name to mobile phone antenna design?", the mobile terminal 100 may change the existing file name to "mobile phone antenna design" according to the recognized voice.

For another example, when the received voice command is "Would you change design to simulation?", the mobile terminal 100 may replace only some words in the existing file name to a new word.

Figure 7E:
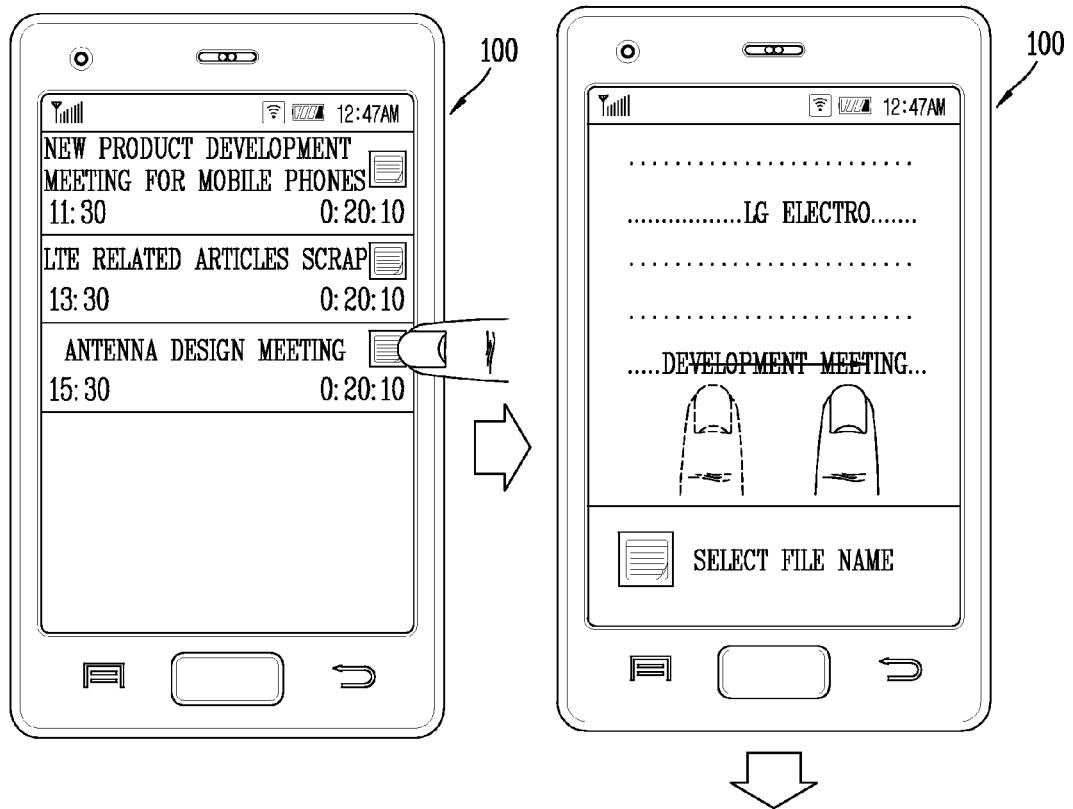
Figure 7E:
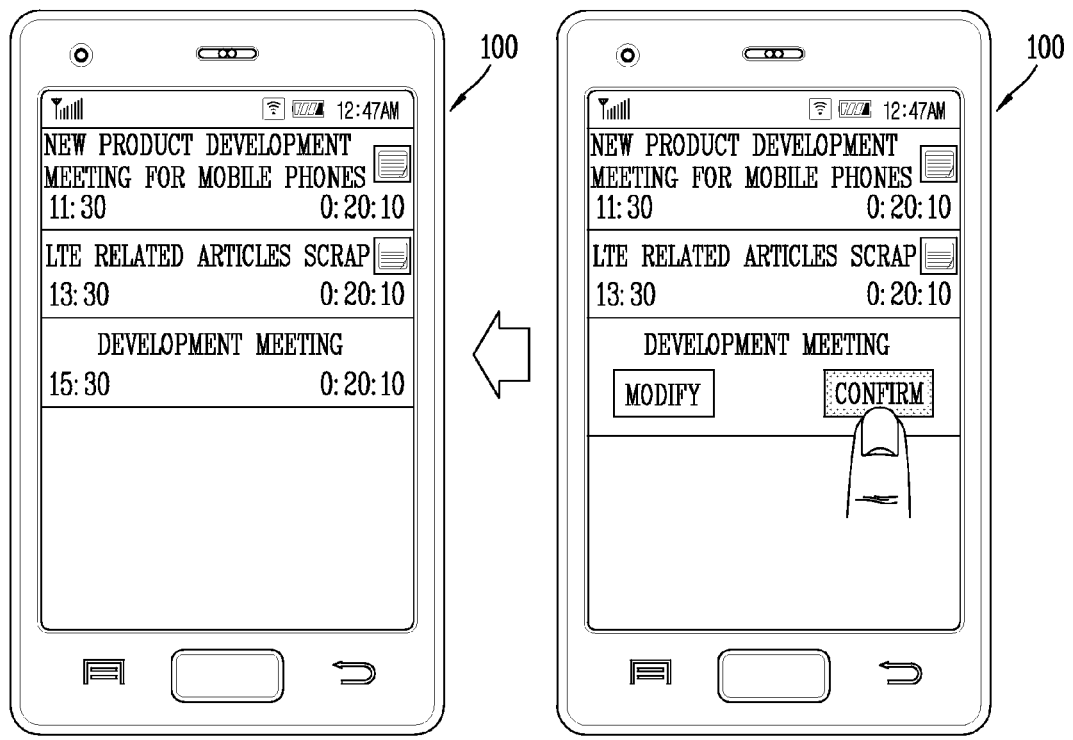

On the other hand, as illustrated in FIG. 7E, the screen for modifying the file name may be a window for displaying a text converted based on SIT.

For example, when a list of audio files is accessed, an icon corresponding to the output of the text may be displayed as illustrated in FIG. 7E. When the user touches the icon, a text will be displayed on the display unit 151, and the displayed text may be generated to be scrolled by a drag or the like. At this time, as illustrated in the drawing, when the user selects a specific keyword or text string among the content of the text through a touch or drag, a confirmation screen showing whether to change the file name is displayed, and the file name is changed when the user accepts the file name change.

An embodiment disclosed in FIG. 7E may be applicable to setting a first time file name as well as changing a file name. For example, a text converted by STT may be displayed on the screen while recording voice, and when the user selects a specific keyword or text string from the content of the text through a touch or drag, the selected keyword or text string may be provided as a file name.

As described above, according to a second embodiment of the present disclosure, it may be possible to automatically provide the file name as well as conveniently change the file name through a keyword extracted from the STT-based text.

Furthermore, when accessing a file list, the mobile terminal 100 may display additional information in addition to the file name. With regard to this, a third embodiment disclosed herein will be described with reference to FIGS. 8A through 8J.

Figure 8A:
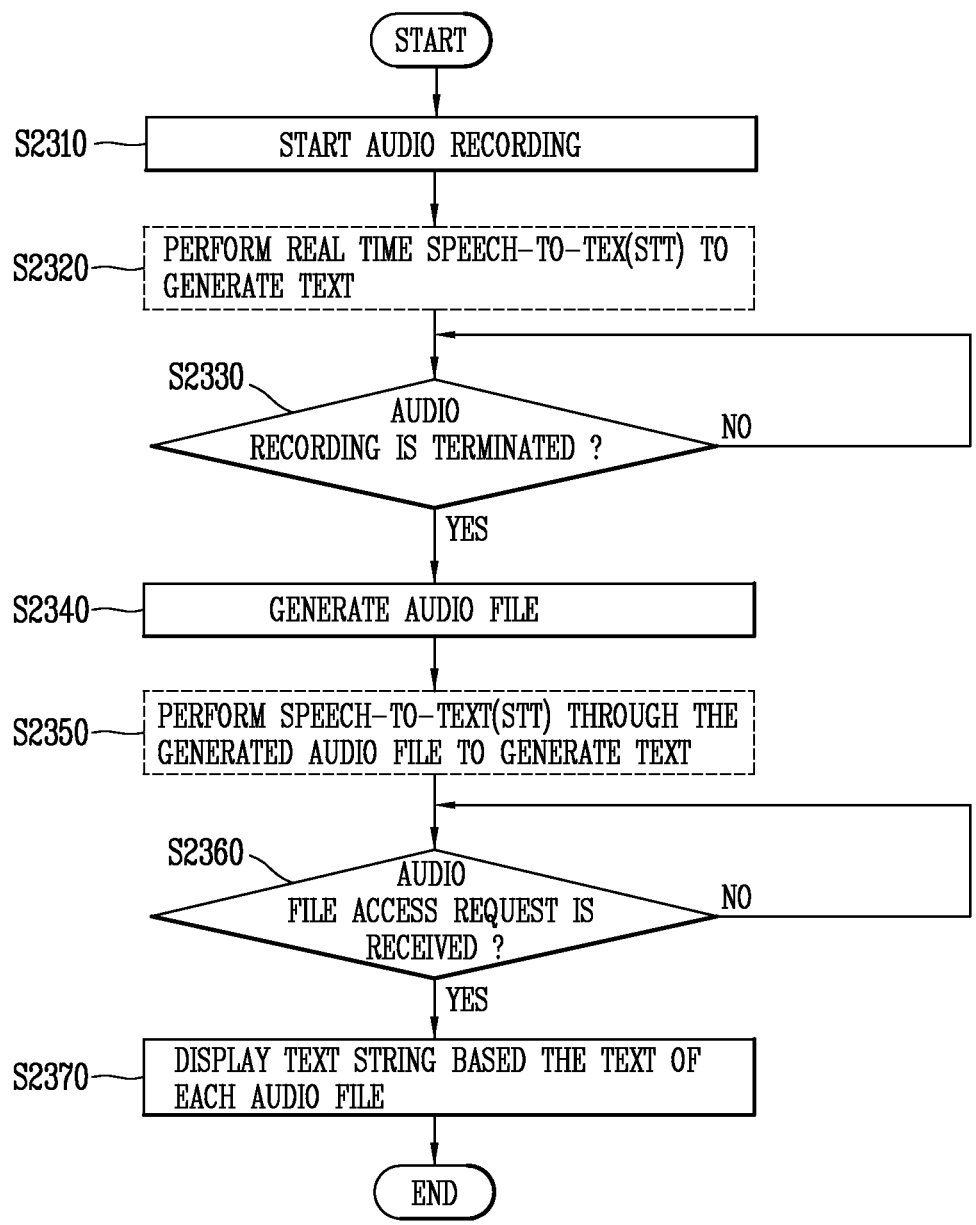

FIG. 8A is a flow chart illustrating a method of displaying a text associated with the audio file according to a third embodiment of the present disclosure.

The processes S2310-S2350 illustrated in FIG. 8A are similar to the processes S2110-S2150 illustrated in FIG. 6A, and thus the foregoing description will be used as it is with no duplicate description, and therefore, they will be described from the process S2360.

When an access request for a list of the audio files (or audio file itself) is received subsequent to generating an audio file (S2360), a text string may be described based on a text corresponding to each audio file on the display unit (S2370).

The access request may be the user's request for a list of the audio files. Otherwise, the mobile terminal 100 may automatically generate the access request in response to a termination request of the audio file.

Alternatively, when a request for executing an audio recording application again is received in a state that the audio recording application is terminated, the mobile terminal 100 may first display a list of the audio files. Accordingly, the access request may be a request for executing the audio recording application.

According to a third embodiment of the present disclosure, the mobile terminal may extract a suitable text string from the text generated based on STT, and display the extracted text string in response to an access request for the audio file. At this time, a method similar to or same as the foregoing second embodiment will be used for the text string extraction method.

When it is difficult to display all the extracted text string on one screen, the mobile terminal 100 may display the text string while being automatically scrolled. In other words, the mobile terminal 100 may show the text string on the right side and then move it in the left direction, thereby displaying the entire text string. In other words, the text string is displayed as many as the number of characters that can be displayed as a line on the screen, and then moved in a horizontal direction to display the remaining characters of the text string. Otherwise, the first character of the text string is shown at one side of the screen, and then moved to the other side thereof to continuously display the remaining characters of the text string.

Examples of the foregoing process will be described in more detail with reference to FIGS. 8B through 8J.

Figure 8B:
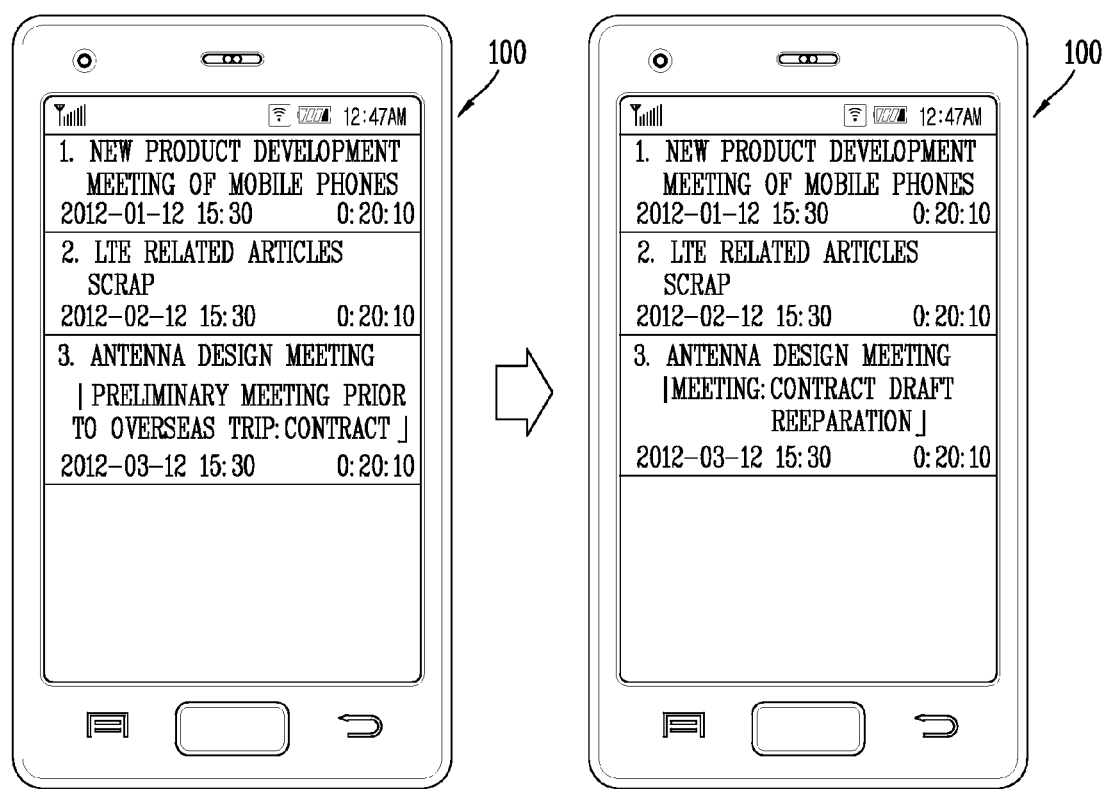

FIG. 8B illustrates an example of displaying a text string for describing an audio file.

Referring to FIG. 8B, three audio files are displayed thereon. A first audio file is generated at 15:30, Jan. 12, 2012, and recorded for total 20 minutes 10 seconds, and the file name is "new product development meeting for mobile phones".

A second file name is "LTE related articles scrap", and a third file name is "antenna design meeting".

As illustrated in the drawing, a different text string from the file name may be displayed along with the file name of an audio file. The content containing the file name or the content containing a core keyword that is not contained in the file name may be written in the text string.

A different text string from the text string set to the file name may be created by varying the detection condition. For the detailed description, it is illustrated a case in which a file name "antenna design meeting" is created using the same method as the file name of a third audio file according to a second embodiment.

When phrases "next month overseas trip" and "component supplier contract" are reiterated several times in addition to "antenna design meeting" while speaker A converses with speaker B, the mobile terminal 100 may recognize it as a preliminary meeting prior to overseas trip through the phrase "next month overseas trip", and furthermore, recognize that the meeting is to prepare a contract draft through a phrase "contract draft preparation". Furthermore, the mobile terminal 100 may generate "preliminary meeting prior to overseas trip: contract draft preparation" as a text string to be displayed along with the file name.

On the other hand, when the electronic device, for instance, mobile terminal 100, displays a portrait screen, in case where the entire text string ("preliminary meeting prior to overseas trip: contract draft preparation") cannot be displayed on the portrait screen, the text string may be shown in the right side and then moved in the left direction, thereby displaying the entire text string.

For example, as in the illustrated third audio file, "preliminary meeting prior to overseas trip" may be shown first, and then the text string may be scrolled, i.e., moved in the left direction, and thus "contract draft preparation" may be subsequently displayed.

Figure 8C:
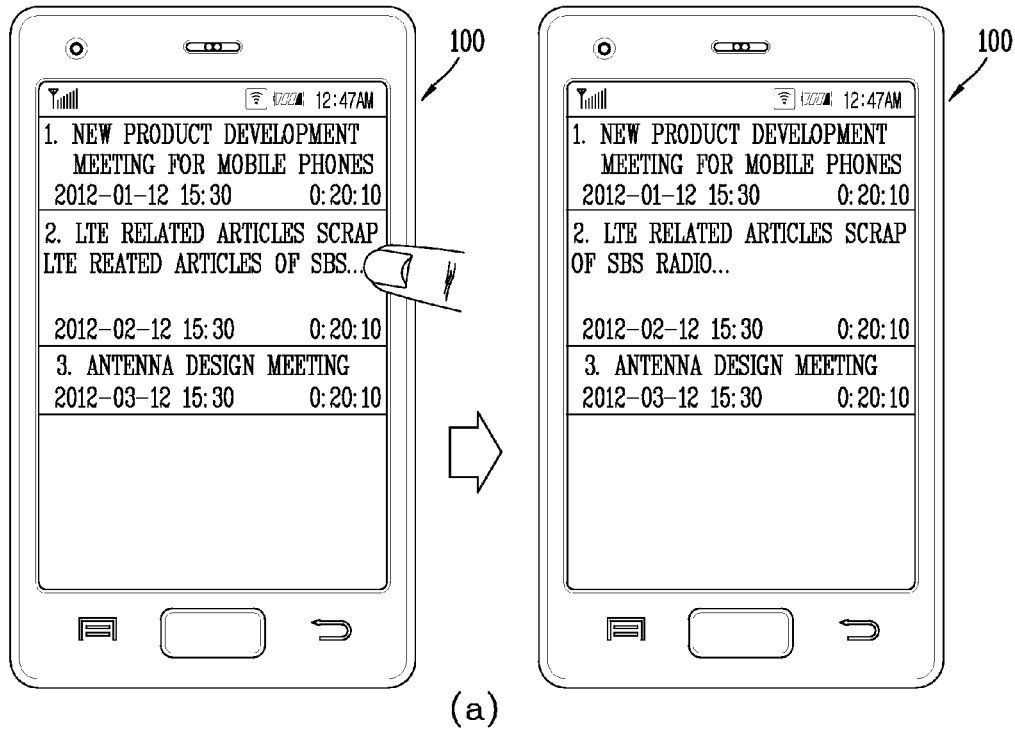
Figure 8C:
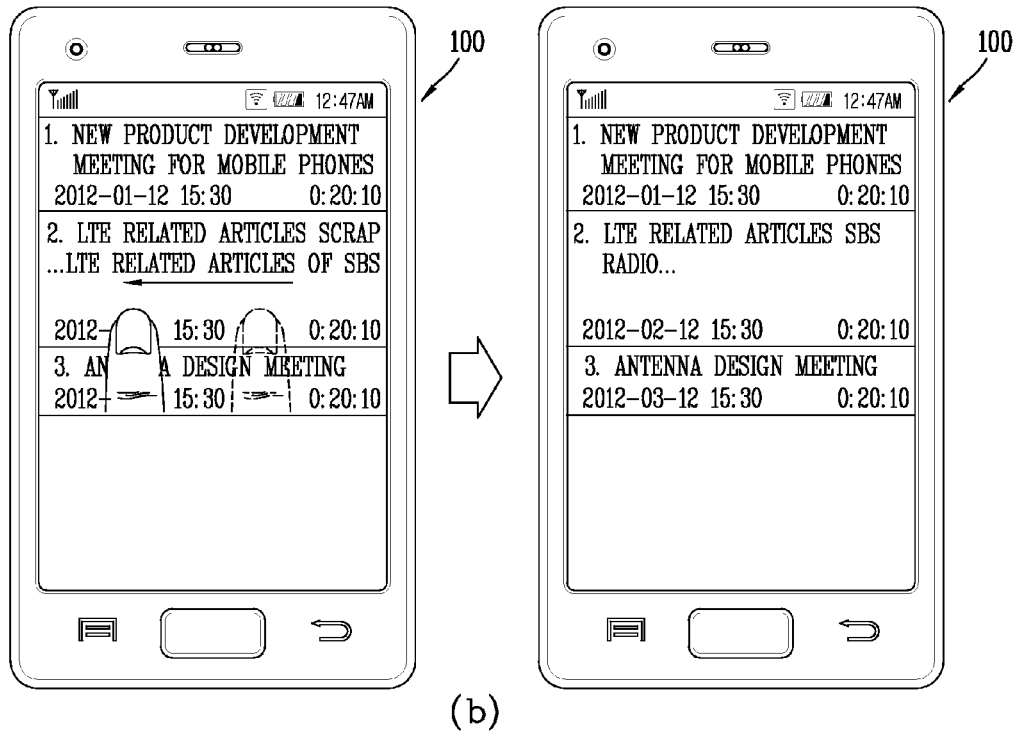

FIG. 8C illustrates another example of displaying a text string for describing the audio file.

Referring to FIG. 8C, when the user takes a gesture for a specific audio file when the mobile terminal 100 scrolls the text string in a circumstance that the entire text string for an audio file cannot be displayed on one screen, the scrolling speed of the text string can be controlled.

Specifically, it is illustrated that the mobile terminal 100 first displays "LTE related articles SBS radio" for the illustrated second audio file and then moves it in the left direction and finally displays a subsequent portion of "radio".

At this time, when the user touches or drags the corresponding portion of the screen as a gesture for the second audio file, the mobile terminal 100 may display the text string by decreasing or increasing the scrolling speed, namely moving speed. Specifically, when the user touches the second audio file, the mobile terminal 100 may decrease the scrolling speed, thereby allowing the user to more accurately read the text string. Otherwise, when the user drags the second audio file, the mobile terminal 100 may increase the scrolling speed. For example, the scrolling speed may be increased in case of dragging as illustrated in FIG. 8C(b) than a case of touching as illustrated in FIG. 8C(a).

As another specific example, when the user drags the second audio file in the right direction, the mobile terminal 100 may move the text string in the opposite scrolling direction.

On the other hand, when the user indicates the corresponding portion of the screen with his or her finger without touching or dragging the corresponding portion of the screen as a gesture for the second audio file, the mobile terminal 100 may recognize the user's finger gesture through the camera, and decrease the scrolling speed according to the finger gesture. Furthermore, when the user indicates the corresponding portion of the screen with his or her finger and then moves it in the left or the right direction as a gesture for the second audio file, the mobile terminal 100 may increase the scrolling speed or move the text string in the opposite scrolling direction.

FIG. 8D illustrates another example of displaying a text string for describing the audio file.

Referring to FIG. 8D, the user may access the text or text string of an audio file with his or her voice in a state that three audio files are displayed on the screen of the mobile terminal. It will be described below in detail.

As illustrated in the drawing, text strings "new product development meeting for mobile phones", "LTE related articles scrap", "antenna design meeting" are displayed on the screen of the mobile terminal, and a text string being scrolled "article SBS radio" is displayed in the "LTE related articles scrap". Furthermore, in this case, the file name itself may be scrolled as in the third file. For another example, though not shown in the drawing, the file name may be created such as AUDIO_001 by appending a numeral other than a core keyword, and a text string displayed along with the file name may be displayed while being scrolled.

At this time, when the user utters "Please summarize and speak the second voice memo", the mobile terminal 100 may recognize the conversation command, and display core keywords extracted from the corresponding text of the second audio file on the screen or output them with a voice. The output voice may be one for which the extracted core keywords are converted into a voice through a text-to-speech (TTS) conversion. Otherwise, the output voice may be one for which only portions related to the keywords are extracted from the audio file and the extracted portions are combined with one another.

In this case, the mobile terminal 100 may display core keywords on the screen or output them with a voice through the following process. For example, when the conversation command is recognized, the mobile terminal 100 may perform STT and then display the recognized text string, i.e, "Please summarize and speak a second voice memo" on a portion of the screen, for instance, on a lower end of the screen. Subsequently, the electronic device, for instance, mobile terminal 100 may output a question "Is it right for your request?" through the speaker. Otherwise, the mobile terminal 100 may output a question "Is it right that you have requested to summarize and speak a second voice memo?

Otherwise, alternatively; when the user utters "Please speak about LTE related articles in detail", the electronic device, for instance, mobile terminal 100, may recognize the conversation command and perform STT to output "Do you want to have the detailed content of LTE related articles?" with a voice or display it on the screen.

When the voice of an affirmative expression (or position expression, for instance, Okay, Yes, Thank you, etc.) is received subsequent to outputting the above question, the mobile terminal 100 may display core keywords extracted from a text corresponding to the second audio file on the screen or output them with a voice.

Otherwise, even when there is no input from the user for a predetermined period of time subsequent to outputting the question, the mobile terminal 100 may analyze it as an affirmative expression.

Figure 8E:
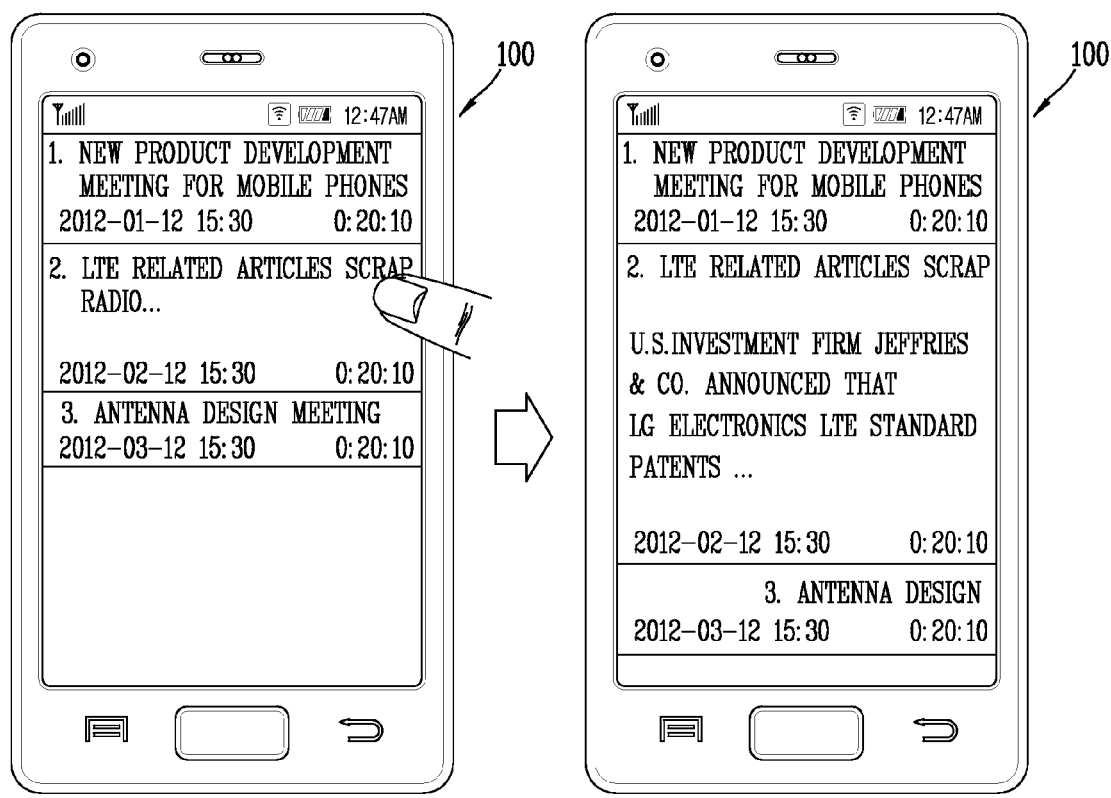

FIGS. 8E and 8F illustrate another example of displaying a text string for describing the audio file in detail.

Referring to FIG. 8E, when the user takes a gesture for a specific text string in a state that text strings for three audio files are displayed on the screen of the mobile terminal, the electronic device, for instance, mobile terminal 100 may display the column to which the relevant text string belongs with a larger width, and display a more detailed description for the text string in the relevant column. It will be described below in detail.

As illustrated in the drawing, text strings "new product development meeting for mobile phones", "LTE related articles scrap", "antenna design meeting" are displayed on the screen of the mobile terminal, and a text string being scrolled "article SBS radio" is displayed in the "LTE related articles scrap".

At this time, when the user touches the column to which the second text string belongs for more than a predetermined period of time on the screen, the mobile terminal 100 may display the column to which the second text string belongs with a larger width. At this time, a width of the column to which the second text string belongs is widened and as a result, the third column may be moved toward the lower portion thereof or may not displayed on the screen.

Subsequently, the mobile terminal 100 may summarize and display an STT-based text corresponding to the second audio file within the second column with a larger width. At this time, when all the summarized content cannot be displayed within the second column with a larger width, the mobile terminal 100 may display a scroll bar on the right side.

On the other hand, such a method may be also enabled by another gesture other than performing a long touch to the column to which the second text string belongs on the screen by the user.

For example, even when the user touches the column to which the second text string belongs and then drags it in the bottom direction or drags it in the top direction on the screen, the mobile terminal 100 may display the column to which the relevant text string belongs with a larger width, and display a more detailed description for the text string in the relevant column.

Referring to FIG. 8F, when the user touches the column to which the relevant text string belongs with his or her two fingers, and then drags it in a direction that the touched two fingers are moved away from each other, the mobile terminal 100 may display the column to which the relevant text string belongs with a larger width, and display a more detailed description for the text string in the relevant column.

In this case, a rate of the width of the column being widened may be controlled according to the dragging speed. For example, when the dragging speed is high as illustrated in FIG. 8F(b), the column may be enlarged more than a case that the dragging speed is low as illustrated in FIG. 8F(b). Moreover, when the dragging speed is greater than a predetermined size, the other columns may be disappeared to display the relevant text string on the entire screen.

Figure 8G:

FIG. 8G illustrates another example of displaying a text string for describing the audio file in detail.

As illustrated in FIG. 8G, when the detailed description of a text string for the second audio file is displayed, the electronic device, for instance, mobile terminal 100 may display a core keyword of the detailed description with a bold or underline attribute.

Otherwise, the mobile terminal may process and display the core keyword with a highlight or red attribute.

In general, when displaying the detailed description, if the content is arranged based on the core keyword, then the user may be unable to reconstruct and memorize the circumstance of the recording time. Accordingly, as illustrated in FIG. 8F, when displaying the detailed description, the mobile terminal 100 may display all the sentence containing the core keyword as well as the core keyword, and display the relevant core keyword with a bold or underline attribute, thereby allowing the user to reconstruct and memorize the circumstance of the recording time. At this time, when the user performs a touch to the core keyword with a bold or underline attribute, only the relevant portion may be reproduced from the audio file to output a voice. Otherwise, the portion may be created as a file name to be changed.

Alternatively, when displaying the detailed description, the mobile terminal 100 may arrange and display only the keywords. At this time, the keyword may be displayed with an underline attribute to indicate a link. In this case, when the user touches the relevant word on the screen, the mobile terminal 100 may reproduce only the relevant portion from the audio file while displaying all the sentence containing the core keyword.

For another example, when displaying the detailed description, if there are terms that are not typically used such as technical terms, then the mobile terminal 100 may process and display the relevant term with an enhancement effect, for instance, a bold, underline, highlight, or red attribute.

At this time, when the user touches the enhanced word on the screen as described above, the electronic device, for instance, mobile terminal 100 may display a prior search result of the word on the pop-up screen.

Figure 8H:
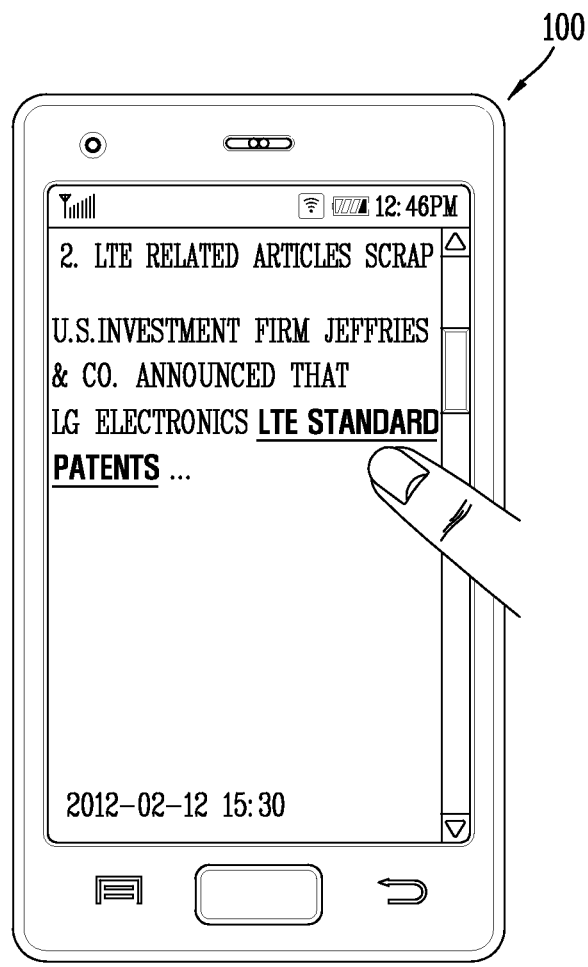

FIG. 8H illustrates another example of displaying an STT-based text corresponding to the audio file in detail on the entire screen.

When there is a gesture, for instance, double touch, to the foregoing audio file from the user, the mobile terminal 100 may display the whole STT-based text corresponding to the second audio file as illustrated in the drawing.

At this time, when the whole text cannot be all displayed on the screen, the electronic device, for instance, mobile terminal 100 may display a scroll bar on the right side thereof. When the whole text cannot be all displayed on the screen, the electronic device, the mobile terminal 100 may display a scroll bar on the right side thereof while displaying the whole text from the beginning, but alternatively, the mobile terminal 100 may display it from a portion containing a core keyword in the whole text on the screen. In this manner, it enables the user not to unnecessarily read a portion such as greetings typically made by speakers when recording is carried out.

As described above, the core keyword may be displayed with an enhancement processing, for instance, bold, underline, highlight, or red attributes, and when the user touches the enhanced core keyword, the relevant portion of an audio file may be output with a voice.

FIG. 8I illustrates an example of allowing the user to send a command with a voice in a state that an STT-based text corresponding to the audio file is displayed in detail on the entire screen.

As described above, the mobile terminal 100 may display a screen for receiving a voice command from the user at a lower end portion thereof while displaying the whole STT-based text.

At this time, when the user utters "Would you play from the LTE standard patent portion?", the mobile terminal 100 recognizes the voice command and reproduce a voice from the relevant portion.

In this case, the mobile terminal 100 may perform STT prior to reproducing the voice to output the recognized text string "Would you play from the LTE standard patent portion?" with a voice or display it on the screen.

Figure 8J:
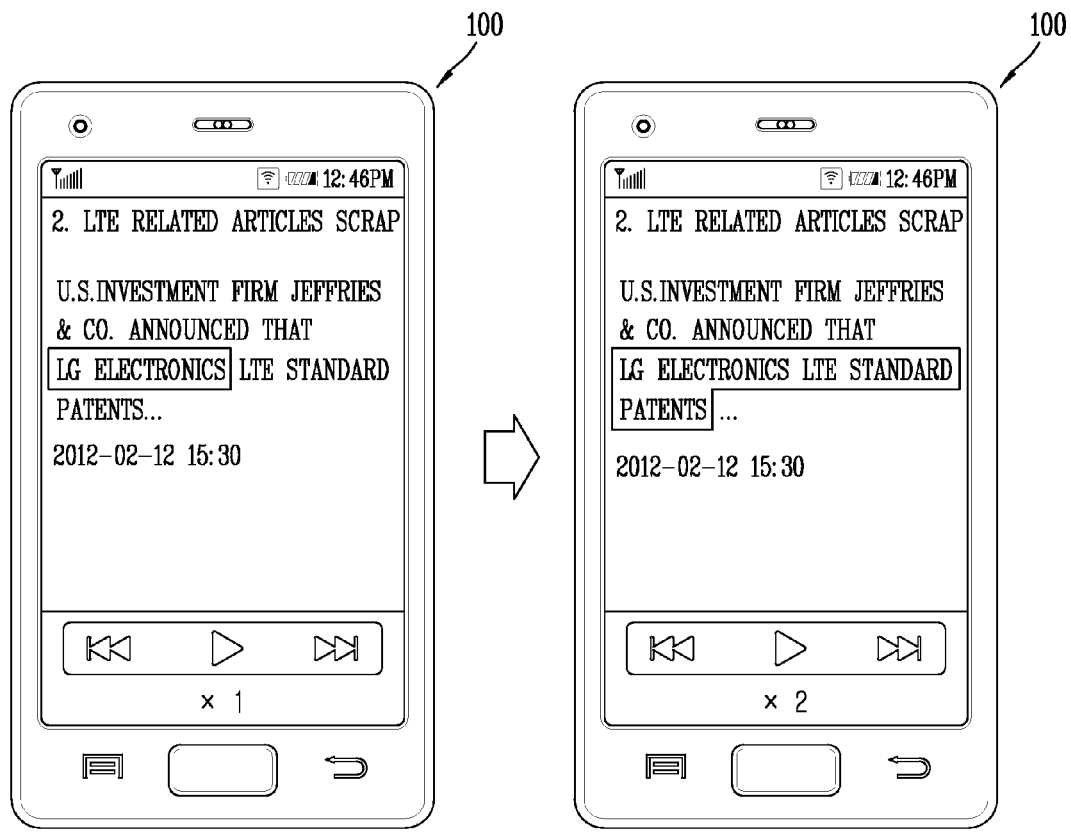

On the other hand, the display of the whole text may be controlled in interlock with the reproduction of a voice. For example, a text converted based on STT may be displayed on the display unit 151 along with the reproduction command of a voice as illustrated in FIG. 8J. In this case, an indicator indicating a text portion corresponding to the voice currently being reproduced is displayed on the display unit 151, and the indicator is moved in interlock with voice reproduction.

Furthermore, the mobile terminal 100 is implemented to enable the control of a reproduction speed during voice reproduction, and the indicator is formed to change the movement speed or form thereof according to the reproduction speed. As an example of them, when the indicator is a block of highlighting a specific range as illustrated in FIG. 8J, it may be formed to highlight one word when the reproduction speed of the block is 1× speed but highlight a plurality of words when the reproduction speed of the block is 2× speed.

As described above, according to a third embodiment of the present disclosure, the mobile terminal 100 may display a text string made of core keywords upon receiving an access request for a list of audio files, and may output the whole text when there is a gesture for the text string from the user. Furthermore, according to a third embodiment of the present disclosure, the user may control the reproduction of an audio file in a more convenient manner through a text string made of the core keywords.

A fourth embodiment disclosed herein may be implemented by a part or combination of configurations or steps included in the foregoing embodiments, or implemented by a combination of the embodiments. Hereinafter, the redundant portions will be omitted for the explicit expression of the fourth embodiment disclosed herein.

Figure 9A:
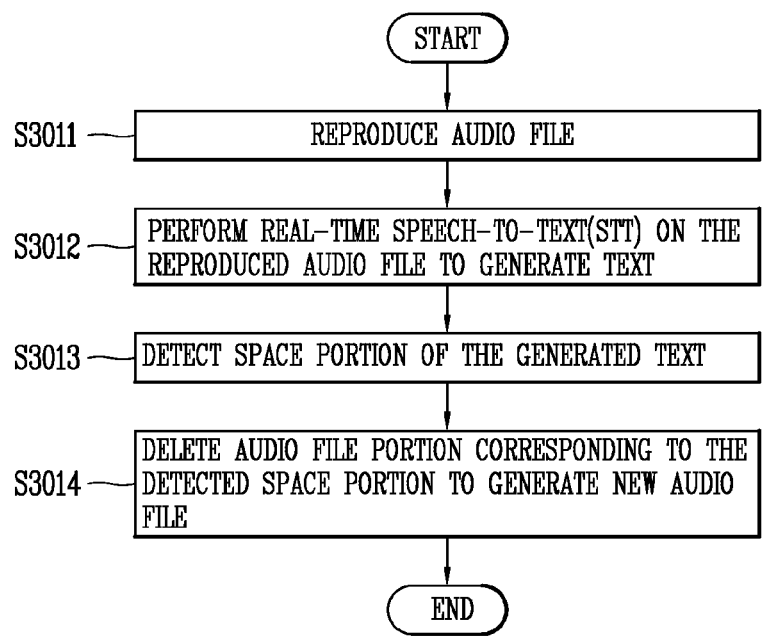
FIGS. 9A through 9F are views illustrating an operation control process of a mobile terminal according to a fourth embodiment disclosed herein.

FIG. 9A is a flow chart illustrating an audio file editing method according to a fourth embodiment disclosed herein.

Referring to FIG. 9A, an audio file editing method according to a fourth embodiment disclosed herein may be carried out in the following steps.

First, the mobile terminal may reproduce a specific audio file among a plurality of audio files stored therein (S3011). Next, the mobile terminal may perform a real-time speech-to-text (STT) for the reproduced specific audio file.

Furthermore, the mobile terminal may generate a text (text string or script) corresponding to the audio file based on the performed real-time speech-to-text (STT) (S3012).

Next, the mobile terminal may detect a space portion of the generated text (text string or script) (S3013). Here, the space portion may denote a portion with a vacant character (or vacant text string) contained in the text (text string or script).

Next, the mobile terminal may delete an audio file portion corresponding to the detected space portion. Furthermore, the mobile terminal may generate a new audio file based on the remaining audio file portion excluding the deleted audio file portion (S3014).

Figure 9B:
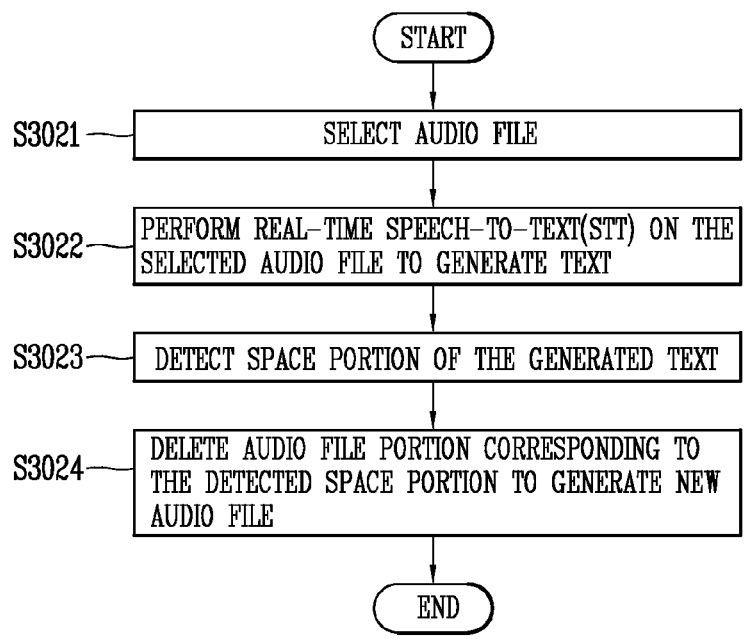

Referring to FIG. 9B, an audio file editing method according to a fourth embodiment disclosed herein may be applicable to a prestored file.

According to the editing method applicable to a prestored file, the mobile terminal 100 may first select a specific audio file among a plurality of audio files stored therein (S3021). Next, the mobile terminal 100 may perform an speech-to-text (STT) for the selected specific audio file.

Furthermore, the mobile terminal 100 generates a text (text string or script) corresponding to the audio file based on the performed speech-to-text (STT) (S3022), and detects a space portion of the generated text (text string or script) (S3023).

Next, the mobile terminal deletes an audio file portion corresponding to the detected space portion, and generates a new audio file based on the remaining audio file excluding the deleted audio file (S3024).

Figure 9C:
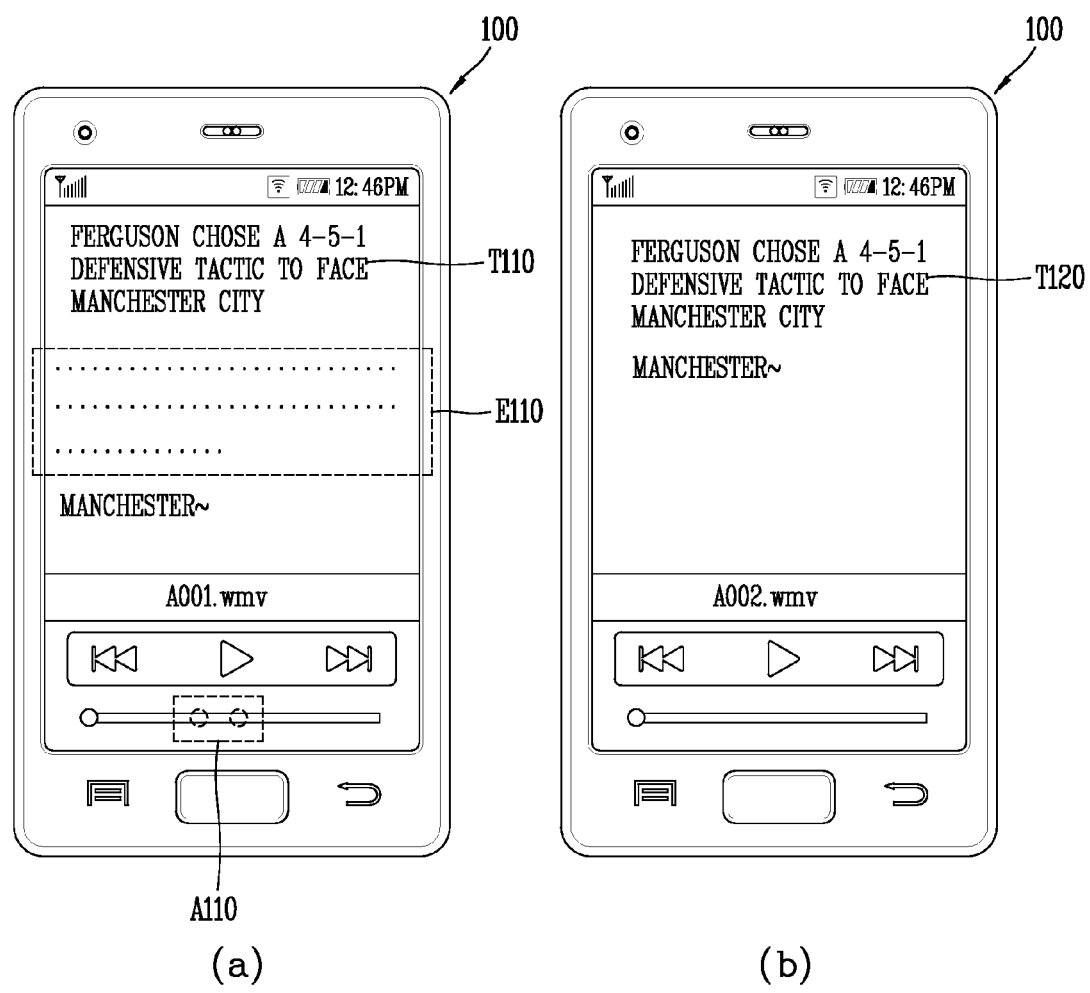

FIG. 9C is an exemplary view illustrating an audio file editing method according to a fourth embodiment disclosed herein.

When the specific audio file (A001.wmv) contains a vacant audio section (A110), the user deletes the audio section (A110) that should be deleted based on the audio file editing method according to a fourth embodiment disclosed herein to generate a new audio file (A002.wmv).

The audio file editing method according to a fourth embodiment disclosed in FIG. 9C may be applicable both to a real-time speech-to-text (STT) while reproducing an audio file and to an speech-to-text (STT) subsequent to selecting an audio file.

Referring to FIG. 9C(a), the mobile terminal 100 may select a first audio file (A001.wmv) among audio files stored therein based on the terminal user's select input.

Furthermore, the mobile terminal 100 may reproduce the selected first audio file (A001.wmv). In this case, the mobile terminal 100 may perform an speech-to-text (STT) for the selected first audio file (A001.wmv).

The mobile terminal 100 may display a first text (T110) generated based on the speech-to-text (STT) in a partial region of the screen of the mobile terminal.

Furthermore, the mobile terminal 100 may detect a space portion (E110) of the first text (T110).

In this case, the mobile terminal 100 may detect a portion (A110) of the audio file (A001.wmv) corresponding to the detected space portion (E110).

Referring to FIG. 9C(b), the mobile terminal 100 may delete a portion (A110) of the audio file (A001.wmv) corresponding to the space portion (E110), and may generate a new audio file (A002.wmv) containing the remaining portion excluding the deleted portion (A110) of the audio file (A001.wmv).

In this case, it may be possible to check that the new audio file (A002.wmv) does not have the audio portion (A110) corresponding to the space portion (E110) in FIG. 9C(b).

Figure 9D:
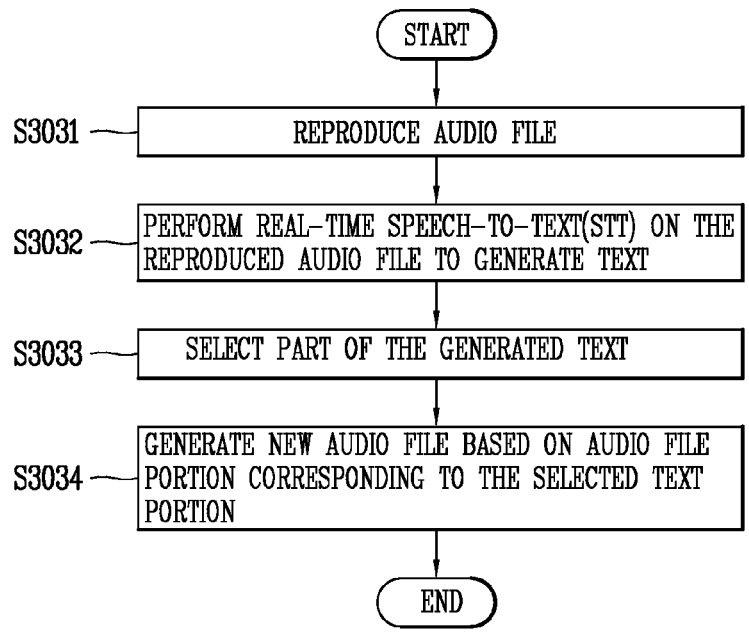

FIG. 9D is a flow chart illustrating another audio file editing method according to a fourth embodiment disclosed herein.

Referring to FIG. 9D, an audio file editing method according to a fourth embodiment disclosed herein will be implemented in the following steps.

First, the mobile terminal may reproduce a specific audio file among a plurality of audio files stored therein (S3031). Next, the mobile terminal may perform a real-time speech-to-text (STT) for the reproduced specific audio file.

Furthermore, the mobile terminal may generate a text (text string or script) corresponding to the audio file based on the performed real-time speech-to-text (STT) (S3032).

Next, the mobile terminal may detect part of the generated text (text string or script) (S3033). Next, the mobile terminal may delete an audio portion corresponding to the selected text portion.

Furthermore, the mobile terminal may generate a new audio file based on the remaining audio file portion excluding the deleted audio file portion (S3034). However, the present disclosure is not limited to this, and the selected text portion may be generated and stored as a new audio file.

Figure 9E:
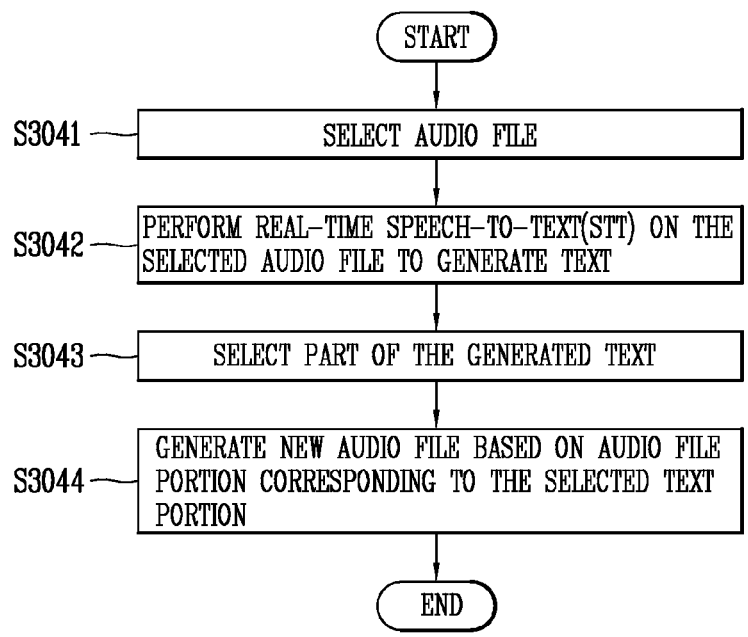

As illustrated in FIG. 9E, an audio file editing method disclosed in FIG. 9D may be also applicable to a prestored file.

Referring to FIG. 9E, the mobile terminal first selects a specific audio file among a plurality of audio files stored therein (S3041), and performs an speech-to-text (STT) for the selected specific audio file. Hereinafter, the remaining process for generating a new audio file may be carried out similarly to the method disclosed in FIG. 9D.

Figure 9F:
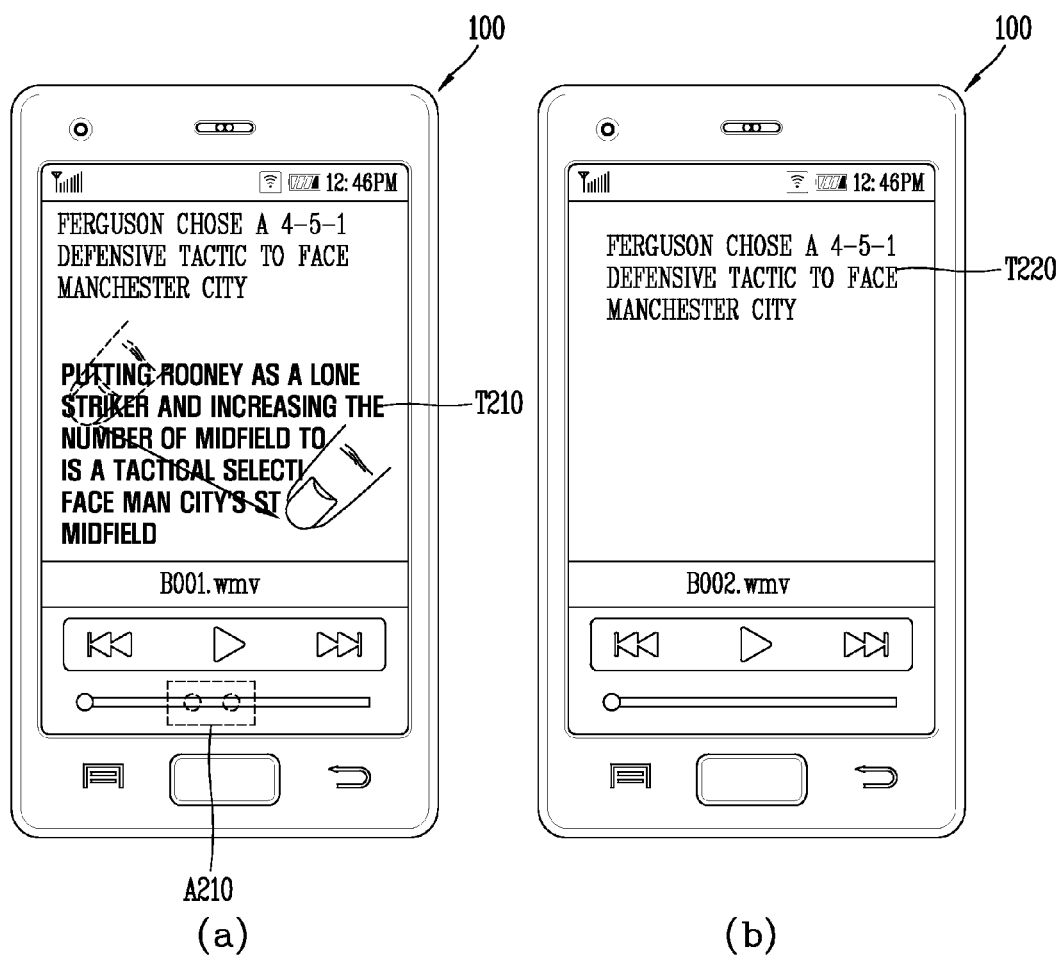

FIG. 9F is an exemplary view illustrating an audio file editing method disclosed in FIG. 9D or 9E. The audio file editing method disclosed in FIG. 9F may be applicable both to a real-time speech-to-text (STT) while reproducing an audio file and to an speech-to-text (STT) subsequent to selecting an audio file.

Referring to FIG. 9F(a), the mobile terminal 100 may select a specific audio file (B001.wmv) among audio files stored therein based on the mobile terminal user's select input. The stored audio file may be a temporary storage file of audio currently being recorded.

When the specific audio file (B001.wmv) is selected, the mobile terminal 100 may perform an speech-to-text (STT) for the specific audio file (B001.wmv).

The selected specific audio file (B001.wmv) may be reproduced or a text generated based on the speech-to-text (STT) may be displayed in a partial region of the screen of the mobile terminal. In this case, the reproduction and output of a text should be at the same time.

When the specific audio file (B001.wmv) contains an audio section (A210) that should be deleted, the audio section (A210) that should be deleted may be deleted based on the audio file editing method to generate a new audio file (B002.wmv).

More specifically, as illustrated in the drawing, the mobile terminal 100 may select a specific text (T210) of the generated text based on the user's select input.

The user's select input may be input to the mobile terminal in various ways. For example, as illustrated in FIG. 9F(a), the user may apply a touch input to the mobile terminal. Furthermore, the user may generate a drag event based on the touch input. In other words, the mobile terminal 100 may select the specific text (T210) based on the drag. Here, it may be a specific audio section (or portion, A210) of the audio file (B001.wmv) corresponding to the specific text (T210). In addition, it should be understood by those skilled in the art that the user's select input can be applied to the mobile terminal in various ways.

Referring to FIG. 9F(b), the mobile terminal 100 may delete a specific portion (A210) of the audio file (B001.wmv) corresponding to the specific text (T210), and may generate a new audio file (B002.wmv) containing the remaining portion excluding the deleted portion (A210) of the audio file (B001.wmv).

In this case, it may be possible to check that the new audio file (B002.wmv) does not have audio corresponding to the specific portion (A210) or the audio section (A210) corresponding to the specific text (T210) in FIG. 9F(b).

According to a modified fourth embodiment, on the contrary, the user may select a partial audio section of the audio file to separately store a text for the remaining audio section excluding the partial audio section.

Furthermore, the mobile terminal 100 may display a reproduced audio section indicator (for example, progress bar of FIG. 9F(a)) corresponding to the audio file (B001.wmv) on the screen of the mobile terminal. Furthermore, the user may select the audio section (A210) on the indicator based on a touch or drag.

Figure 10A:
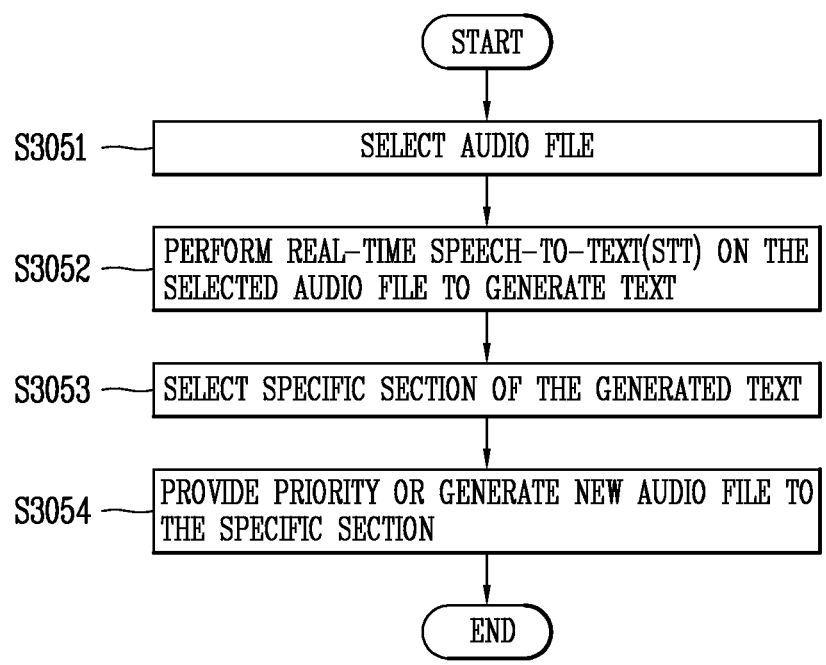
FIGS. 10A and 10B are views illustrating an operation control process of a mobile terminal according to a fourth embodiment disclosed herein.

FIG. 10A is a flow chart illustrating another embodiment for an audio file editing method according to the present disclosure.

Referring to FIG. 10A, the audio file editing method may select a specific audio file among a plurality of audio files stored therein (S3051). Next, the mobile terminal may perform a real-time speech-to-text (STT) for the selected audio file. In this case, the reproduction of the selected audio file may be operated at the same time.

The mobile terminal may generate a text (text string or script) corresponding to the audio file based on the performed real-time speech-to-text (STT) (S3052).

Next, a specific section of the generated text (text string or script) may be selected by the user (S3053). Finally, the mobile terminal provide a priority to the selected specific section or generate a new audio file corresponding to the specific section (S3054).

Figure 10B:
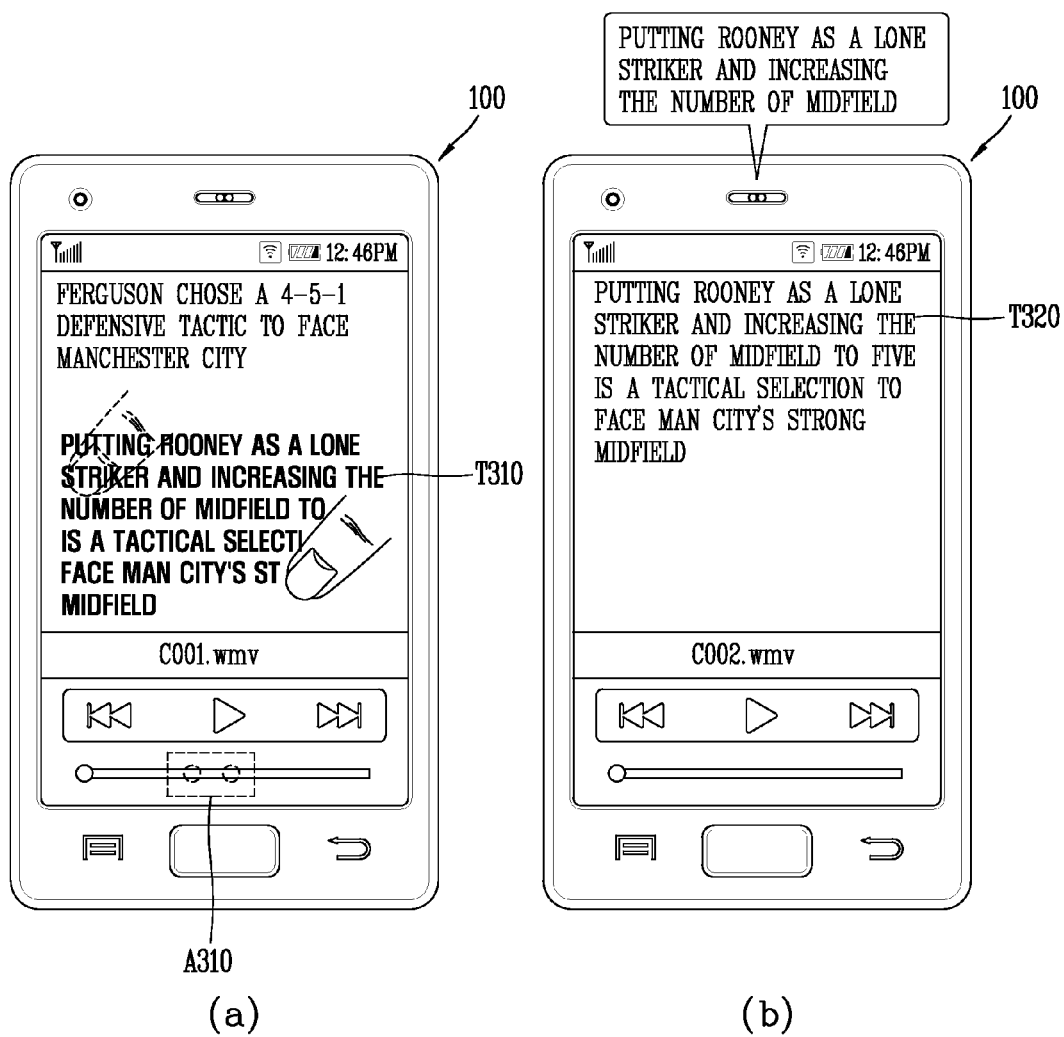

FIG. 10B is an exemplary view illustrating an audio file editing method in FIG. 10A.

The audio file editing method disclosed in FIG. 10B may be applicable both to a real-time speech-to-text (STT) while reproducing an audio file and to an speech-to-text (STT) subsequent to selecting an audio file.

Referring to FIG. 10A, the mobile terminal 100 may select a specific audio file (C001.wmv) among audio files stored therein based on the user's select input.

By means of the selection, the mobile terminal 100 may display a terminal generated based on an speech-to-text (STT) in a partial region of the screen of the mobile terminal. In this case, the mobile terminal 100 may reproduce the selected specific audio file (C001.wmv) along with the output of a text.

When it is desired to provide a priority to a partial audio section (A310) (or text section (T310)) in the audio section of the specific audio file (C001.wmv), the user may generate a file (C002.wmv) provided with a priority for the partial audio section (A310) based on the audio file editing method in FIG. 10A. For example, when a continuous touch to the text is sensed as illustrated in FIG. 10B(a), the mobile terminal 100 selects an audio section using the former touch as a start point and the latter touch as an end point. For another example, an audio section may be selected by a drag.

A priority is provided to the audio section, and stored as a new file. However, the present disclosure is not necessarily limited to this, and the priority may be provided to the initial audio file (C001.wmv) and updated as a new file. When the user select a file (C002.wmv) provided with a priority as illustrated in FIG. 10B(b), the output of a voice may be first output to the audio section (A310) provided with a priority.

As described above, according to a fourth embodiment disclosed herein, the editing of an audio file may be easily implemented. Hereinafter, a fifth embodiment disclosed herein will be described.

A fifth embodiment disclosed herein may be implemented by a part or combination of configurations or steps included in the foregoing embodiments, or implemented by a combination of the embodiments. Hereinafter, the redundant portions will be omitted for the explicit expression of the fifth embodiment disclosed herein.

A fifth embodiment disclosed herein illustrates a clustering method for an audio file (or voice memo, hereinafter, referred to as a "voice memo") stored in the mobile terminal.

The concept of clustering may be a generic term for schemes for classifying data into several groups based on according to a concept of similarity or the like.

In general, the clustering may be widely applicable to document retrieval, pattern recognition, management science, and the like.

According to a fifth embodiment disclosed herein, the user may select a classification reference for the voice memos as a clustering method for voice memos stored in the mobile terminal. The mobile terminal 100 classifies and lists the voice memos based on the selected classification reference to generate a list for the voice memos, and the generated list for the voice memos on the screen of the mobile terminal.

Furthermore, a fifth embodiment disclosed herein relates to a method in which the mobile terminal analyzes voice content for the voice memos to display the associated information on the screen, thereby allowing the user of the mobile terminal to easily send or transfer specific content to a specific person. It may be called a direct access method through a voice memo (or audio file). Here, the associated information may include for a pop-up window or link information on a place associated with the voice content, a schedule, a name of person, and a contact address (for example, phone number or email address).

Figure 11A:
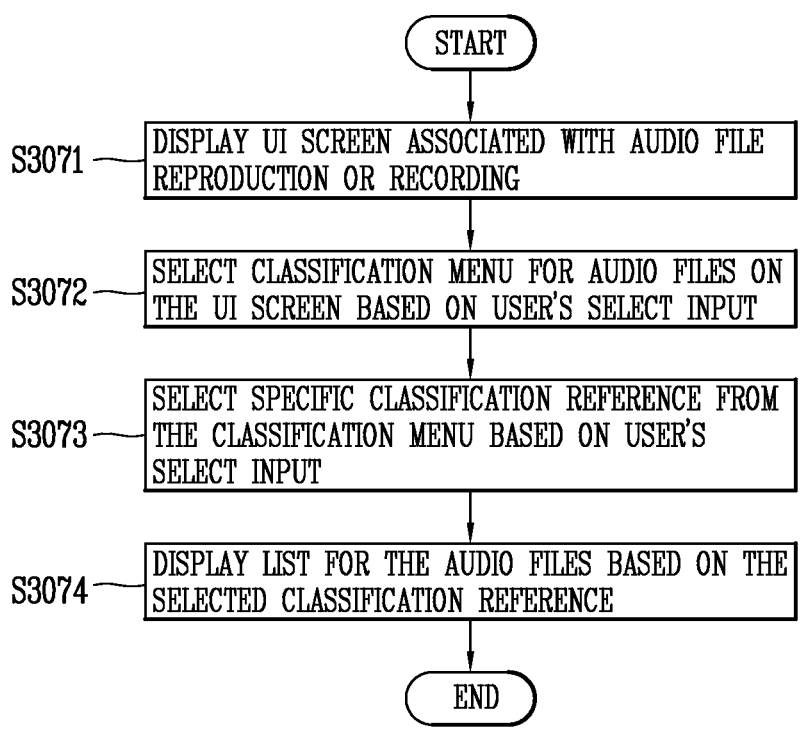
FIGS. 11A through 11C are views illustrating an operation control process of a mobile terminal according to a fifth embodiment disclosed herein.

FIG. 11A is a flow chart illustrating clustering (or classification method) for a voice memo according to a fifth embodiment disclosed herein. Referring to FIG. 11A, clustering (or classification method) for the voice memo may be carried out in the following steps.

First, the mobile terminal may display a UI screen associated with audio file reproduction or recording stored in the mobile terminal (S3071).

Next, the mobile terminal may display a classification menu for the audio files on the UI screen based on the mobile terminal user's select input (S3072).

Next, the mobile terminal may select a specific classification reference from the classification menu based on the user's select input (S3073).

Next, the mobile terminal may display a list for the audio files on the screen of the mobile terminal based on the selected classification reference (S3074).

Here, the UI associated with audio file reproduction or recording may include various UI elements. In other words, the UI may include various UI elements associated with the audio file reproduction or recording function by the mobile terminal.

For example, the UI (particularly, GUI) may include at least one of a play button, a play suspend button, a function activation button capable of reproducing at high speed, a function activation button capable of reproducing at low speed, a forward skip button, a backward skip button, an indicator indicating a reproduction audio section or reproduction time point of the audio file, a voice recording button for the mobile terminal user, a recording suspend button, and a UI element associated with text display which is an speech-to-text (STT) execution result of the audio file.

Figure 11B:
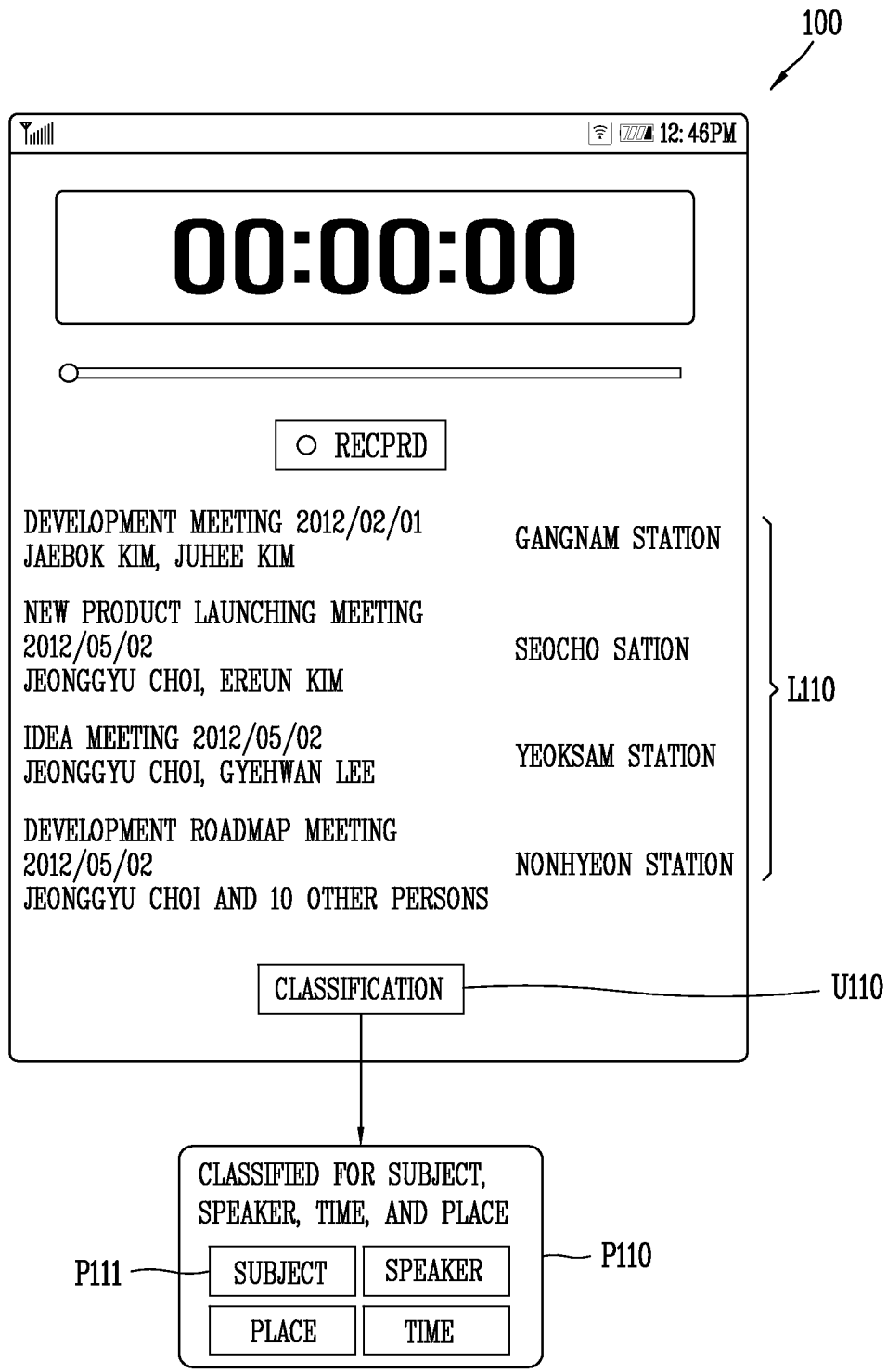

FIG. 11B is an exemplary view illustrating clustering for a voice memo according to a fifth embodiment disclosed herein.

Referring to FIG. 11B, the mobile terminal 100 may display a UI associated with the reproduction or recording of a voice memo stored therein on the screen of the mobile terminal. As described above, the UI may include an indicator indicating clustering (or classification) for the stored voice memos.

The indicator may be a button (U110) for activating a classification menu for the clustering (or classification).

When the mobile terminal user selects the classification menu activation button, the mobile terminal 100 may display a classification menu (p110) for the stored voice memos on the screen of the mobile terminal.

The classification menu (p110) may include a UI element for various classification references about the store voice memos.

For example, the UI element for classification reference may be a select button for the classification reference. Furthermore, the classification reference may be a "subject" button (p111), a "speaker" button, a "place" button, or a "time" button for the voice memos.

According to a fifth embodiment, when the user of the mobile terminal 100 selects a "subject" button (p111) among the classification buttons, the mobile terminal 100 may cluster (or classify) and list the voice memo for each "subject", and display a list (L110) for the voice memos on the screen of the mobile terminal 100.

For example, as in case of FIG. 11B, when the voice memos have a subject associated with meeting, the mobile terminal 100 may list the voice memos for each subject of the meeting, and display a list (L110) for the voice memos on the screen of the mobile terminal 100.

Figure 11C:
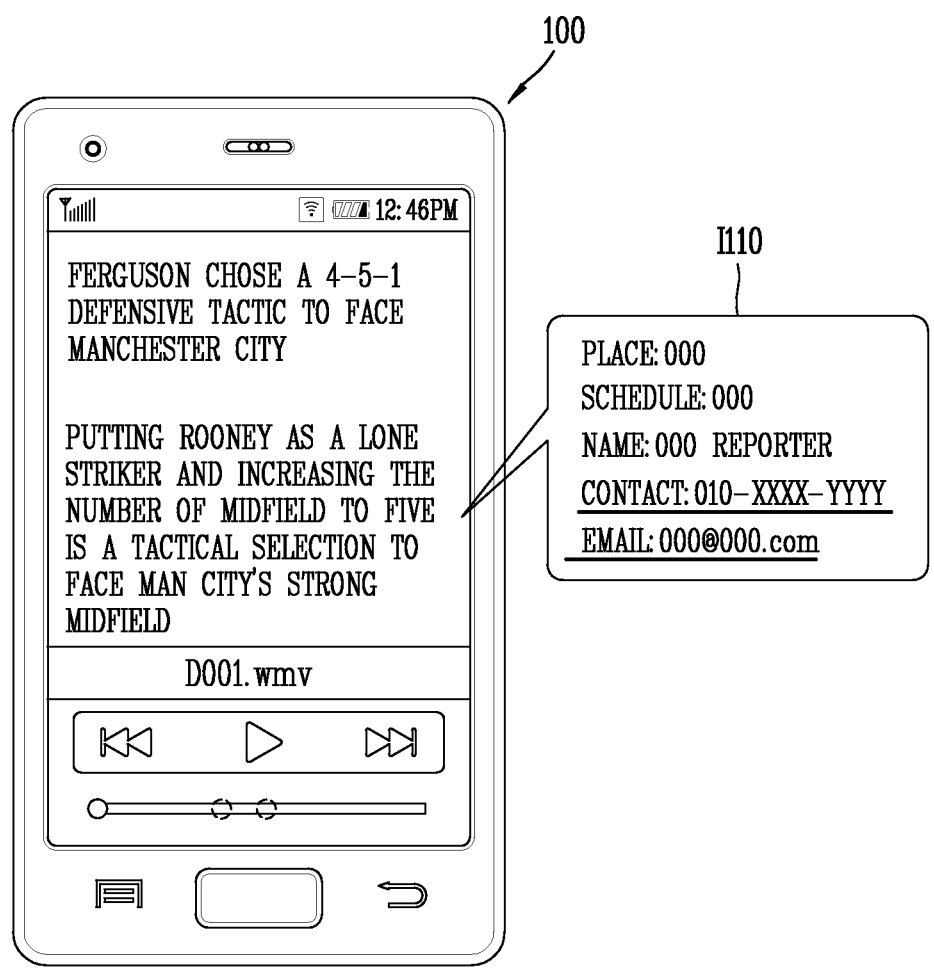

FIG. 11C is an exemplary view illustrating a direct access method based on the content of a voice memo according to a fifth embodiment disclosed herein.

Referring to FIG. 11C, the mobile terminal 100 may display a UI associated with the reproduction or recording of a voice memo stored therein on the screen of the mobile terminal 100.

The mobile terminal 100 may select and reproduce a specific audio file (D001.wmv) among audio files stored in the mobile terminal 100 based on the terminal user's select input through the UI.

In this case, the mobile terminal 100 may perform an speech-to-text (STT) for the specific audio file (D001.wmv), and may display a text generated based on the speech-to-text (STT) in a partial region of the screen of the mobile terminal 100. Moreover, in the state of a text being displayed, it may be displayed an indicator indicating a portion of which a voice is currently reproduced as described above.

According to a fifth embodiment, the mobile terminal 100 may analyze the content of the voice memo to display information associated with the voice memo on the screen of the mobile terminal 100.

For example, the information associated with the voice memo may include at least one of a place at which the voice memo is recorded, a schedule of person associated with the voice memo, a name of person associated with the voice memo, a contact address of person associated with the voice memo, and an email address of person associated with the voice memo.

The mobile terminal 100 may display information associated with the voice memo on the screen through a pop-up window (I110).

According to a fifth embodiment, when the user of the mobile terminal 100 selects specific information contained in the pop-up window (I110) (for example, selection based on a touch input on the screen), the mobile terminal 100 may provide a function capable of directly sending or contacting the selected specific information to a person associated with the specific information based on the selected specific information. As described above, it may be referred to as a direct access function based on information associated with the voice memo.

For example, referring to FIG. 11C, when the user selects a contact address portion among specific information contained in the pop-up window (I110), the mobile terminal 100 may perform a call connection function with a phone number corresponding to the contact address.

Furthermore, for example, when the user selects an email portion among specific information contained in the pop-up window (I110), the mobile terminal 100 may execute an application (for example, email editing program, Outlook program) for providing an email transfer function to transfer an email to the email address.

A sixth embodiment disclosed herein may be implemented by a part or combination of configurations or steps included in the foregoing embodiments, or implemented by a combination of the embodiments. Hereinafter, the redundant portions will be omitted for the explicit expression of the sixth embodiment disclosed herein.

A sixth embodiment disclosed herein relates to a search function for a specific audio section contained in a voice memo stored in the mobile terminal. The search function may be a navigation function for a specific audio section contained in the voice memo. Otherwise, the search function may be also a voice scanning function for a specific audio section contained in the voice memo.

Furthermore, a sixth embodiment disclosed herein relates to a search, navigation or scanning function for a specific text section corresponding to the specific audio section of a text which is an speech-to-text (STT) execution result corresponding to the voice memo according to the search function, the navigation function, or the voice scanning function.

As a result, according to a sixth embodiment disclosed herein, the voice memo and the search function for a text which is an speech-to-text (STT) execution result corresponding to the voice memo may have a reversible relation with each other.

In other words, when a search function for the voice memo is carried out, a search function for a text with respect to the voice memo may be also carried out at the same time. Furthermore, when a search function for a text with respect to the voice memo is carried out, a search function for the voice memo may be also carried out at the same time.

Figure 12A:
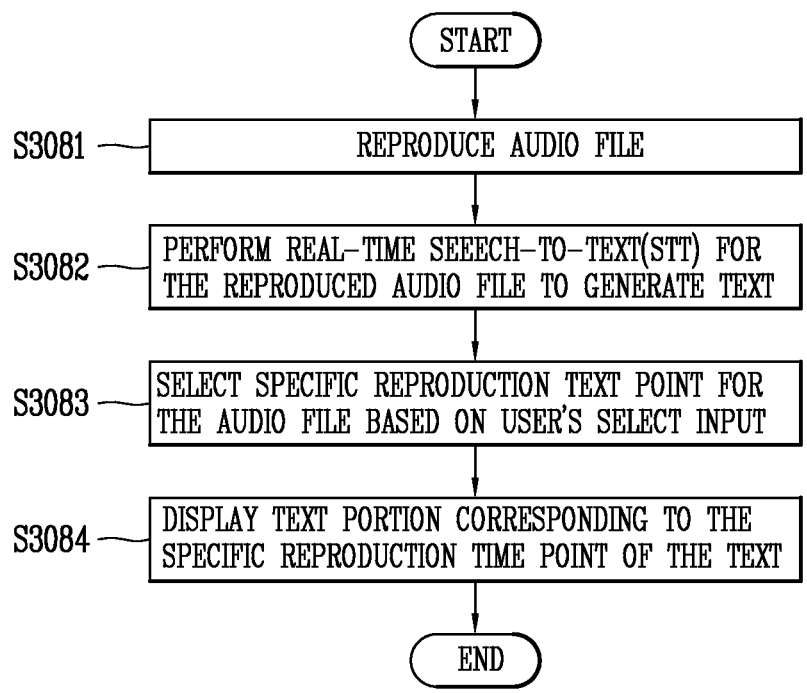
FIGS. 12A through 12G are views illustrating an operation control process of a mobile terminal according to a sixth embodiment disclosed herein.

FIG. 12A is a flow chat illustrating a search function execution method for a voice memo according to a sixth embodiment disclosed herein. Referring to FIG. 12A, a search function execution method for the voice memo may be carried out in the following steps.

First, the mobile terminal may reproduce a specific audio file among a plurality of audio files stored in the electronic device (S3081).

Next, the mobile terminal may perform a real-time speech-to-text (STT) for the reproduced specific audio file, and generate a text (text string or script) corresponding to audio file based on the performed real-time speech-to-text (STT) (S3082). However, in this case, the step of generating a text (S3082) may be omitted when a text based on STT has been generated or when a text has been generated based on other methods.

Next, the mobile terminal may select a specific reproduction time point for the audio file based on the mobile terminal user's select input (S3083). To this end, the mobile terminal may display a text portion corresponding to the specific reproduction time point of the text (text string or script) on the screen of the mobile terminal (S3084).

Figure 12B:
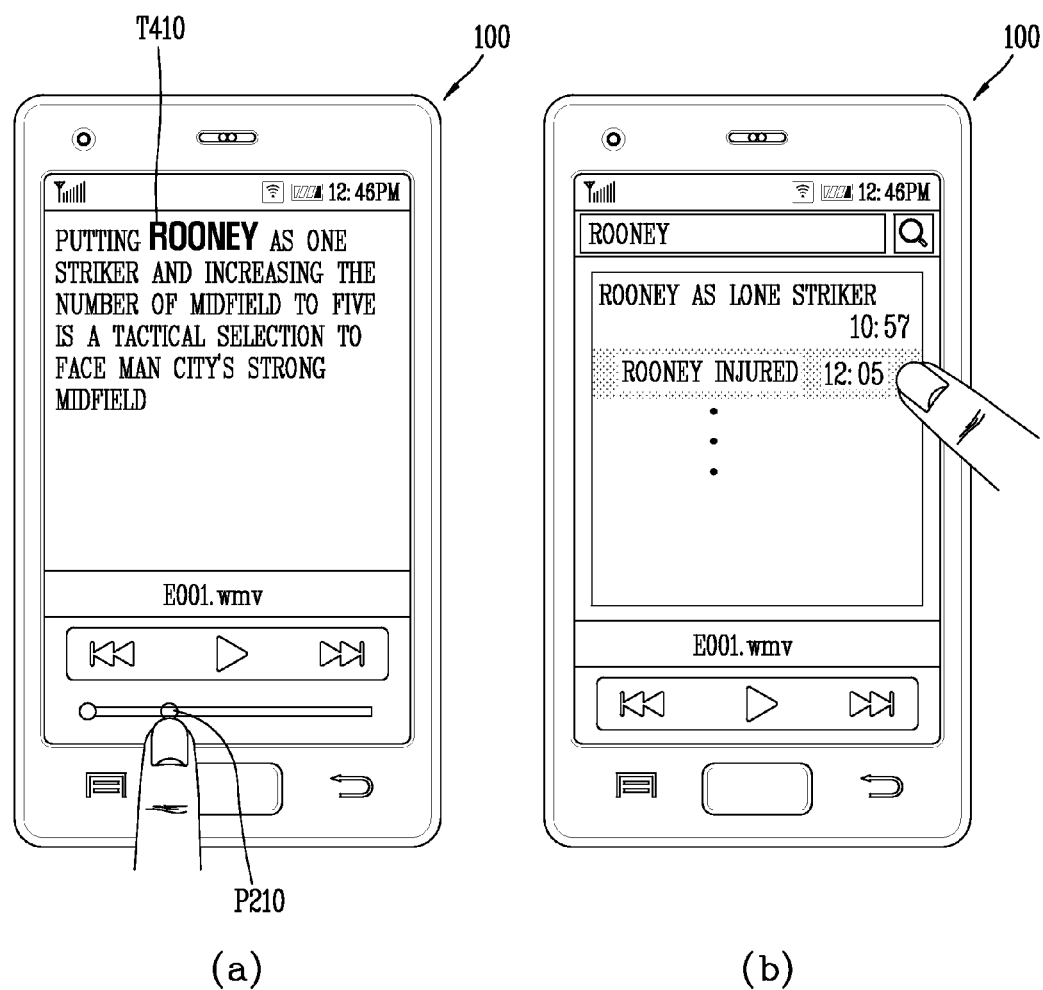

FIG. 12B is an exemplary view illustrating a search function execution method for a voice memo according to a sixth embodiment disclosed herein.

The mobile terminal 100 may display a UI associated with the reproduction or recording of a recorded voice memo (or audio file) on the screen of the mobile terminal 100.

The mobile terminal may select and reproduce a specific audio file (E001.wmv) among audio files stored in the mobile terminal based on the mobile terminal user's select input. At this time, the mobile terminal may display a text corresponding to a voice in a partial region of the screen of the mobile terminal.

According to a fifth embodiment, when the user of the mobile terminal selects a specific reproduction time point (p210) in the audio section of the specific audio file (E001.wmv), the mobile terminal 100 may find (or search) a portion corresponding to the specific reproduction time point (p210) in the text to display it on the screen of the mobile terminal.

When a search function for the text is described in detail with reference to FIG. 12B(a), the mobile terminal 100 may display a reproduced audio section indicator (for example, an audio reproduction section bar in FIG. 10C(a)) corresponding to the audio file (E001.wmv) on the screen of the mobile terminal.

Furthermore, the mobile terminal 100 may select the specific reproduction time point (p210) on the indicator based on the user's touch input. Moreover, the text displayed during the search using the progress bar operated by the user and the progress bar may be linked with each other.

For such an example, the mobile terminal 100 may reproduce the audio file (E001.wmv) from the specific reproduction time point (p210), and display a specific text (T410) corresponding to the selected specific reproduction time point (p210) in a text for the audio file (E001.wmv) at the same time on the screen of the mobile terminal 100.

More specifically, the controller enters an operation mode associated with the reproduction of a voice memo stored according to a user's request, and displays a text corresponding to a reproduction time point of the voice memo in at least a partial region of the screen of the electronic device in the operation mode, and senses a control command for changing the reproduction time point of the voice memo to change and output the displayed text to correspond to the changed reproduction time point when the control command is sensed.

A progress bar indicating the time information of the voice memo is displayed on the screen of the electronic device, and a reproduction time point for the voice memo is changed to correspond to a touch point for the progress bar.

In this case, the text is generated based on a speech-to-text (STT) conversion for the user's voice, and the text may be displayed while being scrolled in linkage with the reproduction of the voice memo.

For still another example, referring to FIG. 12B(b), a separate search window may be popped up by the user's control command input. For such an example, the search window may be carried out to receive a word desired to search as illustrated in the drawing, or a progress bar may be displayed as a search bar as illustrated in FIG. 12A. In case of the former, the user may input a word to perform a search operation, and the search result may be displayed in such a manner that sections used by the input word can be selected again by the user. In case of the latter, the user touches a specific point of the progress bar to perform a search operation, and as illustrated in the foregoing example, a text (or sentence containing the text) corresponding to the specific point is displayed on the screen when making a touch.

Figure 12C:
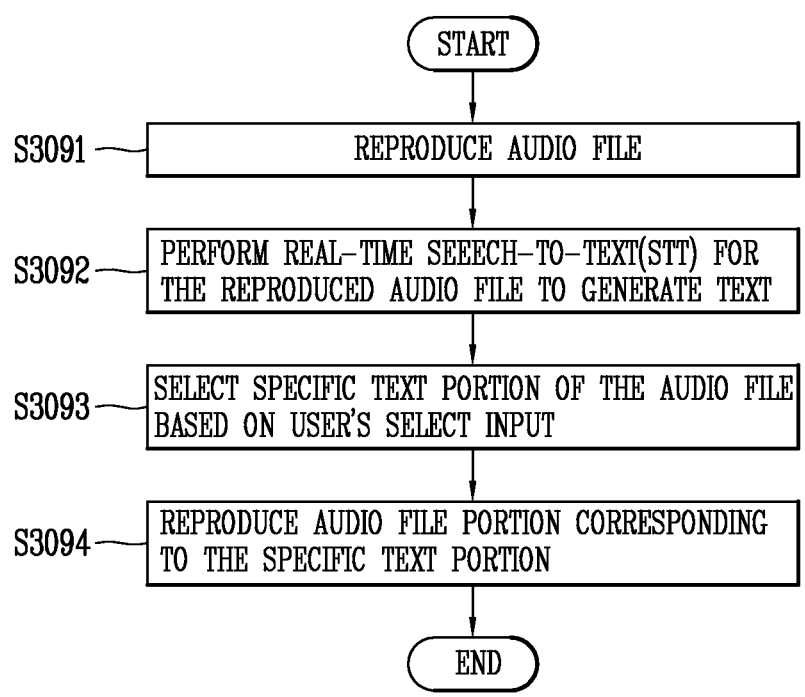

FIG. 12C is a flow chart illustrating a search function execution method for a voice memo according to a sixth embodiment disclosed herein.

Referring to FIG. 12C, a search function execution method for a voice memo (or audio file) according to a sixth embodiment disclosed herein may be carried out in the following steps.

The steps of S3091 and S3092 in the present example may be carried out similarly to the steps of S3081 and S3082 in a search function execution method illustrated in FIG. 12A.

According to the drawing, subsequent to the step S3092, the mobile terminal selects a specific text portion in the text (text string or script) based on the mobile terminal user's select input (S3093), and reproduces an audio file portion corresponding to the specific text portion (S3084).

However, the present disclosure is not necessarily limited to this. For example, when storing the audio file subsequent to the execution of STT, a new text file may be also stored along with the audio file. Through this, a text corresponding to the reproduced voice can be immediately displayed using a text file without a separate STT process during the reproduction of the audio file later. For such an operation, a time corresponding to a specific portion of the text may be synchronized with a time of the portion corresponding to the specific portion in the audio file.

Figure 12D:
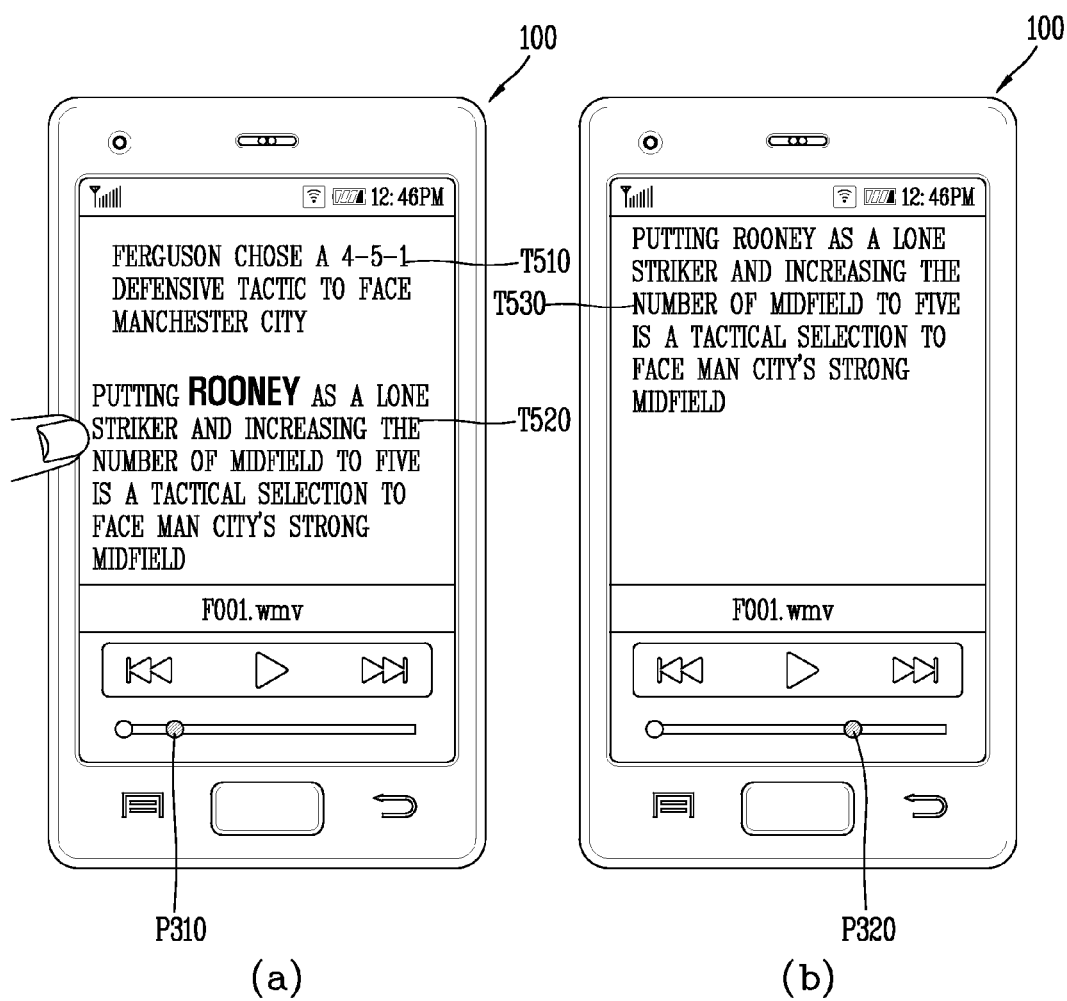

FIG. 12D is an exemplary view illustrating a search function execution method for a voice memo according to a sixth embodiment disclosed herein.

Referring to FIG. 12D(a), the mobile terminal 100 may display a UI associated with the reproduction or recording of a voice memo (or audio file) stored therein on the screen of the mobile terminal 100.

The mobile terminal 100 selects and reproduces a specific audio file (F001.wmv) among audio files stored therein based on the mobile terminal user's select input. Furthermore, a text (T510) generated based on an speech-to-text (STT) may be displayed in a partial region of the screen of the mobile terminal.

The mobile terminal 100 may select a specific text (T520) from the generated text (T510) based on the user's select input.

The selection for the specific text (T520) may be carried out based on the user's touch input and a drag event on the basis of the touch input. The mobile terminal 100 may select the specific text (T520) based on the drag event.

Referring to FIG. 12D(b), when the specific text (T520) is selected, the mobile terminal 100 may change the reproduction time point of the audio file (F001.wmv) from a reproduction time point (p310) of the audio file (F001.wmv) at present to a specific reproduction time point (p320) corresponding to the specific text (T520).

At this time, the mobile terminal 100 may display a text (T530) corresponding to the specific reproduction time point in an upper end portion of the screen of the mobile terminal while at the same time changing the reproduction time point of the audio file (F001.wmv).

Figure 12E:
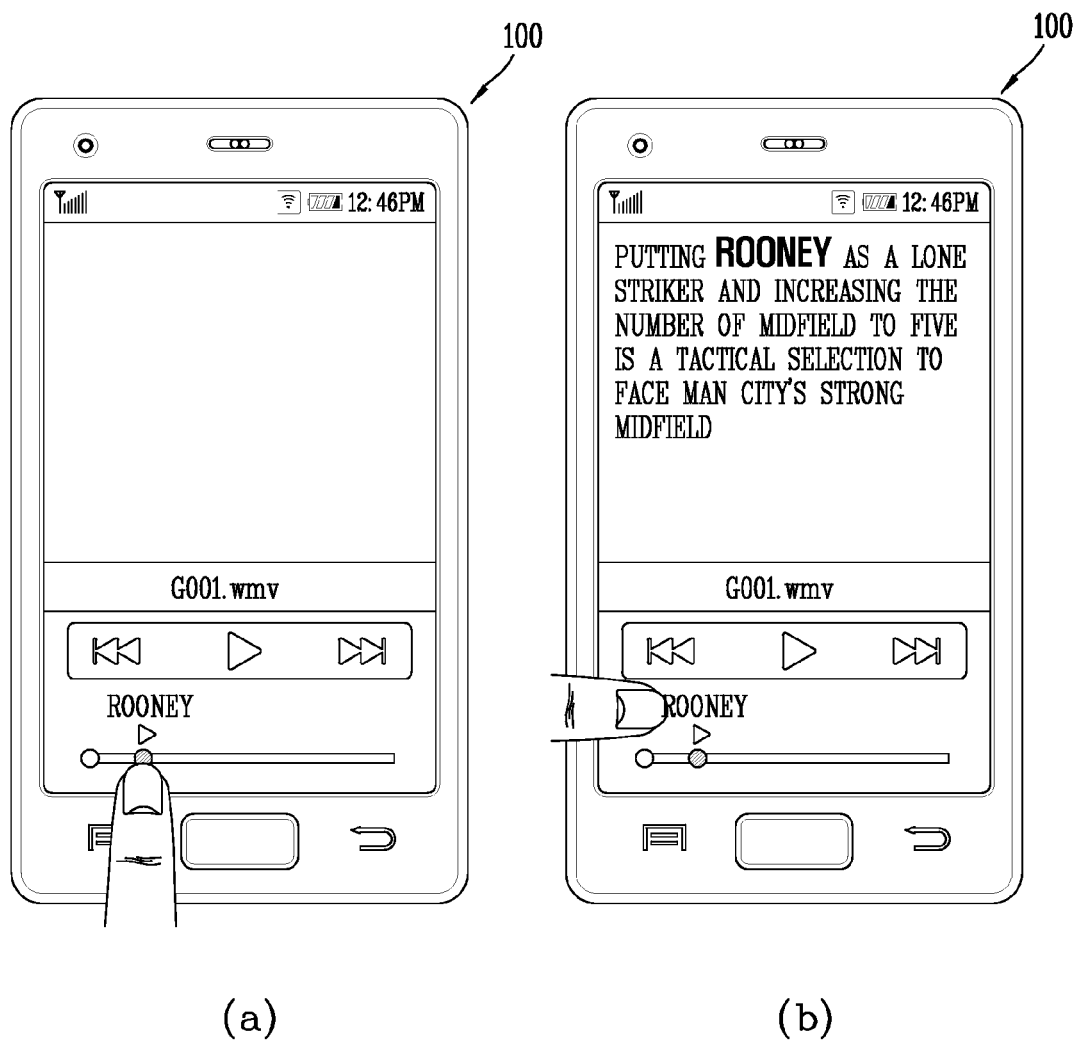

Referring to FIG. 12E, for another example, when the user touches a specific position of the progress bar while reproducing voice, a text at a specific time point corresponding to the specific position may be displayed along with the indicator. Then, when the user touches the text or indicator, it may be possible to change a reproduction time point of the audio file (G001.wmv) to correspond to the portion as well as display a text corresponding to the specific reproduction time point in a partial region of the screen of the mobile terminal.

Figure 12F:
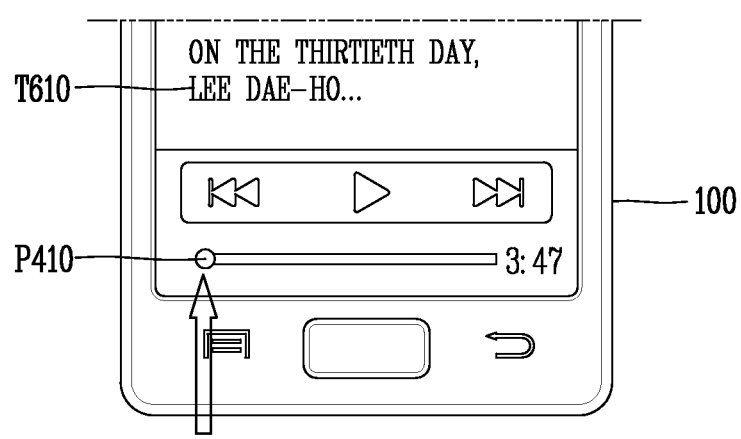
Figure 12F:
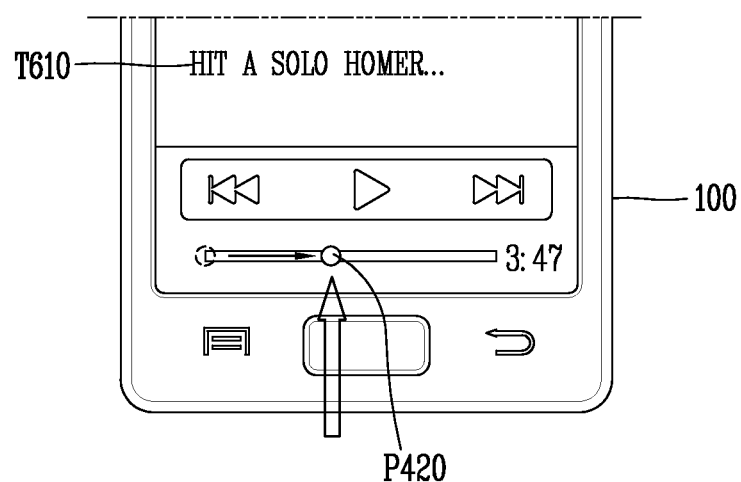

FIG. 12F is an exemplary view illustrating an audio scanning method according to a sixth embodiment disclosed herein.

The sixth embodiment disclosed in FIG. 12F illustrates a case in which the mobile terminal displays a specific text portion corresponding to the reproduction time point of the audio file in a text based on the execution of an speech-to-text (STT) to the audio file according to a specific effect along with the reproduction of the audio file stored therein.

For example, the specific effect may be an effect of displaying the specific text portion while moving it from the right side of the screen to the left side thereof. Furthermore, the movement of the specific text may be expressed along with a drift effect.

Furthermore, for example, the specific effect may refer to a highlight effect of the specific text portion. In this case, the highlight effect may refer to an effect of enhancing the specific text portion (for example, a bold character or relatively larger sized character compared to other text portions).

Furthermore, an audio scanning method according to a sixth embodiment disclosed in FIG. 12F may include a function in which when a reproduction time point of the audio file is changed by the mobile terminal user's select input during the reproduction of the audio file stored in the mobile terminal, it is changed and displayed with a text portion corresponding to the changed reproduction time point.

Referring to FIG. 12F(a), the mobile terminal 100 may reproduce the audio file at a first reproduction time point (p410).

In this case, the mobile terminal 100 may display a text (T610) ("Daeho Lee . . . on the thirtieth") corresponding to the first reproduction time point on the screen of the mobile terminal.

Referring to FIG. 12F(b), when the mobile terminal user changes a reproduction time point for the audio file to a second reproduction time point (p420), the mobile terminal 100 may display a text (T620) (" . . . a solo homer") corresponding to the second reproduction time point (p420) along with a change of the reproduction time point for the audio file on the screen.

Figure 12G:
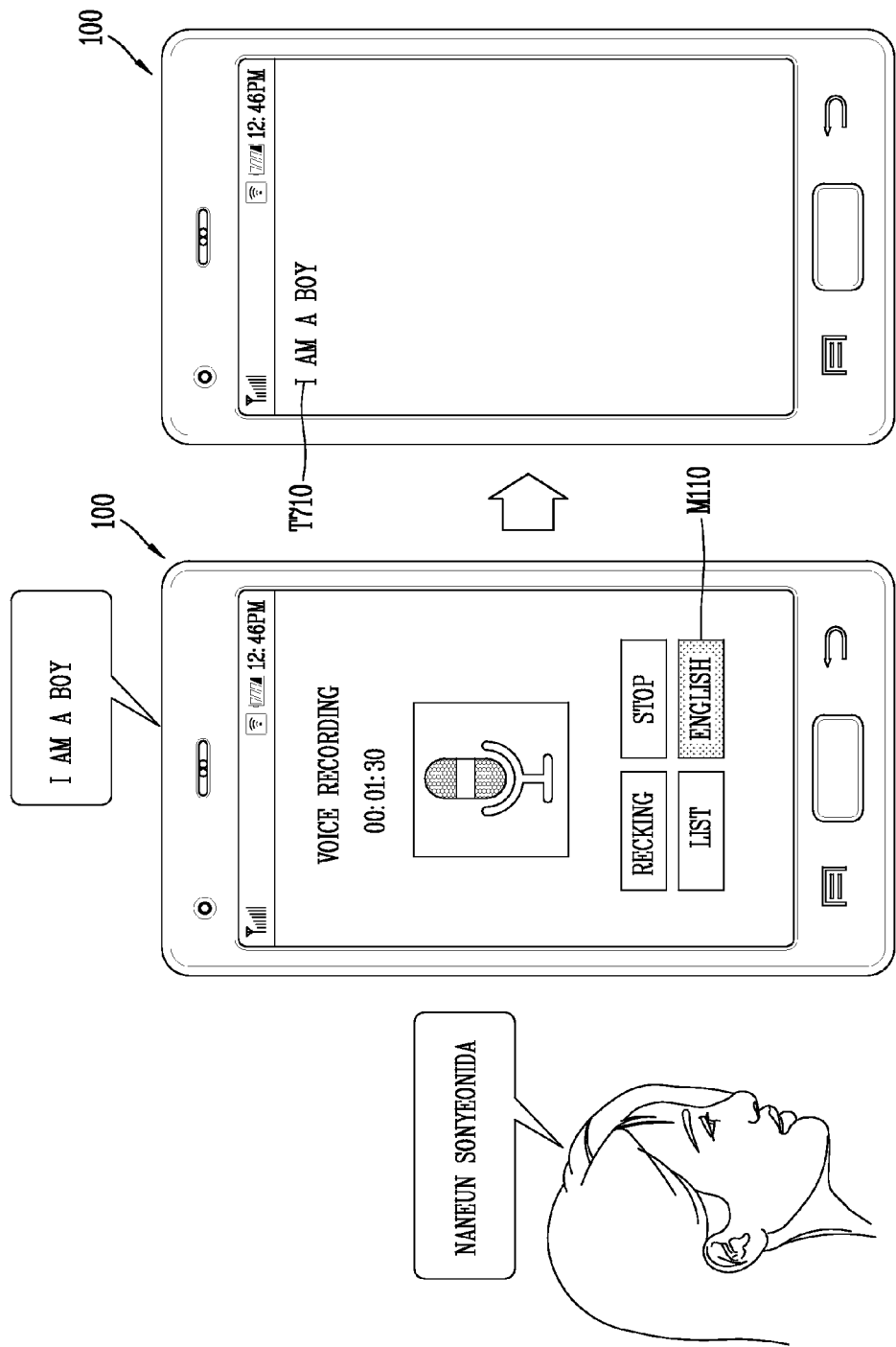

FIG. 12G is an exemplary view illustrating a language information change method for an audio file according to another sixth embodiment disclosed herein.

Referring to FIG. 12G, the mobile terminal 100 may change a specific language voice to another language voice to perform voice recording.

For example, when the mobile terminal user utters "Naneun sonyeonida" in Korean voice while performing voice recording by the mobile terminal, the mobile terminal 100 may record the Korean voice as it is or translate the Korean voice to record it with English voice (for example, "I am a boy").

In this case, the mobile terminal 100 may output the English voice (for example, "I am a boy") with a voice through an audio output device such as a speaker or the like along with the storage of the English voice.

Furthermore, the mobile terminal 100 may perform an speech-to-text (STT) for the English voice to generate a text for the English voice (for example, "I am a boy").

Furthermore, the mobile terminal 100 may display a text for the generated English voice (for example, "I am a boy") on the screen of the mobile terminal.

A seventh embodiment disclosed herein may be implemented by a part or combination of configurations or steps included in the foregoing embodiments, or implemented by a combination of the embodiments. Hereinafter, the redundant portions will be omitted for the explicit expression of the seventh embodiment disclosed herein.

A seventh embodiment disclosed herein relates to an automatic reproduction function of a voice memo (or audio file) stored in the mobile terminal, and is related to activating an automatic reproduction function of the voice memo (or audio file) when a part of the user's body (for example, the user's ear) is located proximate to the mobile terminal.

Figure 13A:
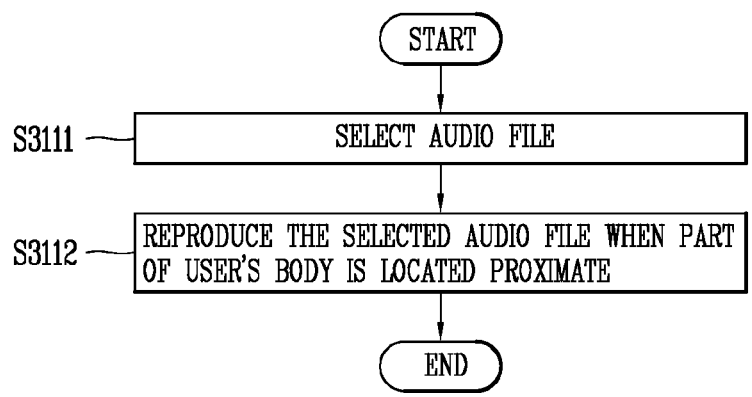
FIGS. 13A through 13C are views illustrating an operation control process of a mobile terminal according to a seventh embodiment disclosed herein.
Figure 13B:
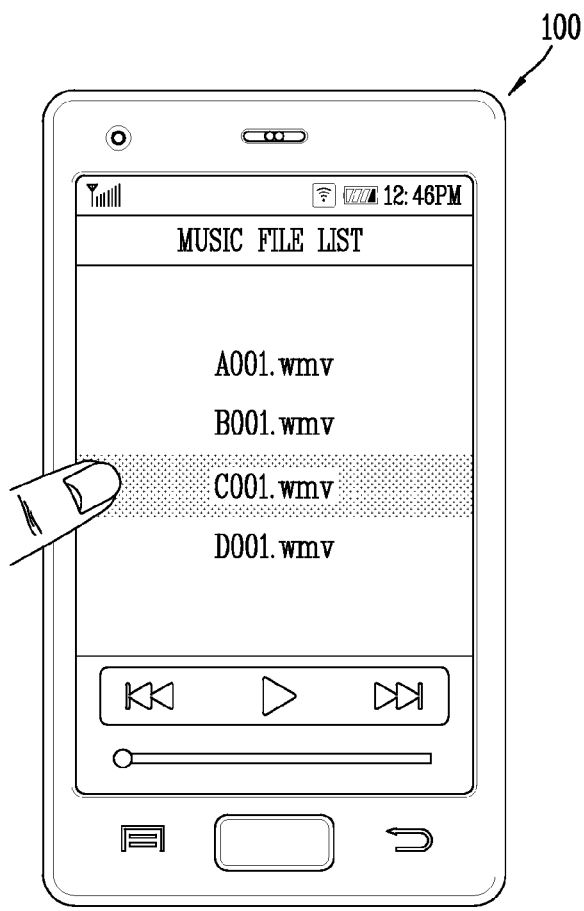

FIG. 13A is a flow chart illustrating an automatic reproduction method of an audio file according to a seventh embodiment disclosed herein, and FIG. 13B is an exemplary view illustrating an automatic reproduction method of an audio file according to a seventh embodiment disclosed herein.

Referring to FIG. 13A, an automatic reproduction method of an audio file according to a seventh embodiment disclosed herein may be carried out in the following steps.

First, the mobile terminal may select a specific audio file among a plurality of audio files stored therein (S3111). Next, the mobile terminal may reproduce the specific audio file when a part of the user's body is located proximate to the mobile terminal (S3112).

Referring to FIG. 13B, the mobile terminal 100 may display a test for audio files stored in the mobile terminal on the screen of the mobile terminal.

In this case, the user of the mobile terminal may select a specific audio file (C001.wmv) from a list for the audio files. The selection of the audio file (C001.wmv) may be based on a touch input by the user.

Figure 13C:
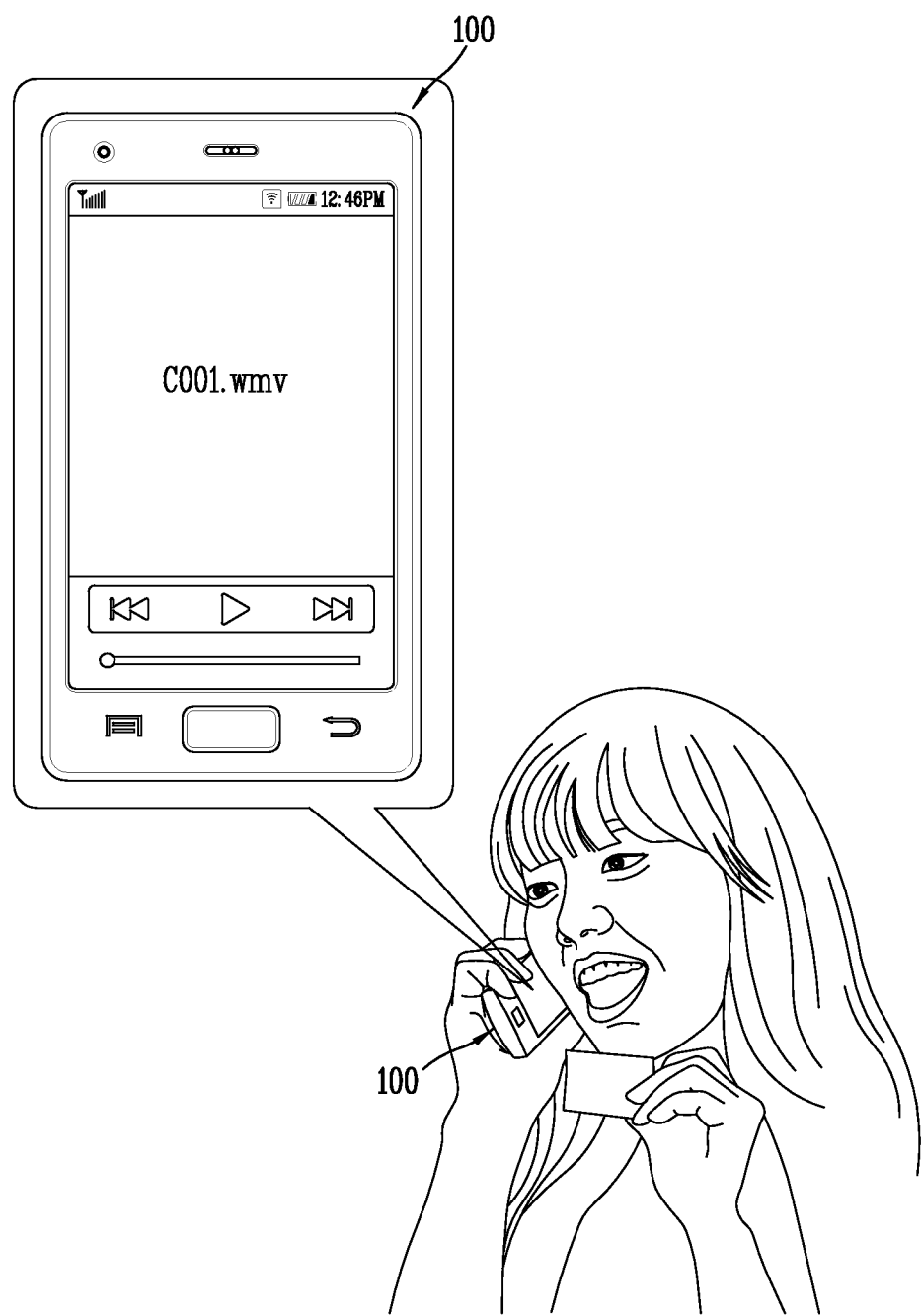

Referring to FIG. 13C, when a part of the user's body (for example, the user's ear) is located proximate to the mobile terminal, the mobile terminal 100 may automatically reproduce the specific audio file (C001.wmv).

In this manner, according to the main feature of the present disclosure, it allows the user to easily write a specific time point during the audio recording. Accordingly, the facilitation of retrieval can be provided later.

As described above, according to the embodiments of the present disclosure, the electronic device, for instance, mobile terminal 100, may perform an speech-to-text (STT) or algorithm to acquire a text, text string or script, and then display a file name or text string made of core keywords. Through this, the user may easily guess the content of the audio file without reproducing the audio file.

Furthermore, according to the present disclosure, when there is a gesture for the text string or file name from the user, the mobile terminal may display the whole text. Through this, extraction for voice content may be carried out through the text.

Furthermore, according to the present disclosure, the user may control the reproduction of an audio file in a more convenient manner through the core keywords or a text string made thereof.

In the above, the entire process associated with an audio file has been described in detail by dividing it into embodiments. Hereinafter, the hardware configuration of a mobile terminal for implementing the foregoing function will be described, and moreover, the hardware configuration of an image display device and a refrigerator among electronic devices to which the foregoing function is applicable.

Figure 14:
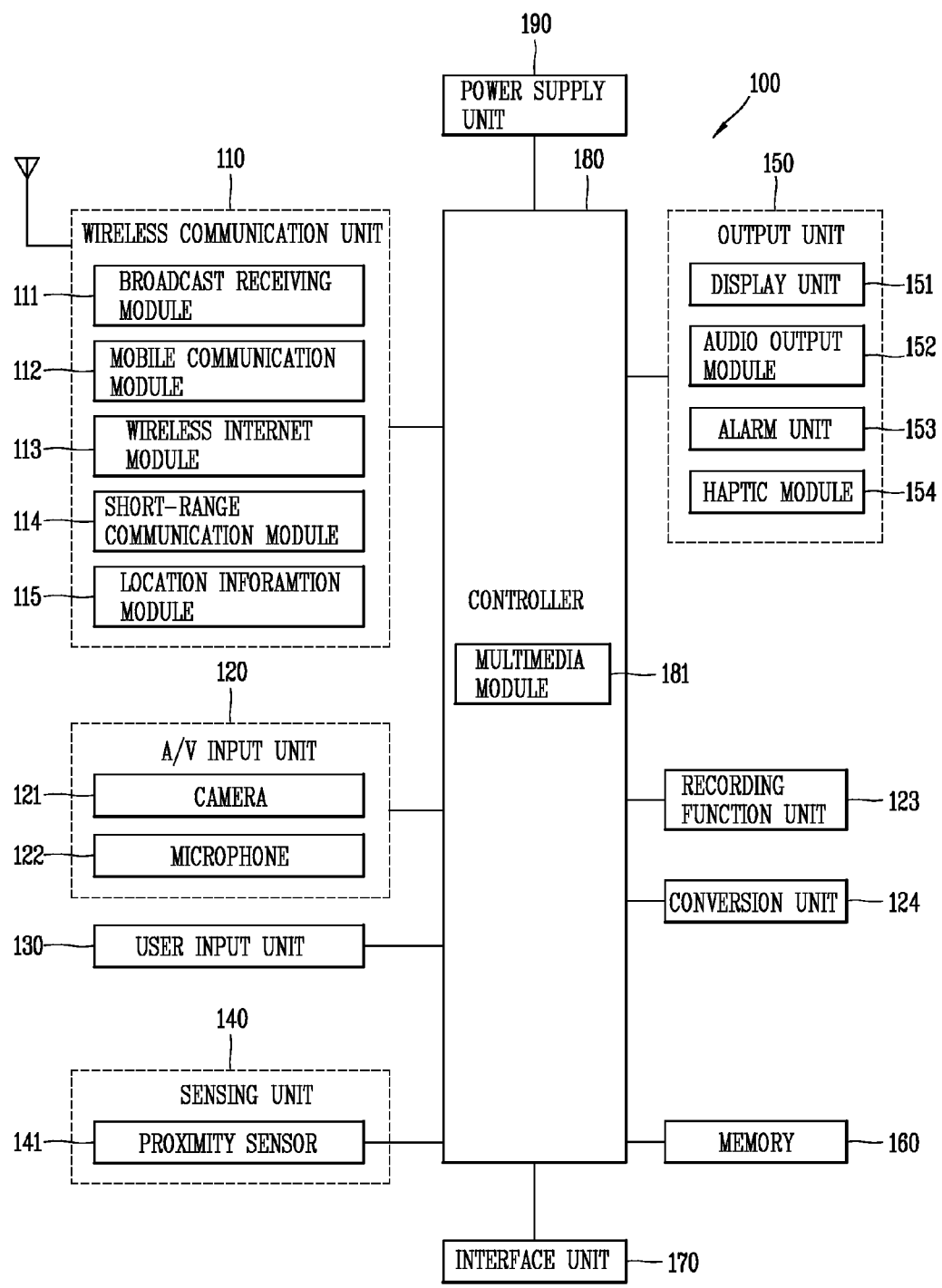
FIG. 14 is a block diagram illustrating a mobile terminal associated with an embodiment of the present disclosure.

FIG. 14 is a block diagram illustrating a mobile terminal for implementing the foregoing function.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 14 are not necessarily required, and the mobile terminal may be implemented with greater or less number of elements than those illustrated elements.

Hereinafter, the constituent elements will be described in sequence.

The wireless communication unit 110 typically includes one or more elements allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for acquiring the location of a mobile terminal, and there is a Global Positioning System (GPS) module or Wireless Fidelity (WiFi) module as a representative example.

Referring to FIG. 14, the A/V (audio/video) input unit 120 receives an audio or video signal, and the A/V (audio/video) input unit 120 may include a camera 121 and a microphone 122. The camera 121 processes a image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise cancelling algorithms to cancel noise generated in a procedure of receiving the external audio signal.

Moreover, the A/V (audio/video) input unit 120 may be used even for audio recording. The A/V (audio/video) input unit 120 may be linked with the recording function unit 123 and conversion unit 124 to implement the function of audio recording.

The recording function unit 123 performs the function of recording an external sound to store it as an audio file, and the conversion unit 124 performs the function of converting a voice contained in the sound into a text based on a speech-to-text (STT) conversion. The controller 180 may detect a core keyword from the text, and set the detected core keyword to at least part of a file name for the audio file, and thus the file name of the audio file may be easily set up.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170.

The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a terminal body through a region occupied by the display unit 151 of the terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

When the display unit 151 and a touch sensitive sensor (hereinafter, referred to as a "touch sensor") have an interlayer structure (hereinafter, referred to as a "touch screen"), the display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When there is a touch input to the touch sensor, the corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 14, a proximity sensor 141 may be arranged at an inner region of the mobile terminal 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The examples of the proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as "proximity touch", whereas a status that the pointer substantially comes in contact with the touch screen will be referred to as "contact touch". For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm 153 outputs signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 154 may be implemented in two or more in number according to the configuration of the mobile terminal 100.

The memory 160 (or storage unit) may store a program for processing and controlling the controller 180. Alternatively, the memory 160 may temporarily store input/output data (e.g., phonebook data, messages, audios, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

Furthermore, an application for performing a specific function may be stored in the memory 160. Moreover, an audio file generated by recording may be stored in the memory 160.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

The interface unit may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal has accurately been mounted to the cradle.

The controller 180 typically controls the overall operations of the mobile terminal 100. For example, the controller 180 performs the control and processing associated with telephony calls, data communications, video calls, and the like. Furthermore, the controller 180 may perform the operation of the first through the seventh embodiment disclosed herein.

The controller 180 may include a multimedia module 181 for reproducing multimedia data. The multimedia module 181 may be implemented in an integrated manner within the controller 180 or may be implemented in a separate manner from the controller 180.

Furthermore, the controller 180 can perform a pattern recognition processing so as to recognize writing or drawing input on the touch screen as text or image.

The power supply unit 190 receives external power and internal power under the control of the controller 180 to provide power required by various components.

Various embodiments described herein may be implemented in a medium that can be read by a computer or similar device using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units designed to perform the functions described herein. In some cases, such embodiments may be implemented in the controller 180 itself.

For software implementation, the embodiments such as procedures or functions may be implemented together with separate software modules. The software modules may perform at least one function or operation described herein. Software codes can be implemented by a software application written in any suitable programming language. The software codes may be stored in the memory 160 and executed by the controller 180.

On the other hand, the function of the foregoing mobile terminal 100 according to the embodiments of the present disclosure may be implemented in an image display device which will be described later. Hereinafter, an image display device having an operation control function of the mobile terminal 100 according to the embodiments of the present disclosure will be described with reference to FIG. 15.

Figure 15:
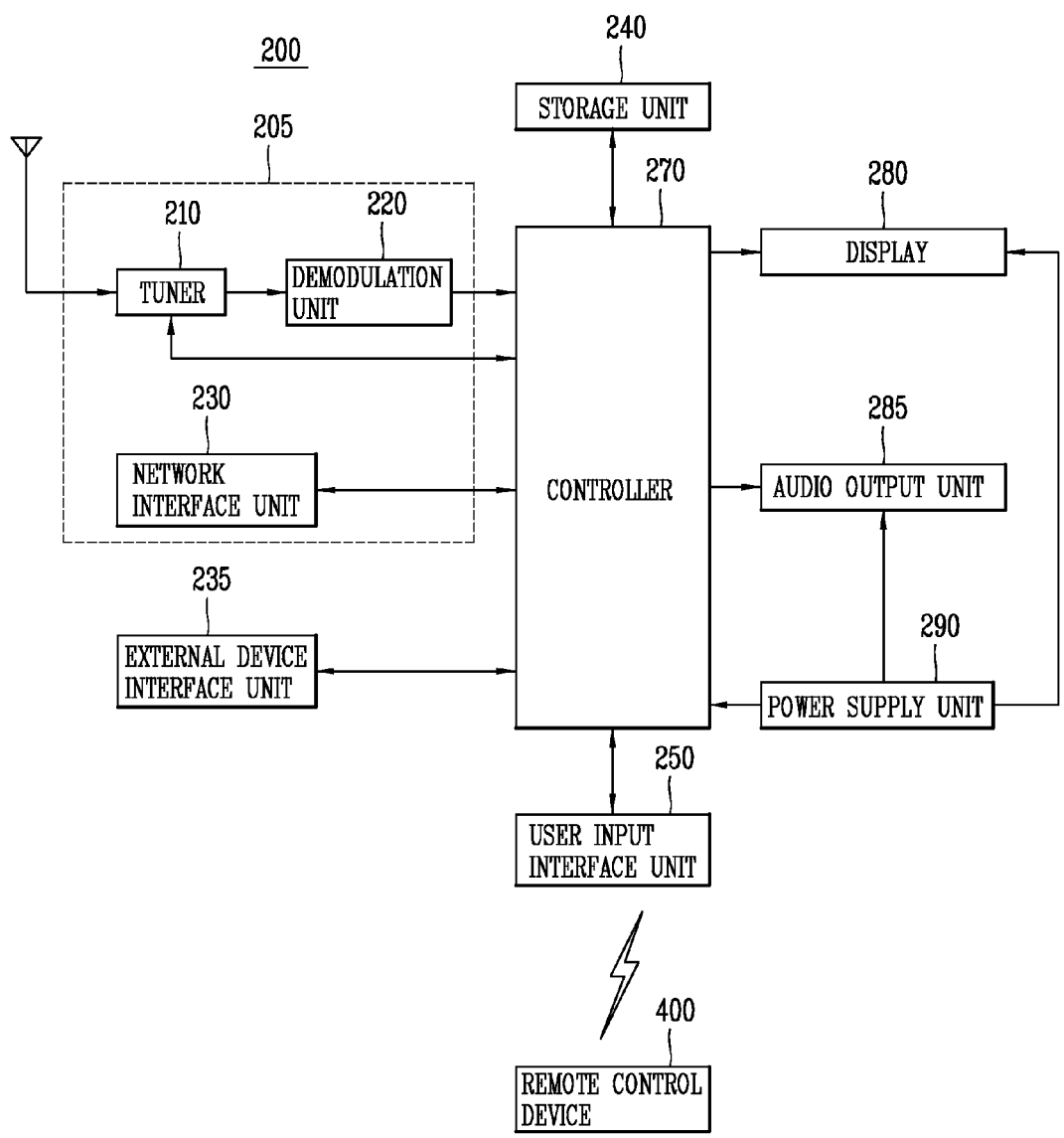
FIG. 15 is an internal block diagram illustrating an image display device according to an embodiment of the present disclosure.

FIG. 15 is an internal block diagram illustrating an image display device according to an embodiment of the present disclosure.

Referring to FIG. 15, the image display device 200 according to an embodiment of the present disclosure may include a broadcast receiver 205, an external device interface unit 235, a storage unit 240, a user input interface unit 250, a controller 270, a display unit 280, an audio output unit 285, and a power supply unit 290. Among them, the broadcast receiver 205 may include a tuner 210, a demodulation unit 220, and a network interface unit 230. Among them, the tuner 210 and the demodulation unit 220 may be alternatively provided for the network interface unit 230.

The tuner 210 selects a RF broadcast signal corresponding to the channel selected by the user or every prestored channel from the radio frequency (RF) broadcast signals received through an antenna. Furthermore, the tuner 210 transforms the selected RF broadcast signal into an intermediate frequency signal, a baseband image, or an audio signal.

For example, the selected RF broadcast signal may be transformed into a digital IF (DIF) signal if it is a digital broadcast signal, and may be transformed into an analog baseband video or audio signal (CVBS/SIF) if it is an analog broadcast signal. In other words, the tuner 210 can process both digital broadcast signals and analog broadcast signals. The analog baseband video or audio signal (CVBS/SIF) output from the tuner 210 may be directly input to the controller 270.

Furthermore, the tuner 210 may receive RF broadcast signals with a single carrier according to the Advanced Television System Committee (ATSC) method or RF broadcast signals having with a plurality of carriers according to the Digital Video Broadcasting (DVB) method.

On the other hand, the tuner 210 may sequentially select RF broadcast signals on all broadcast channels that have been stored through a channel storage function among the RF broadcast signals received through the antenna to transform it to an intermediate frequency signal or baseband video or audio signal.

The demodulation unit 220 receives a digital IF (DIF) signal that has been transformed by the tuner 210 to perform a demodulation operation.

For example, if the digital IF signal output from the tuner 210 is the ATSC method, then the demodulation unit 220 may perform 8-vestigal side band (8-VSB) demodulation, for instance. Furthermore, the demodulation unit 220 may perform channel decoding. For this purpose, the demodulation unit 220 may include a Trellis decoder, a de-interleaver, a Reed-Solomon decoder, and the like, to perform Trellis decoding, de-interleaving, and Reed-Solomon decoding.

For example, if the digital IF signal output from the tuner 210 is the DVB method, then the demodulation unit 220 may perform Coded Orthogonal Frequency Division Modulation (COFDMA) demodulation, for instance. Furthermore, the demodulation unit 220 may perform channel decoding. For this purpose, the demodulation unit 220 may include a convolution decoder, a de-interleaver, a Reed-Solomon decoder and the like to perform convolution decoding, de-interleaving, and Reed-Solomon decoding.

The demodulation unit 220 may perform demodulation and channel decoding and then output a stream signal (TS). Here, the stream signal may be a multiplexed signal with video, audio, or data signals. For example, the stream signal may be a multiplexed MPEG-2 Transport Stream (TS) with an MPEG-2 video signal, a Dolby AC-3 audio signal, and the like. More specifically, MPEG-2 TS may include a 4-byte header, and a 184-byte payload.

On the other hand, the foregoing demodulation unit 220 may be provided in a separate manner according to the ATSC method or DVB method. In other words, it can be provided with an ATSC demodulation unit and a DVB demodulation unit.

The stream signal output from the demodulation unit 220 may be input to the controller 270. The controller 270 may perform inverse-multiplexing, video/audio signal processing and the like, and then output video to the display unit 280, and output audio to the audio output unit 285.

The external device interface unit 235 may be provided to connect an external device with the image display device 200. For this purpose, the external device interface unit 235 may include an A/V input and output unit (not shown) or wireless communication unit (not shown).

The external device interface unit 235 may be connected to an external device such as a digital versatile disc (DVD), a Blu-ray disc, a gaming device, a camera, a camcorder, a computer (notebook) and the like in a wired/wireless manner. The external device interface unit 235 may transfer video, audio or data signals received from the outside through an external device connected thereto to the controller 270 of the image display device 200. Furthermore, the external device interface unit 235 may output video, audio or data signals processed by the controller 270 to the external device connected thereto. For this purpose, the external device interface unit 235 may include an A/V input and output unit (not shown) or wireless communication unit (not shown).

The A/V input and output unit may include a USB terminal, a Composite Video Banking Sync (CVBS) terminal, a component terminal, a S-video terminal (analog), a Digital Visual Interface (DVI) terminal, a High Definition Multimedia Interface (HDMI) terminal, a RGB terminal, a D-SUB terminal, and the like to input video and audio signals of the external device to the image display device 200.

The wireless communication unit may perform short-range wireless communication with other electronic devices. The image display device 200 may be connected to other electronic devices in a network according to a communication standard such as Bluetooth, Radio Frequency Identification (RFID), Infrared Data Association (IrDA), Ultra Wideband (UWB), ZigBee, Digital Living Network Alliance (DLNA), and the like.

Furthermore, the external device interface unit 235 may be connected to at least one of various set-top boxes and the foregoing various terminals to perform an input and output operation with the set-top box.

On the other hand, the external device interface unit 235 may receive an application or application list within the adjoining external device to transfer it to the controller 270 or the storage unit 240.

The network interface unit 230 provides an interface for connecting the image display device 200 to a wired/wireless network including the Internet network. The network interface unit 230 may include an Ethernet terminal, or the like, for example, for the connection with a wired network, and a communication standard such as Wireless LAN (WLAN, Wi-Fi), Wireless broadband (Wibro), World Interoperability for Microwave Access (Wimax), High Speed Downlink Packet Access (HSDPA), for example, for the connection with a wireless network.

The network interface unit 230 may be connected to a specific web page through a network. In other words, the network interface unit 230 may be connected to a specific web page through a network to send or receive data to or from the relevant server. In addition, the network interface unit 230 may receive content or data provided by the content provider or network operator. In other words, the network interface unit 230 may receive content and information related to the content such as a movie, an advertisement, a game, VOD, a broadcast signal and the like, provided from the content provider or network provider through a network. Furthermore, the network interface unit 230 may receive the firmware's update information or update file provided by the network operator. Furthermore, the network interface unit 230 may send data to the Internet, content provider, or network operator.

Furthermore, the network interface unit 230 may receive a desired application among the applications open to the public through a network.

The storage unit 240 may store programs for each signal processing or control within the controller 270 and may store signal-processed video, audio, or data signals.

Furthermore, the storage unit 240 may perform a function for temporarily storing video, audio, or data signals received from the external device interface unit 235 or network interface unit 230. Furthermore, the storage unit 240 may store information for a predetermined broadcast channel through a channel storage function.

Furthermore, the storage unit 240 may store an application or application list received from the external device interface unit 235 or network interface unit 230.

The storage unit 240 may include at least one type of storage medium including a flash memory type, a hard disk type, a multimedia card micro type, a card-type memory (e.g., SD or XD memory, etc), a Random Access Memory (RAM), a Read-Only Memory (EPROM, etc.), and the like. The image display device 200 may reproduce a content file (a video file, a still image file, a music file, a document file, an application file, etc.) stored in the storage unit 240 to provide to the user.

FIG. 15 illustrates an embodiment in which the storage unit 240 is provided in a separate manner from the controller 270, but the scope of the present invention is not limited to this. The storage unit 240 may be included in the controller 270.

The user input interface unit 250 may transfer the user's input signals to the controller 270 or transfer signals received from the controller 270 to the user.

For example, the user input interface unit 250 may receive and process control signals, such as power on/off, channel selection, screen setup and the like, generated from the remote control device 400 or transmit and process control signals generated from the controller 270 to the remote control device 400 according to various communication methods, such as radio frequency (RF) communication, infrared (IR) communication and the like.

Furthermore, for example, the user input interface unit 250 may transfer control signals received from a local key (not shown), such as a power key, a channel key, a volume key, a setting key and the like, to the controller 270.

Furthermore, for example, the user input interface unit 250 may transfer control signals received from a sensing unit (not shown) for sensing the user's gesture to the controller 270 or transmit signals generated from the controller 270 to the sensing unit (not shown). Here, the sensing unit (not shown) may include a touch sensor, a voice sensor, a location sensor, an operation sensor, and the like.

The controller 270 may inverse-multiplex a stream received from the tuner 210, demodulation unit 220 or external device interface unit 235, and otherwise, process the inverse-multiplexed signals to generate or output signals for video or audio output.

The video signal that has been image-processed in the controller 270 may be input to the display unit 280 and displayed as video corresponding to the relevant video signal. Furthermore, the video signal that has been image-processed in the controller 270 may be input to an external output device through the external device interface unit 235.

The audio signal processed in the controller 270 may be audio-outputted to the audio output unit 285. Furthermore, the audio signal processed in the controller 270 may be input to an external output device through the external device interface unit 235.

Though not shown in FIG. 15, the controller 270 may include an inverse-multiplexing unit, a video processing unit and the like.

In addition, the controller 270 may control an overall operation within the image display device 200. For example, the controller 270 may control the tuner 210 to tune a RF broadcast signal corresponding to the user's tuned channel or prestored channel.

Furthermore, the controller 270 may control the image display device 200 by the user's command received through the user input interface unit 250 or internal program. In particular, a network may be connected thereto, thereby allowing the user's desired application or application list to be downloaded into the image display device 200.

For example, the controller 270 may control the tuner 210 to receive a signal of the tuned channel according to a predetermined channel select command received through the user input interface unit 250. Then, the controller 270 processes video, audio or data signals of the tuned channel. The controller 270 may allow the user's tuned channel information or the like to be outputted through the display unit 280 or the audio output unit 285 along with the processed video or audio signal.

For another example, the controller 270 may allow video or audio signals generated from an external device, for example, a camera or camcorder, received through the external device interface unit 235, to be outputted through the display unit 280 or the audio output unit 285 according to an external device video play command received through the user input interface unit 250.

On the other hand, the controller 270 may control the display unit 280 to display an image. For example, the controller 270 may control a broadcast image received through the tuner 210, an external input image received through the external device interface unit 235, an image received through a network interface unit, or an image stored in the storage unit 240, to be displayed on the display unit 280. Here, the image displayed on the display unit 280 may be a still or moving image, and otherwise, may be a 2D or 3D image.

On the other hand, when entering an application view item, the controller 270 may control an application or application list within the image display device 200 or an application or application list that can be downloaded from an external network.

The controller 270 may control an application downloaded from an external network to be installed and driven, in addition to various user interfaces. Furthermore, the controller 270 may control an image related to an application being executed to be displayed on the display unit 280 by the user's selection.

On the other hand, though not shown in the drawing, it may further include a channel browsing processing unit for generating a thumbnail image corresponding to the channel signal or external input signal. The channel browsing processing unit may receive a stream signal (TS) output from the demodulation unit 220, a stream signal output from the external device interface unit 235, or the like to extract an image from the received stream signal, thereby generating a thumbnail image. The generated thumbnail image may be encoded as it is, to be input to the controller 270. Furthermore, the generated thumbnail image may be also encoded in a stream type to be input to the controller 270. The controller 270 may display a thumbnail list having a plurality of thumbnail images on the display unit 280 using an input thumbnail image. On the other hand, thumbnail images within the thumbnail list may be sequentially or simultaneously updated. As a result, the user may grasp the content of a plurality of broadcast channels in a convenient manner.

The display unit 280 may convert video, data and OSD signals that are processed by the controller 270, video and data signals that are received from the external device interface unit 235, or the like, into R, G, and B signals, respectively, to generate a drive signal.

The display unit 280 may be provided with a PDP, an LCD, an OLED, a flexible display, a 3D display, and the like.

On the other hand, the display unit 280 may be configured with a touch screen to be used as an input device in addition to an output device.

The audio output unit 285 may receive an audio-processed signal, for example, a stereo signal, a 3.1-channel signal or a 5.1-channel signal from the controller 270 to output it as audio. The audio output unit 285 may be implemented by various types of speakers.

On the other hand, a capture unit (not shown) for capturing the user may be further provided therein. The capture unit (not shown) may be implemented with one camera but not limited to this, and also implemented with a plurality of cameras. Image information captured by the capture unit (not shown) may be input to the controller 270.

On the other hand, to detect the user's gesture, the image display device 200 may further include a sensing unit (not shown) having at least one of a touch sensor, a voice sensor, a location sensor and an operation sensor as described above. The signal detected by the sensing unit (not shown) may be transferred to the controller 270 through the user input interface unit 250.

The controller 270 may receive a captured image from the camera unit (not shown) or a detected signal from the sensing unit (not shown) respectively or in a combined manner to detect the user's gesture.

The power supply unit 290 may supply the relevant powers over the entire image display device 200. In particular, the power supply unit 290 may supply power to the controller 270 that can be implemented in a system-on-chip (SOC) form, a display unit 280 for displaying video, and an audio output unit 285 for outputting audio.

For this purpose, the power supply unit 290 may include a converter (not shown) for converting alternating-current power into direct-current power. On the other hand, for example, when the display unit 280 is implemented as a liquid crystal panel having a plurality of backlight lamps, an inverter (not shown) capable of performing a PWM operation may be further included therein for brightness variation or dimming driving.

The remote control device 400 transmits a user input to the user input interface unit 250. For this purpose, the remote control device 400 may use various communication techniques such as Bluetooth, Radio Frequency (RF) communication, Infrared (IR) communication, Ultra Wideband (UWB), ZigBee, and the like.

In addition, the remote control device 400 may receive video, audio, or data signals output from the user input interface unit 250 to display it on the remote control device 400 or output audio or vibration.

The foregoing image display device 200 may be a fixed-type digital broadcast receiver capable of receiving at least one of ATSC (8-VSB) broadcast services, DVB-T (COFDM) broadcast services, and ISDB-T (BST-OFDM) broadcast services.

On the other hand, the image display device disclosed herein may be a wireless type for transmitting and/or receiving data to and/or from the display unit 280 and audio output unit 285 through wireless communication, as an image display device excluding the display unit 280 and audio output unit 285 as illustrated in FIG. 15.

On the other hand, the block diagram of the image display device 200 illustrated in FIG. 15 is a block diagram for an embodiment of the present disclosure. Each constituent element in the block diagram may be integrated, added, or deleted according to the specification of an actually implemented image display device 200. In other words, according to circumstances, two or more constituent elements may be integrated into one constituent element, or one constituent element may be divided into two or more constituent elements. Furthermore, the function carried out in each block is provided to describe the embodiment of the present invention, and the detailed operation or device will not limit the rights scope of the present invention.

On the other hand, the image display device 200, contrary to FIG. 15, may not have the tuner 110 and the demodulation unit 220 as illustrated in FIG. 15, but may receive or play video content through the network interface unit 230 or external device interface unit 235.

Moreover, the image display device 200 may include a recording function unit (not shown) configured to record an external sound to store it as an audio file, and a conversion unit (not shown) configured to convert a voice contained in the sound into a text based on a speech-to-text (STT) conversion. In this case, the controller 270 may detect a core keyword from the text, and set the detected core keyword to at least part of a file name for the audio file. Furthermore, the controller 180 may perform the operation of the first through the seventh embodiment disclosed herein.

On the other hand, the functions of the mobile terminal 100 according to the embodiments of the present disclosure will be implemented by a refrigerator which will be described later. Hereinafter, a refrigerator having the operation control function of the mobile terminal 100 according to the embodiments of the present disclosure will be described with reference to FIG. 16.

FIG. 16 is a block diagram illustrating a display controller and a main body controller contained in a refrigerator when an electronic device according to an embodiment of the present disclosure is the refrigerator.

Referring to FIG. 16, a display unit 310, a communication unit 331, an input unit 320, a display memory unit 333, a voice recognition unit 335, and a voice output unit 339 are connected to the display controller 330. The display controller 330 controls the operation of the display unit 310, communication unit 331, input unit 320, display memory unit 333, voice recognition unit 335, and voice output unit 339.

The communication unit 331 receives image data and DMB data from the broadcast station or base station to output them to the display unit 310 and/or voice output unit 339. Furthermore, the communication unit 331 is connected to a server or external terminal through a network under the control of the display controller 330 to transmit and receive data. For example, the communication unit 331 receives a text query from the display controller 330 to send it to a server or external terminal, and the server or external terminal transmits a search result for the text query to the communication unit 331 through a search engine. The communication unit 331 transfers the search result received from the server or external terminal to the display controller 330, thereby allowing the search result to be output from the display unit 310 and/or voice output unit 339.

The voice recognition unit 335 may include a voice input unit 336 allowing the user to input voice, and a converter 337 configured to convert the voice input to the audio input unit 336 into a voice frequency. The converter 337 converts the user's voice frequency into a digital signal and then transfers it to the display controller 330. The display controller 330 stores the transferred digital signal in the display memory unit 333.

Voice information to be output through the voice output unit 339 corresponding to the name of a food stored in the refrigerator is stored in advance in the display memory unit 333. The output voice information on the name of the food may be stored in advance in the display memory unit 333 during the fabrication of the refrigerator.

A main body controller 340 is connected to the display controller 330. A main body memory unit 341 may be connected to the main body controller 340. Data for the function of the refrigerator is stored in advance in the main body memory unit 341.

A recording function unit (not shown) configured to record an external sound to store it as an audio file, a conversion unit (not shown) configured to convert a voice contained in the sound into a text based on a speech-to-text (STT) conversion, and the like may be additionally provided in the configuration of the refrigerator. The main body controller 340 or display controller 330 detects a core keyword from the text, and sets the detected core keyword to at least part of a file name for the audio file. Furthermore, the controller for performing the operation of the first through the seventh embodiment disclosed herein may be additionally provided therein.

According to an embodiment disclosed herein, the foregoing method may be implemented as codes readable by a processor on a medium written by the program. The processor-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet).

The configurations and methods according to the above-described embodiments will not be applicable in a limited way to the foregoing mobile terminal, image display device, and refrigerator, and all or part of each embodiment may be selectively combined and configured to make various modifications thereto.

As described above, the embodiments disclosed herein have been described with reference to the accompanying drawings. Here, the terms and words used herein and the claims should not be construed by limiting to their typical or lexical meaning, but should be construed based on the meaning and concept conforming to the technical concept of the present invention.

Accordingly, the configuration illustrated in the embodiments disclosed herein and the drawings is merely the most preferred embodiment of the present invention, and is not intended to represent all the technical concept of the present invention, and thereby it should be appreciated that there may exist various equivalents and modifications for substituting those at the time of filing this application.

What is claimed is:

1. An electronic device, comprising:
   A recording function unit configured to record an external sound to store in a memory;
   a touch screen configured to display a progress bar indicating a progressive state of the recording, in real time, wherein the progress bar includes a first indicator indicating a current recording time point, wherein the touch screen displays first time information indicating a current recording time along with the progress bar;
   a controller configured to:
      convert a voice contained in the recorded external sound into a text based on a speech-to-text (STT) conversion in real time while the recording is in progress;
      control the touch screen to display the converted text while the recording is in progress;
      receive a touch input for selecting a portion of the converted text while the recording is in progress;
      reproduce the recorded external sound from a specific time point corresponding to the selection portion of the converted text while the recording is in progress, in response to the touch input; and
      control the touch screen to display a second indicator indicating a reproduction time starting from the specific time point while the recording is in progress, in response to the touch input, wherein the second indicator is displayed together with the first indicator on the progress bar,
   wherein the second indicator is moved on the progress bar in response to reproducing the recorded external sound.

2. The electronic device of claim 1, further comprising:
   an interface unit configured to output the recorded external sound corresponding to the selected portion to an earphone.

3. The electronic device of claim 1, wherein the controller controls the touch screen to display second time information indicating the reproduction time point corresponding to the selected portion along with the progress bar while the recording is in progress, in response to the touch input.

4. The electronic device of claim 3, wherein second indicator and the second time information are displayed together.

5. The electronic device of claim 1, wherein the converted text is stored in the memory to associate with the recorded external sound.

6. A method of reproducing an audio signal in an electronic device, the method comprising:
   recording an external sound to store in a memory;
   displaying a progress bar on a touch screen indicating a progressive state of the recording, in real time, wherein the progress bar includes a first indicator indicating a current recording time point;
   displaying first time information indicating a current recording time along with the progress bar;
   converting a voice contained in the recorded external sound into a text based on a speech-to-text (STT) conversion, in real time, while the recording is in progress;
   controlling the touch screen to display the converted text while the recording is in progress;
   receive a touch input for selecting a portion of the converted text while the recording is in progress;
   reproducing, the recorded external sound from a specific time point corresponding to the selected portion of the converted text while the recording is in progress, in response to the touch input; and
   controlling the touch screen to display a second indicator indicating a reproduction time starting from the specific time point while the recording is in progress, in response to the touch input, wherein the second indicator is displayed together with the first indicator on the progress bar,
   wherein second time information indicating the reproduction time point corresponding to the selected portion is displayed along with the progress bar while progressing the audio recording in response to the receiving the input, and
   wherein the second indicator and the second time information are displayed together with the first indicator and the first time information progressing the audio recording in response to the receiving the input.

7. The method of claim 6, further comprising controlling the touch screen to display second time information indicating the reproduction time point corresponding to the selected portion along with the progress bar while the recording is in progress, in response to the touch input.

8. The method of claim 6, wherein said reproducing step comprises outputting the recorded external sound corresponding to the selected portion to an earphone.

9. The method of claim 6, wherein the second indicator and the second time information are displayed together with the first indicator and the first time information while the recording is in progress, in response to the touch input.

* * * * *